(12) United States Patent
Segawa et al.

(10) Patent No.: US 7,474,764 B2
(45) Date of Patent: Jan. 6, 2009

(54) PICTURE PROCESSING APPARATUS, PICTURE PROCESSING METHOD, PICTURE PICKUP APPARATUS, AND PROGRAM

(75) Inventors: Machiko Segawa, Tokyo (JP); Keigo Ihara, Tokyo (JP); Nobuyuki Matsushita, Kanagawa (JP); Makoto Murata, Tokyo (JP); Eiji Takahashi, Chiba (JP); Ryu Aoyama, Kanagawa (JP); Caoyi Lu, Tokyo (JP); Hiroyuki Maruyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 701 days.

(21) Appl. No.: 11/201,262

(22) Filed: Aug. 11, 2005

(65) Prior Publication Data

US 2006/0044402 A1 Mar. 2, 2006

(30) Foreign Application Priority Data

Sep. 2, 2004 (JP) ............................. 2004-255675

(51) Int. Cl.
*G06K 9/00* (2006.01)
*H04N 5/225* (2006.01)
*H04N 3/20* (2006.01)
(52) U.S. Cl. ..................... 382/103; 348/169; 348/174
(58) Field of Classification Search ................. 382/100, 382/103, 225; 348/137, 142, 169, 174, 175, 348/187, 207.1, 207.11, 207.99, 208.99, 348/34, 239
See application file for complete search history.

(56) References Cited

U.S. PATENT DOCUMENTS 6,072,903 A * 6/2000 Maki et al. .................. 382/190
6,072,936 A * 6/2000 Koyama ....................... 386/95

FOREIGN PATENT DOCUMENTS

| JP | 2000-214945 | 8/2000 |
| JP | 2001-236514 | 8/2001 |
| JP | 2004-62868 | 2/2004 |

\* cited by examiner

*Primary Examiner*—Abolfazl Tabatabai
(74) *Attorney, Agent, or Firm*—Oblon, Spivak, McClelland, Maier & Neustadt, P.C.

(57) ABSTRACT

A picture processing apparatus is disclosed which processes pictures showing subjects wearing devices each assigned identification information. The picture processing apparatus includes: an acquiring mechanism acquiring a first picture sequence formed by the pictures showing the subjects wearing the devices, and a time series of the identification information assigned to the devices; and a clustering mechanism which, based on how the time series acquired by the acquiring mechanism is linked according to the identification information, links together scenes constituting the first picture sequence, the scenes having been picked up at corresponding points in time.

14 Claims, 42 Drawing Sheets

FIG. 1
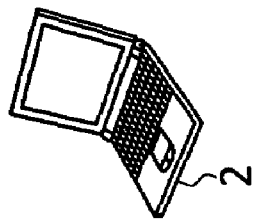
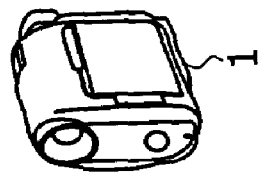
CAPTURED
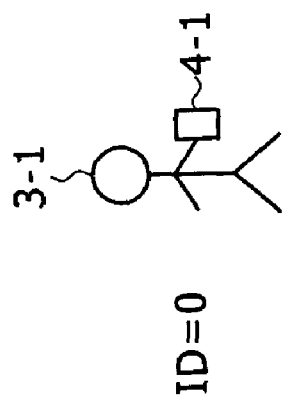
ID=0
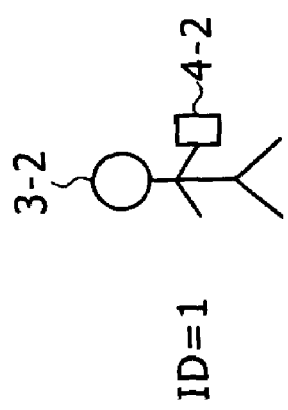
ID=1
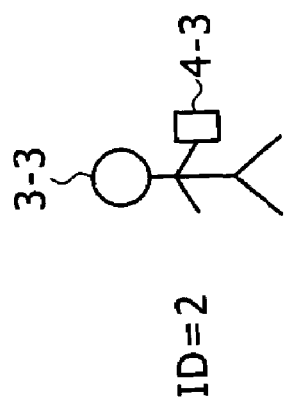
ID=2

| Time | ID=0 | ID=1 | ID=2 |
|---|---|---|---|
| 0 | RECOGNIZED | NOT RECOGNIZED | RECOGNIZED |
| 1 | RECOGNIZED | RECOGNIZED | NOT RECOGNIZED |
| 2 | RECOGNIZED | RECOGNIZED | RECOGNIZED |
| 3 | NOT RECOGNIZED | RECOGNIZED | RECOGNIZED |
| 4 | RECOGNIZED | NOT RECOGNIZED | NOT RECOGNIZED |
| ... | | | |
| t | NOT RECOGNIZED | NOT RECOGNIZED | RECOGNIZED |

FIG. 20

| CATEGORY | MEANING |
|---|---|
| CATEGORY 0 | MY CHILD ALONE APPEARS (MOST IMPORTANT) |
| CATEGORY 1 | MY CHILD AND SOMEONE ELSE'S CHILD APPEAR (IMPORTANT) |
| CATEGORY 2 | SOMEONE ELSE'S CHILDREN APPEAR (NOT SO IMPORTANT) |
| CATEGORY 3 | NO ONE APPEARS (MEANINGLESS SCENE) |

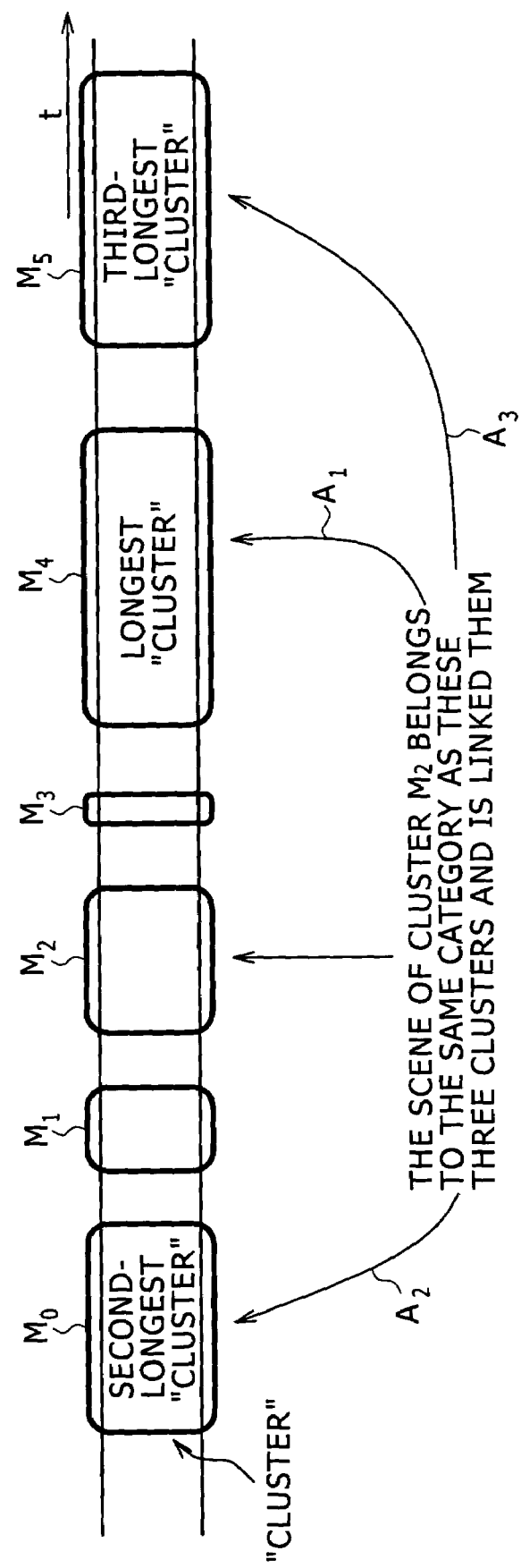

FIG. 29

```
   [VideoInfo]
1: framerate=15
2: height=120
3: width=160
4: filename=sample.mpg
5: TotalLength=1800

[AudioInfo]
6: filename=sample.wav
```

FIG. 30

```
    [ClusterInfo]
 1: ClusterDepthNum=3

[ClusterDepth0]
 2: ClusterNum=2
 3: ClusterTitle0=A
 4: ClusterTitle1=B

[ClusterDepth1]
 5: ClusterNum=3
 6: ClusterTitle0=A
 7: ClusterTitle1=C
 8: ClusterTitle2=B

[ClusterDepth2]
 9: ClusterNum=5
10: ClusterTitle0=A
11: ClusterTitle1=D
12: ClusterTitle2=C
13: ClusterTitle3=E
14: ClusterTitle4=B
```

FIG.31

```
[ClusterData]
 1:  Frame0_Depth0=1
 2:  Frame0_Depth1=2
 3:  Frame0_Depth2=4
 4:  Frame0_Next_Depth0=443
 5:  Frame0_Next_Depth1=200
 6:  Frame0_Next_Depth2=200
 7:  Frame200_Depth1=1
 8:  Frame200_Depth2=2
 9:  Frame200_Next_Depth1=443
10:  Frame200_Next_Depth2=443
11:  Frame443_Depth0=0
12:  Frame443_Depth1=0
13:  Frame443_Depth2=0
14:  Last_Depth0=443
15:  Last_Depth1=443
16:  Last_Depth2=443
```

FIG.32

```
[LinkData]
 1:  Frame0_LinkNum=3
 2:  Frame0_Link0=2452
 3:  Frame0_Link1=5664
 4:  Frame0_Link2_FileName=family.mpg
 5:  Frame0_Link2=343
 6:  Frame0_Next=15
 7:  Frame15_LinkNum=0
 8:  Frame15_Next=476
 9:  Frame476_LinkNum=2
10:  Frame476_Link0=66545
11:  Frame476_Link1=546
12:  Frame476_Next=513
13:  Frame513_LinkNum=0
14:  Frame513_Next=1556
15:  Frame1556_LinkNum=1
16:  Frame1556_Link0=3333
17:  Frame1556_Next=1590
18:  Frame1590_LinkNum=0
19:  Last=1590
```

PICTURE PROCESSING APPARATUS, PICTURE PROCESSING METHOD, PICTURE PICKUP APPARATUS, AND PROGRAM

CROSS REFERENCES TO RELATED APPLICATIONS

The present invention contains subject matter related to Japanese Patent Application JP 2004-255675 filed with the Japanese Patent Office on Sep. 2, 2004, the entire contents of which being incorporated herein by reference.

BACKGROUND OF THE INVENTION

The present invention relates to a picture processing apparatus, a picture processing method, a picture pickup apparatus, and a program. More particularly, the invention relates to a picture processing apparatus, a picture processing method, a picture pickup apparatus, and a program for having scenes of picked-up moving pictures linked to the subjects appearing in the scenes for easy picture handling.

Falling prices of video cameras in recent years have prompted the devices to become widely available. With their enclosure getting smaller than ever, the video cameras can let people take moving pictures easily wherever they are. Moving pictures are also taken casually through the use of a moving picture pickup feature incorporated in mobile phones and digital still cameras.

Although moving pictures have become easy to take, it is still difficult to handle the picked-up pictures. A number of techniques have been proposed to solve the problem through the addition of a variety of attribute information to the moving pictures having been taken. Illustratively, Japanese Patent Laid-open No. 2004-62868 discloses techniques whereby the names of persons appearing as subjects in picked-up pictures are recorded as meta data about the pictures.

Some business-use video cameras are designed to add such attributes as the weather during picture taking, locations, sound volumes, and thumbnails representative of clips (each clip is composed of moving pictures acquired from a single picture-taking session) to each of the scenes that have been picked up.

Japanese Patent Laid-open No. 2000-214945 discloses techniques for taking pictures of a person wearing a badge that emits a pattern of light indicating a particular ID which, when detected from the pictures taken, allows the person wearing the badge to be identified within the pictures.

SUMMARY OF THE INVENTION

Despite the above-outlined measures to add meta data to picked-up pictures for subsequent picture handling, it is still difficult for the general user to search for particular scenes in the pictures using the diverse meta data.

In the case of the DV (digital video) type video camera, for example, moving pictures recorded on a DV tape are basically reproduced only in the order in which they were taken. Users are unable to view recorded moving pictures casually.

That is, the user generally wants to view only part of all scenes recorded on the DV tape. However, the particular scenes desired to be viewed cannot be extracted readily for reproduction apart from the rest on the tape. Besides the favorite scenes, the user is obliged to watch unnecessary scenes being reproduced chronologically, which can be a boring experience.

Where a plurality of still pictures taken by a digital still camera are captured into a personal computer or like equipment, these pictures may be displayed as thumbnails on the display to let the user select only desired scenes with ease. If specific scenes alone are selected and reproduced just as easily from moving pictures, the user will not be bored having to watch uninteresting scenes.

In recent years, nonlinear editing by use of the personal computer has become commonplace. It has become popular to edit desired scenes alone through such editing processes and to write them to special media such as DVD (digital versatile disc) known for their small size and for their ease and convenience in offering immediate access to and reproduction of any of the desired pictures recorded thereon. Still, the procedures to have the personal computer capture and edit recorded moving pictures can be tortuous and complicated.

In such cases, if it is possible to select at least specific scenes easily in reference to the persons having been picked up, the burdens of editing work are expected to be alleviated appreciably.

The present invention has been made in view of the above circumstances and provides arrangements for having the scenes of picked-up moving pictures linked to the subjects appearing in these scenes for easy picture handling.

According to an embodiment of the present invention, there is provided a picture processing apparatus for processing pictures showing subjects wearing devices each assigned identification information. The picture processing apparatus includes: an acquiring mechanism acquiring a first picture sequence formed by the pictures showing the subjects wearing the devices, and a time series of the identification information assigned to the devices; and a clustering mechanism which, based on how the time series acquired by the acquiring mechanism is linked according to the identification information, links together scenes constituting the first picture sequence, the scenes having been picked up at corresponding points in time.

Preferably, the acquiring mechanism may acquire the time series of the identification information from a second picture sequence having been picked up and recognized.

The clustering mechanism may preferably link the time series of the identification information into a single cluster in which the identification information continues over a predetermined time interval and belongs to one category.

Preferably, the picture processing apparatus of the present invention may further include a reproducing mechanism reproducing, from among the scenes constituting the first picture sequence, those scenes which constitute part of the first picture sequence and which were picked up over the time interval corresponding to the single cluster.

The reproducing mechanism may reproduce the scenes which constitute the first picture sequence and which were picked up over the time intervals corresponding to a plurality of clusters formed by the time series of the identification information belonging to the same category.

Preferably, the picture processing apparatus of the present invention may further include a distribution displaying mechanism displaying a time-base distribution of the scenes which constitute the first picture sequence and which were picked up over the time interval corresponding to the single cluster, the time-base distribution of the scenes being displayed in a position different from that in which the scene reproduced by the reproducing mechanism is being displayed.

The reproducing mechanism may preferably reproduce the scene selected from the time-base distribution displayed by the distribution displaying mechanism.

The clustering mechanism may preferably link into a second cluster the time series of the identification information belonging to the same category as that of the time series of the identification information constituting the single cluster regarded as a first cluster.

Preferably, the picture processing apparatus of the present invention may further include: a reproducing mechanism reproducing the first picture sequence; and a displaying mechanism which, during reproduction of a first scene constituting part of the first picture sequence picked up over the time interval corresponding to the first cluster, reproduces a second scene constituting part of the first picture sequence picked up over the time interval corresponding to the second cluster, the second scene being displayed in a position different from that in which the first scene is being displayed.

The displaying mechanism may preferably display a plurality of the second scenes.

The reproducing mechanism may preferably start reproducing the second scene displayed by the displaying mechanism when the second scene is selected by a user.

Preferably, the picture processing apparatus of the present invention may further include a creating mechanism creating meta data representative of how the scenes constituting the first picture sequence are linked together.

According to another embodiment of the present invention, there is provided a picture processing method for processing pictures showing subjects wearing devices each assigned identification information. The picture processing method includes the steps of: acquiring a picture sequence formed by the pictures showing the subjects wearing the devices, and a time series of the identification information assigned to the devices; and based on how the time series acquired in the acquiring step is linked according to the identification information, linking together scenes constituting the picture sequence, the scenes having been picked up at corresponding points in time.

According to a further embodiment of the present invention, there is provided a program for causing a computer to process pictures showing subjects wearing devices each assigned identification information. The program causing the computer to execute a procedure includes the steps of: acquiring a picture sequence formed by the pictures showing the subjects wearing the devices, and a time series of the identification information assigned to the devices; and based on how the time series acquired in the acquiring step is linked according to the identification information, linking together scenes constituting the picture sequence, the scenes having been picked up at corresponding points in time.

According to an even further embodiment of the present invention, there is provided a picture pickup apparatus for processing pictures showing subjects wearing devices each assigned identification information. The picture pickup apparatus includes: a picture pickup mechanism; an acquiring mechanism acquiring a picture sequence picked up by the picture pickup mechanism and formed by the pictures showing the subjects wearing the devices, and a time series of the identification information assigned to the devices; and a clustering mechanism which, based on how the time series acquired by the acquiring mechanism is linked according to the identification information, links together scenes constituting the picture sequence, the scenes having been picked up at corresponding points in time.

Through the use of the picture processing apparatus, picture processing method, and program according to the invention, a picture sequence formed by pictures showing subjects wearing devices each assigned identification information is acquired, together with a time series of the identification information. Based on how the acquired time series is linked according to the identification information, scenes constituting the picture sequence are linked together, the scenes having been picked up at corresponding points in time.

Where the picture pickup apparatus of the invention is in use, a picture sequence formed by pictures showing subjects wearing devices each assigned identification information is also acquired, together with a time series of the identification information. Likewise, based on how the acquired time series is linked according to the identification information, scenes constituting the picture sequence are linked together, the scenes having been picked up at corresponding points in time.

According the present invention, each of the scenes constituting picked-up moving pictures is handled in a manner linking the scene in question to the subjects appearing therein.

According to the invention, when a given scene is being reproduced, other scenes showing the same subjects as those appearing in the ongoing scene may be presented to the user.

Also according to the invention, the user may be presented consecutively with only those scenes showing a particular subject or subjects.

BRIEF DESCRIPTION OF THE DRAWINGS

Further objects and advantages of this invention will become apparent upon a reading of the following description and appended drawings in which:

FIG. 1 is a schematic view showing a typical configuration of a picture-taking and display system to which this invention is applied;

FIG. 20 is a tabular view showing typical meanings of categories;

FIG. 28 is a schematic view showing a further example of information described in the meta data file;

FIG. 29 is a schematic view showing a typical description in the meta data file;

FIG. 30 is a schematic view showing another meta data file description continued to the description in FIG. 29;

FIG. 31 is a schematic view showing another meta data file description continued to the description in FIG. 30;

FIG. 32 is a schematic view showing another meta data file description continued to the description in FIG. 31;

DETAILED DESCRIPTION OF THE PREFERRED EMBODIMENTS

Figure 2:
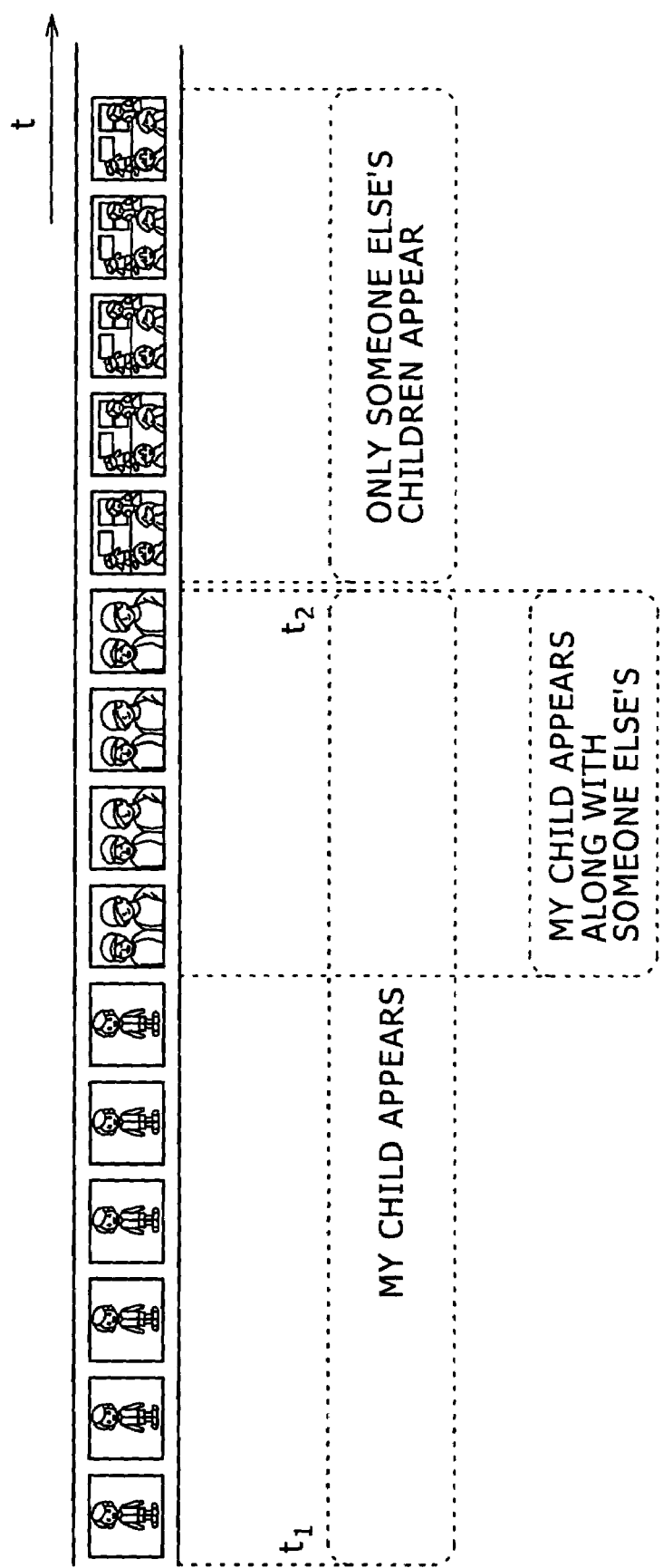
FIG. 2 is a schematic view explaining a reproducing function of a personal computer.

What is described below as the preferred embodiments of this invention corresponds to the appended claims as follows: the description of the preferred embodiments basically provides specific examples supporting what is claimed. If any example of the invention described below as a preferred embodiment does not have an exactly corresponding claim, this does not means that the example in question has no relevance to the claims. Conversely, if any example of the invention described hereunder has a specifically corresponding claim, this does not mean that the example in question is limited to that claim or has no relevance to other claims.

Furthermore, the description below of the preferred embodiments does not claim to include all examples corresponding to the whole claims. In other words, the description hereunder does not limit or deny any inventive entities which are not covered by the appended claims of this invention but which may be added or brought about by this applicant in the future by divisional application or by amendment.

An embodiment of the present invention is a picture processing apparatus (e.g., personal computer 2 in FIG. 1) for processing pictures showing subjects wearing devices (e.g., sensor badges 4 in FIG. 1) each assigned identification information (ID), the picture processing apparatus comprising: an acquiring mechanism (e.g., capturing unit 81 in FIG. 12) acquiring a first picture sequence formed by the pictures (e.g., taken by a moving picture taking area 71 in FIG. 9) showing the subjects wearing the devices, and a time series of the identification information assigned to the devices; and a clustering mechanism (e.g., scene determination unit 82 in FIG. 12) which, based on how the time series acquired by the acquiring mechanism is linked according to the identification information, links together scenes constituting the first picture sequence, the scenes having been picked up at corresponding points in time.

Preferably, the picture processing apparatus of the invention may further include a reproducing mechanism (e.g., reproduction unit 102 in FIG. 39) reproducing, from among the scenes constituting the first picture sequence, those scenes which constitute part of the first picture sequence and which were picked up over the time interval corresponding to the single cluster.

Preferably, the picture processing apparatus of the invention may further include a distribution displaying mechanism (e.g., cluster distribution display control unit 103 in FIG. 39) displaying a time-base distribution of the scenes which constitute the first picture sequence and which were picked up over the time interval corresponding to the single cluster, the time-base distribution of the scenes being displayed in a position different from that in which the scene reproduced by the reproducing mechanism is being displayed.

Preferably, the picture processing apparatus of the invention may further include: a reproducing mechanism (e.g., reproduction unit 102 in FIG. 43) reproducing the first picture sequence; and a displaying mechanism (e.g., link destination display unit 151 in FIG. 43) which, during reproduction of a first scene constituting part of the first picture sequence picked up over the time interval corresponding to the first cluster, reproduces a second scene constituting part of the first picture sequence picked up over the time interval corresponding to the second cluster, the second scene being displayed in a position different from that in which the first scene is being displayed.

Preferably, the picture processing apparatus of the invention may further include a creating mechanism (e.g., file creation unit 93 in FIG. 14) creating meta data representative of how the scenes constituting the first picture sequence are linked together.

Figure 33:
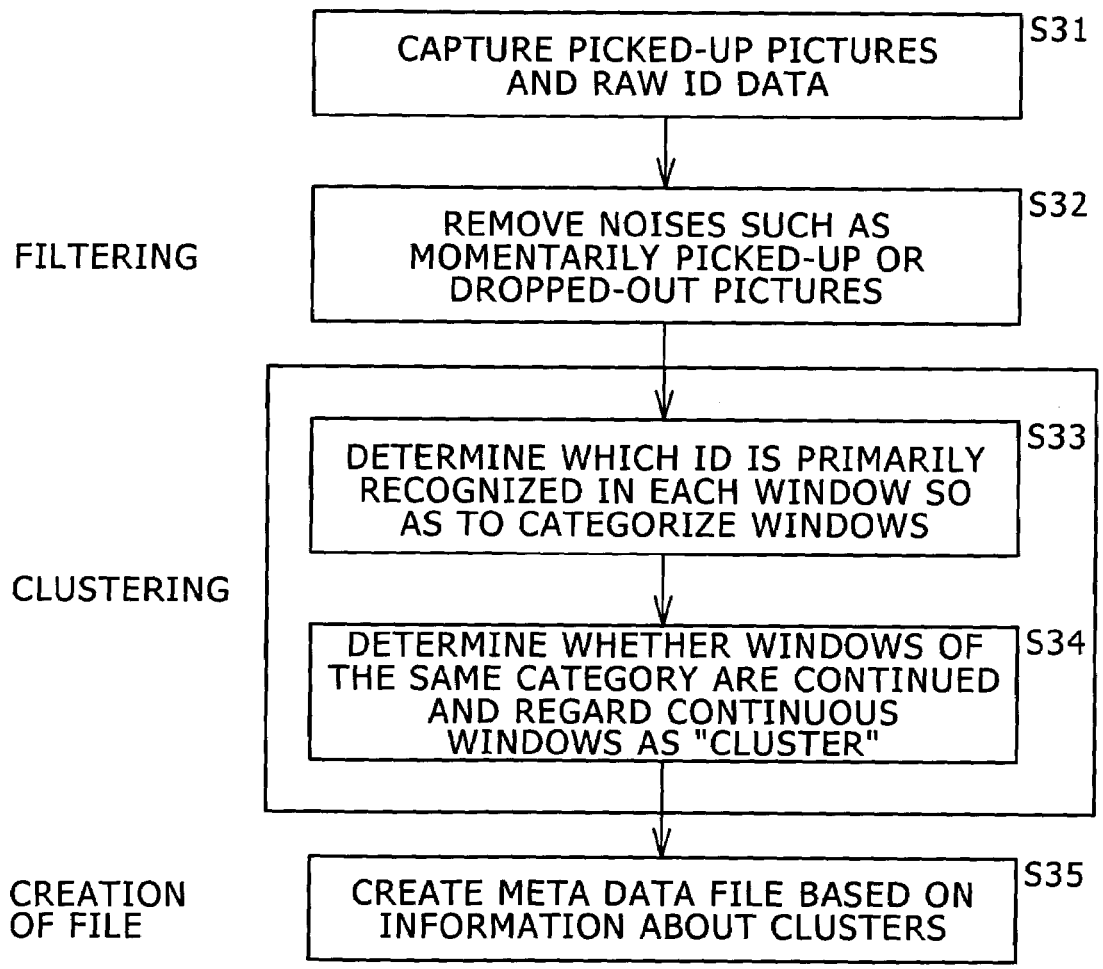
FIG. 33 is a flowchart of steps outlining a process performed by the personal computer.
Figure 34:
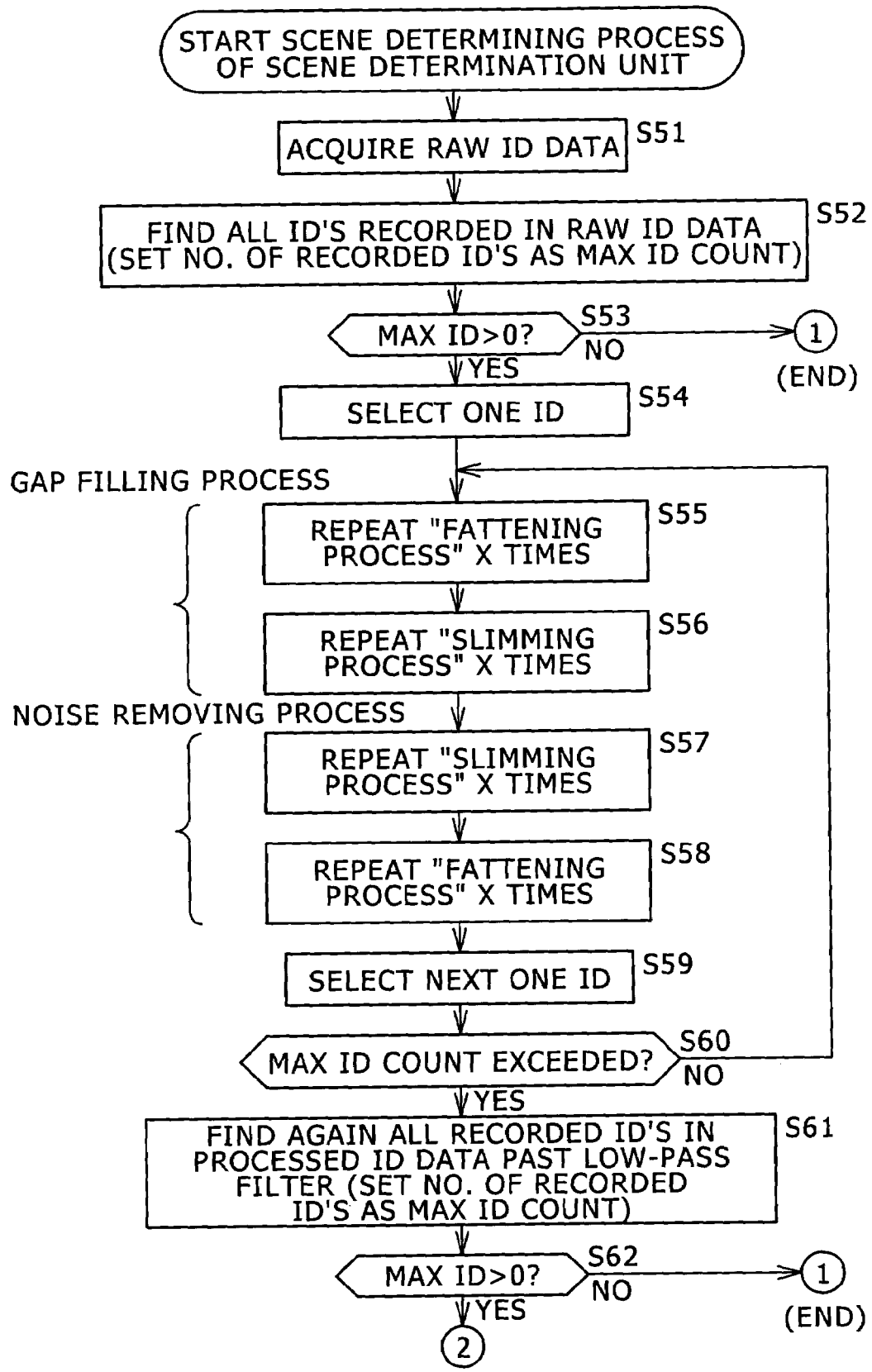
FIG. 34 is a flowchart of steps constituting a scene determining process of the scene determination unit.
Figure 35:
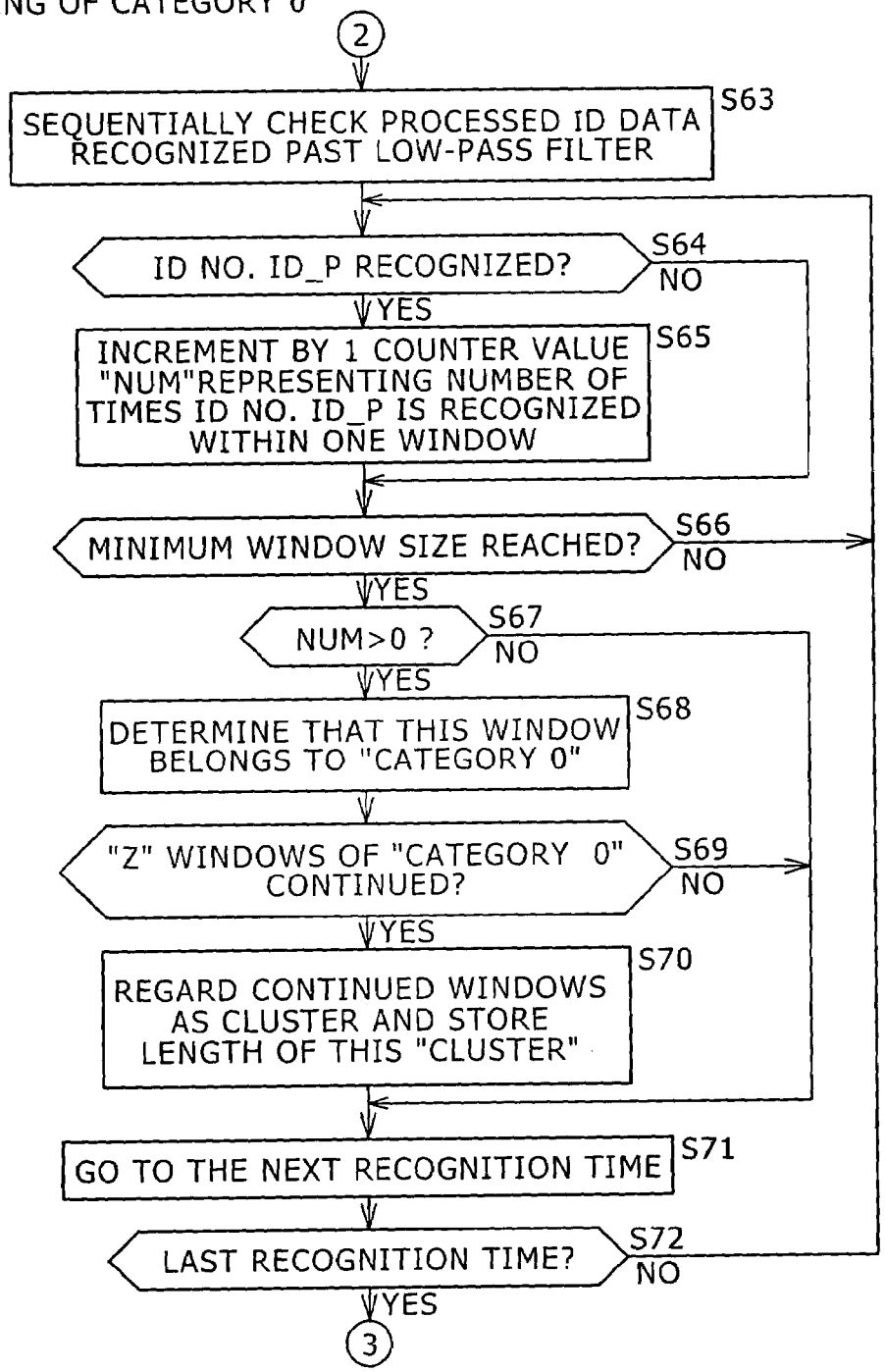
FIG. 35 is a flowchart of steps constituting a scene determining process continued to the process in FIG. 34.
Figure 36:
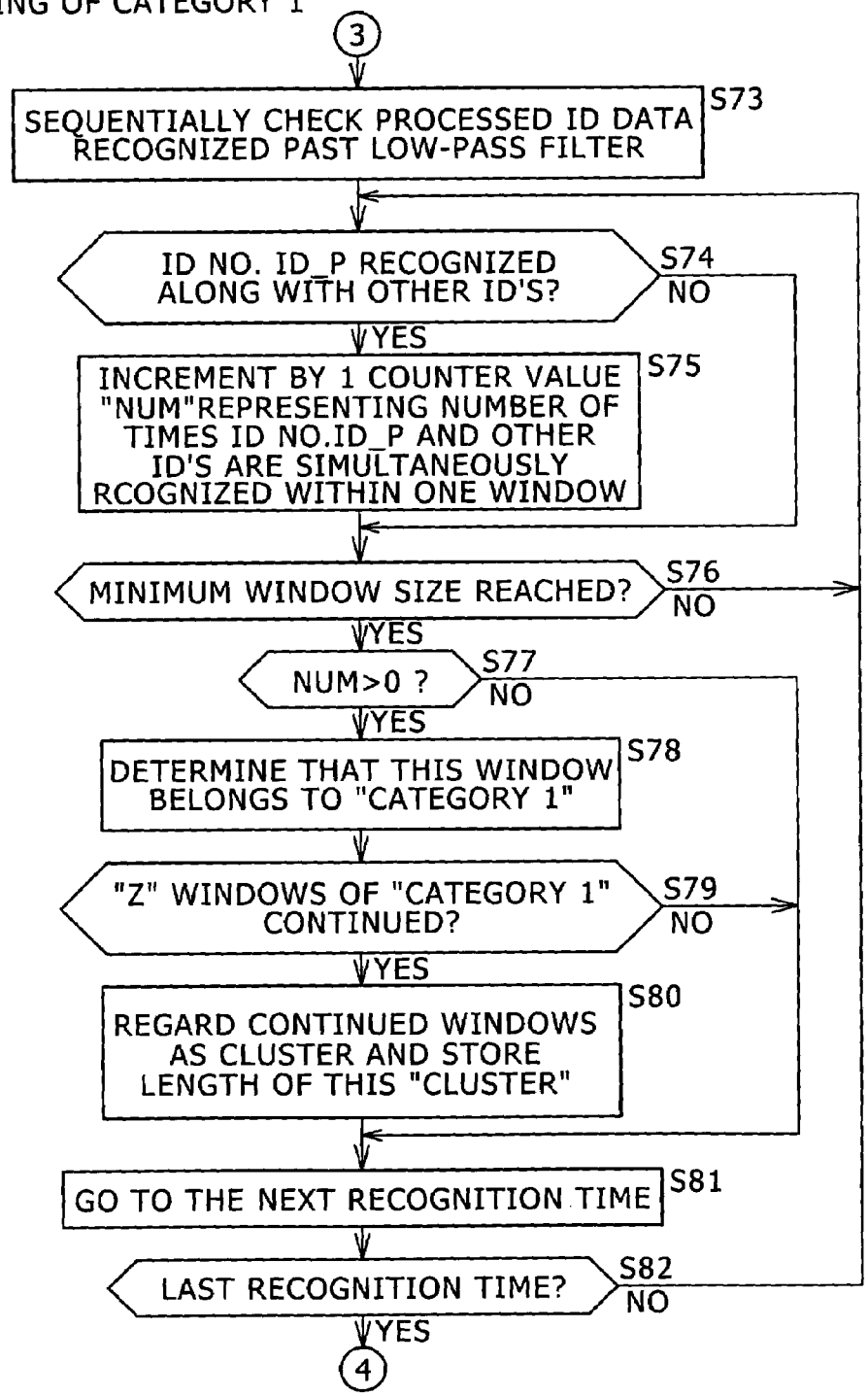
FIG. 36 is a flowchart of steps constituting a scene determining process continued to the process in FIG. 35.
Figure 37:
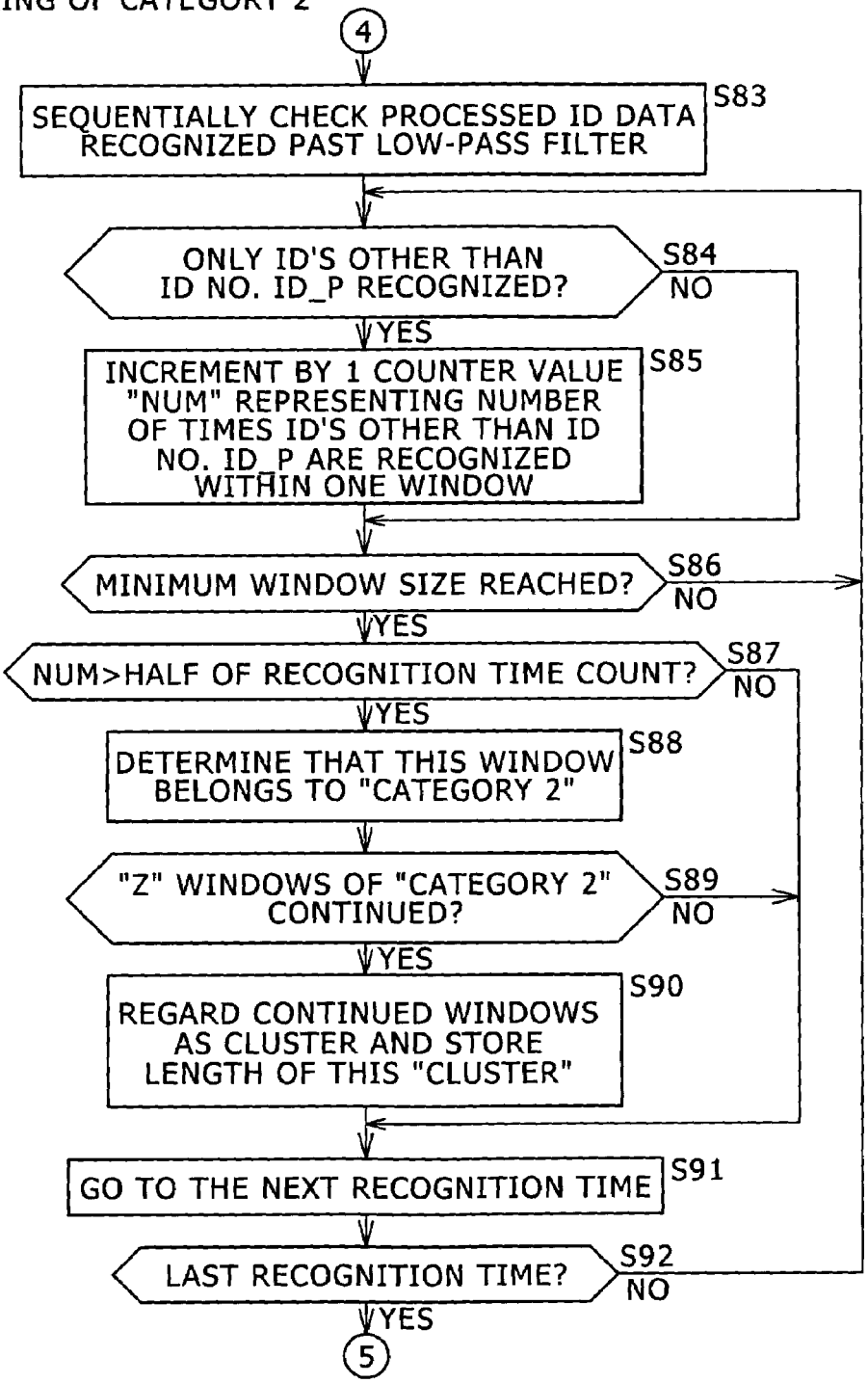
FIG. 37 is a flowchart of steps constituting a scene determining process continued to the process in FIG. 36.

Another embodiment of the present invention is a picture processing method for processing pictures showing subjects wearing devices (e.g., sensor badges 4) each assigned identification information, the picture processing method including the steps of: acquiring (e.g., in step S31 of FIG. 33) a picture sequence formed by the pictures (e.g., taken by the moving picture taking area 71 in FIG. 9) showing the subjects wearing the devices, and a time series of the identification information assigned to the devices; and based on how the time series acquired in the acquiring step is linked according to the identification information, linking together (e.g., in steps S33 and S34 of FIG. 33) scenes constituting the picture sequence, the scenes having been picked up at corresponding points in time.

A further embodiment of the present invention is a program for causing a computer to execute a procedure including the same steps as those of the inventive picture processing method outlined above.

An even further embodiment of the present invention is a picture pickup apparatus (e.g., video camera 301 in FIG. 47) for processing pictures showing subjects wearing devices (e.g., sensor badges 4) each assigned identification information (ID), the picture pickup apparatus including: a picture pickup mechanism (e.g., moving picture taking area 71 in FIG. 9); an acquiring mechanism (e.g., capturing unit 81 in FIG. 12) acquiring a picture sequence picked up by the picture pickup mechanism and formed by the pictures showing the subjects wearing the devices, and a time series of the identification information assigned to the devices; and a clustering mechanism (e.g., scene determination unit 82 in FIG. 12) which, based on how the time series acquired by the acquiring mechanism is linked according to the identification information, links together scenes constituting the picture sequence, the scenes having been picked up at corresponding points in time.

Preferred embodiments of the invention will now be described with reference to the accompanying drawings.

FIG. 1 is a schematic view showing a typical configuration of a picture-taking and display system to which this invention is applied. A video camera 1 in FIG. 1 offers two functions: one for picking up a picture sequence (moving pictures) to be viewed or edited by the user, and the other for detecting light-emitting patterns of sensor badges 4-1 through 4-3 worn by children 3-1 through 3-3 on their clothes in synchronism with the user's operation to start and stop a picture-taking session, the children being the subjects of the pictures.

The light-emitting patterns of the sensor badges 4-1 through 4-3 denote the ID's assigned to the children wearing them. The video camera 1 recognizes the ID's represented by the light-emitting patterns and stores the recognized ID's in conjunction with the pictures taken.

In the example of FIG. 1, the child 3-1 wears the sensor badge 4-1 that is assigned the ID "0," the child 3-2 wears the sensor badge 4-2 with the ID "1," and the child 3-3 wears the sensor badge 4-3 with the ID "2."

If the user takes pictures of the child 3-1 as the subject, the picked-up pictures are stored in conjunction with the ID "0." If the children 3-2 and 3-3 are found appearing in the same pickup range of the video camera 1 covering the child 3-1, the picked-up pictures are stored in association with the ID's "0," "1" and "2."

The pictures taken by the video camera 1 and the ID's recognized thereby are captured into a personal computer 2 in wired or wireless fashion as indicated by an arrow in FIG. 1. In keeping with meta data derived from the ID's, the personal computer 2 reproduces or edits the pictures taken by the video camera 1. In the description that follows, the children 3-1 through 3-3 will be generically referred to as the child or children 3 and the sensor badges 4-1 through 4-3 as the sensor badge or badges 4 if there is no specific need for distinction therebetween.

FIG. 2 is a schematic view showing how pictures are handled illustratively by the personal computer 2. In keeping with the ID's stored in conjunction with the pictures, the personal computer 2 recognizes the subject (child 3 in the example of FIG. 1) in each of the scenes formed by the pictures, and reproduces the pictures in scenes each showing the subject designated by the user.

In the example of FIG. 2, the picked-up pictures are clustered into three scenes: a scene in which "my child" alone appears (e.g., child 3-1 of the user operating the personal computer 2), a scene in which "my child" and "someone else's child" (e.g., children 3-1 and 3-2) appear, and a scene in which only "someone else's children" appear.

Suppose that with the pictures clustered as outlined above, the user designates reproduction of the scene showing "my child." In that case, the scene from a time $t_1$ until a time $t_2$ in which the child 3-1 appears is reproduced out of the entire picked-up pictures on the basis of meta data representing the result of the clustering process.

In this context, the expression "scene" means a sequence of a predetermined number of successive pictures out of all pictures taken and arranged chronologically. The user may view only the desired scenes in which the user's child appears. This is a much less boring experience than if the entire pictures taken must be viewed in order of time.

Naturally, the subjects are not limited to three children. The subjects may be adults, animals, or any other physical objects. The ID's need not be represented solely by the badges worn by the subjects. As long as they emit appropriate ID patterns, any other suitable devices may be carried by the subject's hand or hung around the subject's neck.

Figure 3:
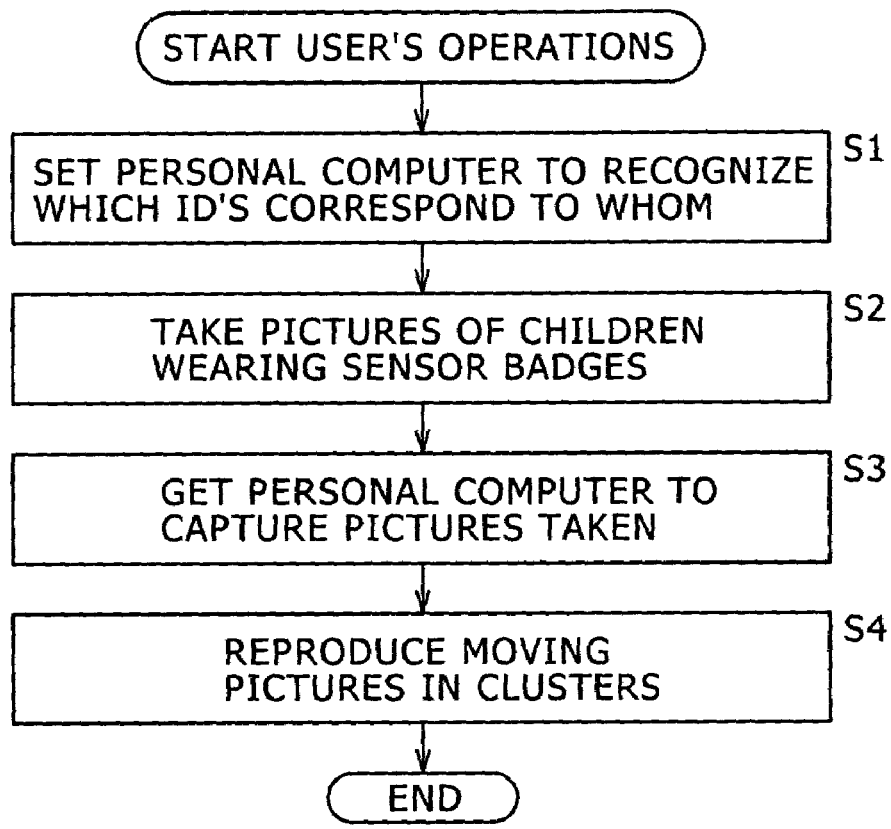
FIG. 3 is a flowchart of steps constituting a user's operations.

Described below with reference to the flowchart of FIG. 3 is what the user does to reproduce scenes in which a particular subject appears. In step S1, the user sets the personal computer 2 to recognize which ID's assigned to the sensor badges 4 correspond to whom. For example, the user sets the personal computer 2 to associate the ID "0" with "my child (child A)," the ID "1" with a child B, and the ID "2" with a child C.

In step S2, the user operates the video camera 1 to take pictures of the children 3 wearing the sensor badges 4. In this step, the ID's of the children 3 are stored in conjunction with the picked-up pictures.

In step S3, the user connects the video camera 1 with the personal computer 2 in wired or wireless fashion so as to let the personal computer 2 capture the stored pictures and ID's from the video camera 1. In turn, the personal computer 2 groups the pictures captured from the video camera 1 into clusters in a suitably timed manner.

In step S4, the user designates an appropriate category and starts reproduction of a scene or scenes (i.e., group of pictures showing the same child) belonging to that category. How the video camera 1 and personal computer 2 work in response to the user's operations outlined above will be discussed later in more detail.

Figure 4:
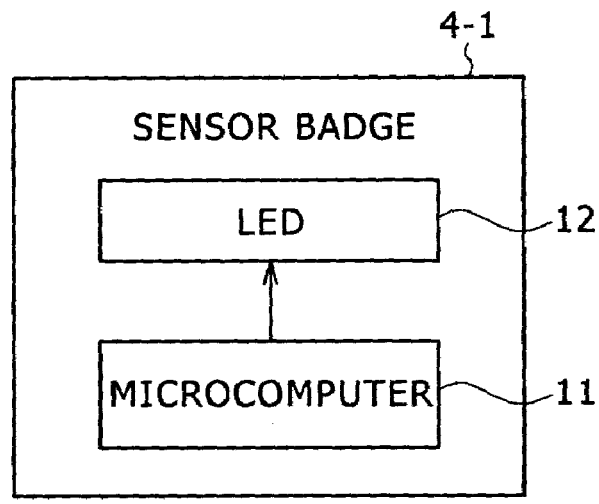
FIG. 4 is a schematic view showing a typical structure of a sensor badge included in FIG. 1.

FIG. 4 is a schematic view showing a typical structure of the sensor badge 4-1 included in FIG. 1. The sensor badges 4-2 and 4-3 also have the same structure.

The sensor badge 4-1 is made up of a microcomputer 11 and an LED (light-emitting diode) 12. The microcomputer 11 controls the LED 12 so that the latter emits a pattern representative of, say, the ID "0." Under control of the microcomputer 11, the LED 12 emits the pattern of light at a fixed frequency.

Figure 5:
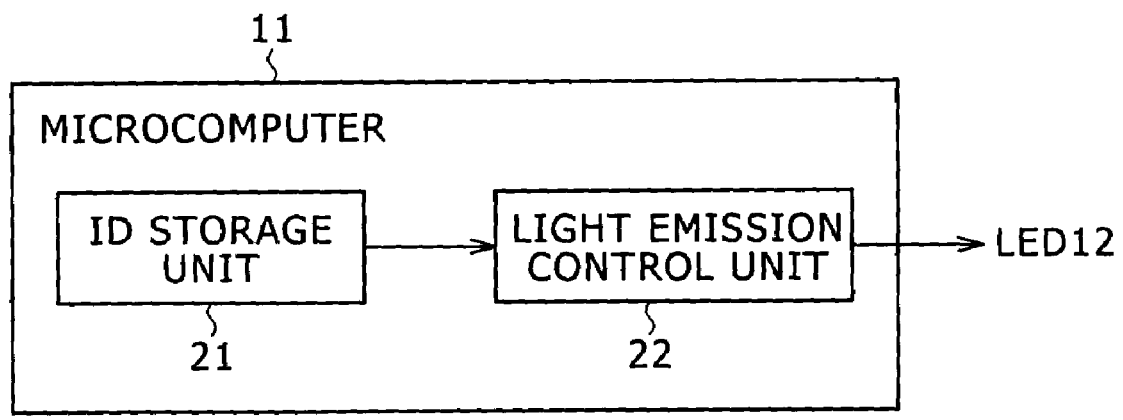
FIG. 5 is a block diagram showing a typical structure of a microcomputer.

FIG. 5 is a block diagram showing a typical structure of the microcomputer 11. An ID storage unit 21 stores the ID assigned to the microcomputer 11. A light emission control unit 22 reads the ID from the ID storage unit 21 and causes the LED 12 to emit the pattern of light representing the retrieved ID.

The ID assigned to the sensor badge 4-1 is indicated illustratively on its surface. Taking a look at the badge surfaces allows the user to identify the children. The user may rewrite the ID in the sensor badge 4-1 as needed by getting the personal computer 2 to connect with the sensor badge 4-1 using a cable.

Figure 6:
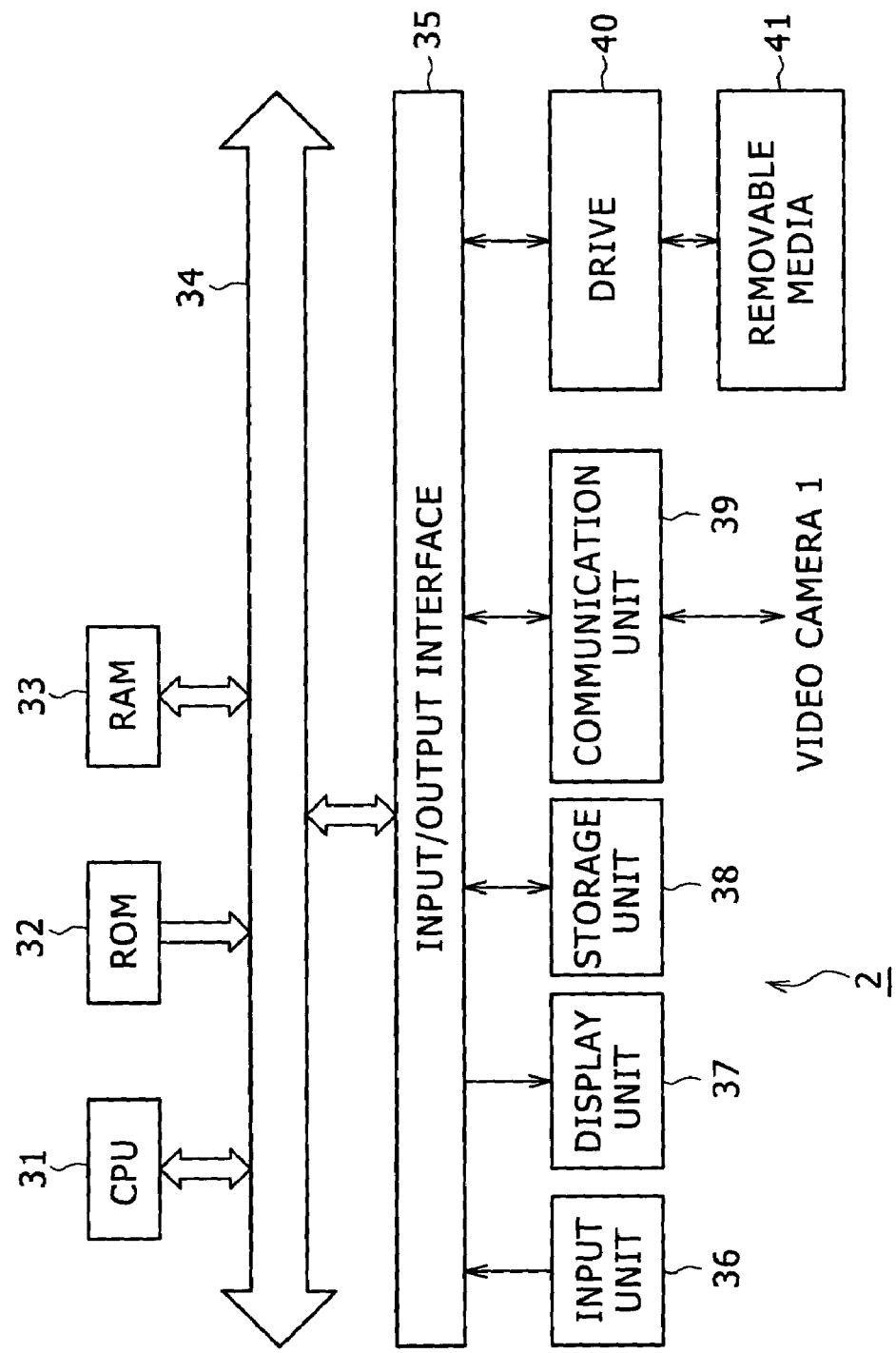
FIG. 6 is a block diagram showing a typical structure of a personal computer included in FIG. 1.

FIG. 6 is a block diagram showing a typical structure of the personal computer 2 included in FIG. 1. A CPU (central processing unit) 31 performs various processes in keeping with programs held in a ROM (read only memory) 32 or with programs loaded into a RAM (random access memory) 33 from a storage unit 38. The RAM 33 also accommodates data that may be needed by the CPU 31 in carrying out its diverse processes.

The CPU 31, ROM 32, and RAM 33 are interconnected via a bus 34. An input/output interface 35 is also connected to the bus 34.

The input/output interface 35 is connected to an input unit 36 made of a keyboard and a mouse, to a display unit 37 composed of an LCD (liquid crystal display) or the like, to the storage unit 38 such as a hard disk drive, and to a communication unit 39 that conducts wired or wireless communications with the video camera 1. The storage unit 38 holds illustratively the pictures and ID's captured from the video camera 1 via the communication unit 39.

A drive 40 is connected as needed to the input/output interface 35. Removable media 41 such as a magnetic disk, an optical disk, a magneto-optical disk, or a semiconductor memory may be loaded into the drive 40. Computer programs retrieved from the loaded removable medium are installed as needed into the storage unit 38. If the video camera 1 is designed to store acquired pictures onto the removable medium such as the optical disk or flash memory, then the pictures and ID's picked up by the video camera 1 may be carried by the medium before being placed into the personal computer 2 through the drive 40.

Figure 7:
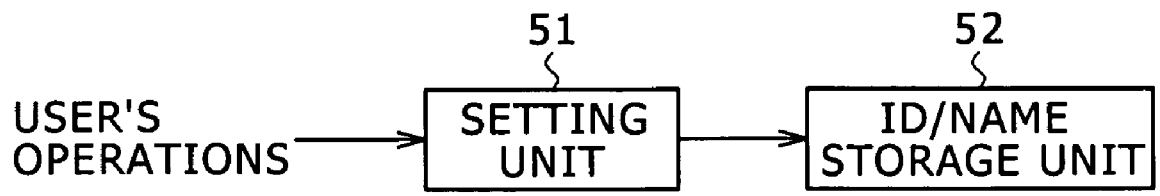
FIG. 7 is a block diagram showing a typical functional structure of the personal computer.

FIG. 7 is a block diagram showing a typical functional structure of the personal computer 2. At least part of the functional blocks in FIG. 7 may be implemented by the CPU 31 of FIG. 6 executing suitable programs.

A setting unit 51 is provided to accept the settings of ID's and corresponding names entered by the user through the input unit 36. The accepted ID's and names are forwarded from the setting unit 51 to an ID/name storage unit 52 for storage.

The ID/name storage unit 51 retains the ID's and corresponding names. This allow the personal computer 2 to identify the persons (i.e., their names) appearing in each of the scenes based on the association between the stored ID's and the pictures captured from the video camera 1.

Figure 8:
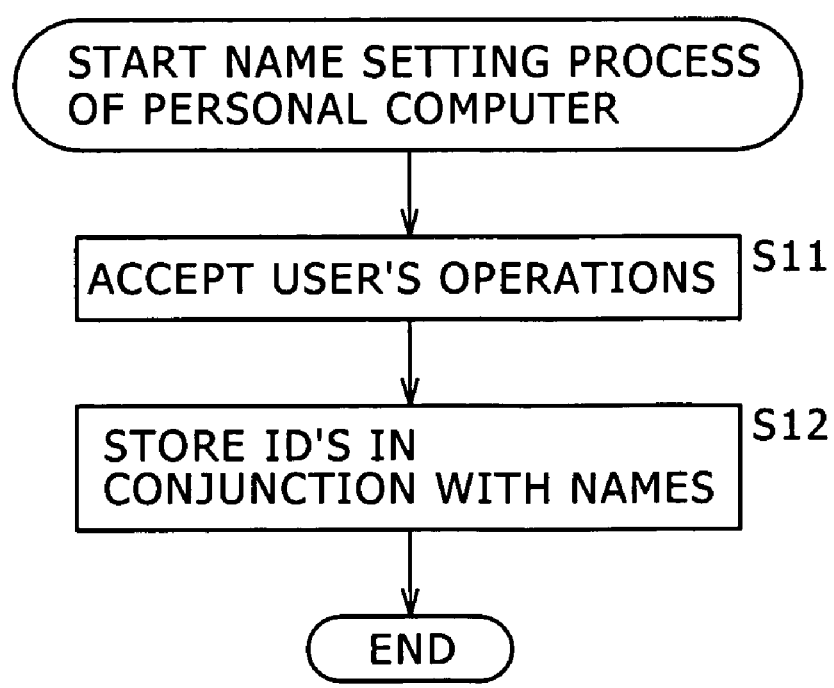
FIG. 8 is a flowchart of steps constituting a name setting process of the personal computer.

A name-setting process of the personal computer 2 is described below with reference to the flowchart of FIG. 8. This process is carried out in response to the user's operation in step S1 of FIG. 3.

In step S11, the setting unit 51 accepts the ID's and corresponding names set by the user through the input unit 36. In step S12, the accepted ID's and names are forwarded from the setting unit 51 to the ID/name storage unit 52 for storage. On the basis of the ID's and corresponding names thus stored, the personal computer 2 links scenes into clusters by the persons appearing therein. This and other processes of the personal computer 2 will be discussed later in more detail.

Figure 9:
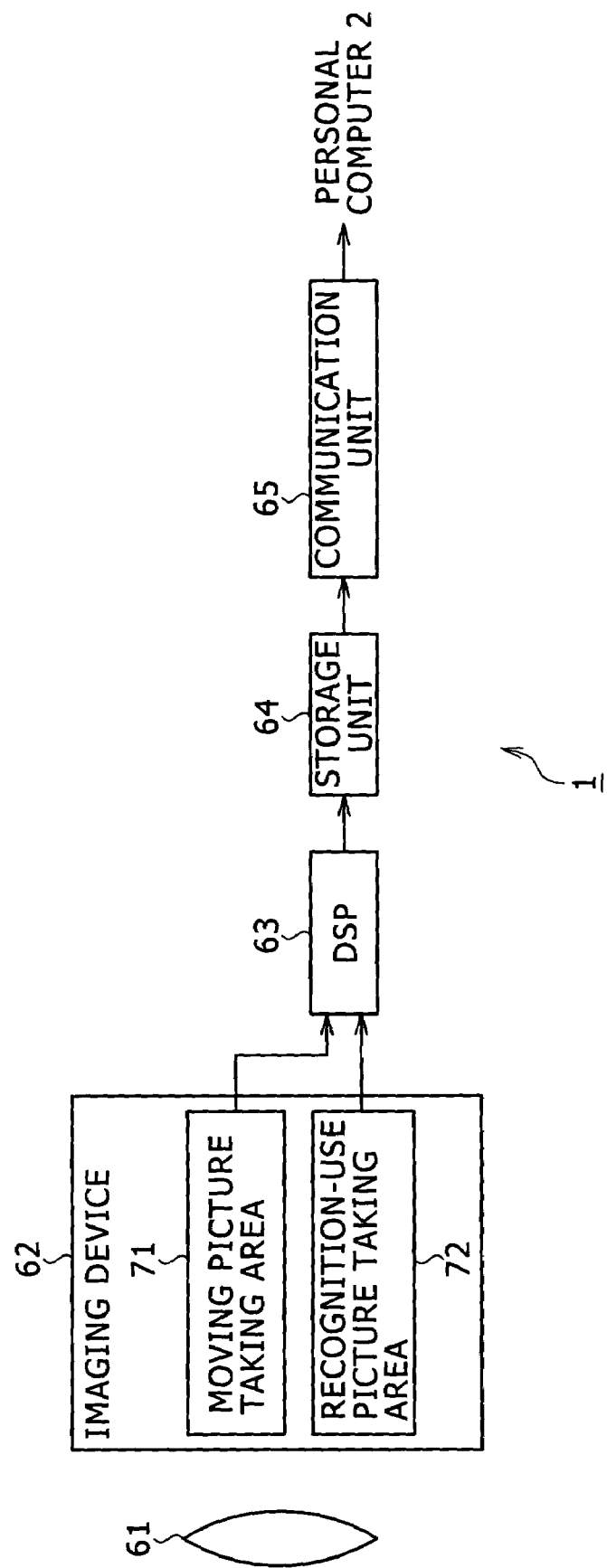
FIG. 9 is a schematic view showing a typical structure of a video camera included in FIG. 1.

FIG. 9 is a schematic view showing a typical structure of the video camera 1 in FIG. 1. An imaging device 62 is constituted by a CCD (charge coupled device) and CMOS (complementary metal oxide semiconductor). The pickup area of the device is made up of a moving picture taking area 71 and a recognition-use picture taking area 72.

The moving picture taking area 71 takes pictures illustratively at a frame rate of 30 frames per second, and outputs to a DSP (digital signal processor) 63 signals (i.e., picked-up pictures) reflecting the light received through a lens 61. The recognition-use picture taking area 72 takes pictures at a faster frame rate than the moving picture taking area 71 and outputs acquired luminance signals to the DSP 63.

The picture-taking process of the moving picture taking area 71 and that of the recognition-use picture taking area 72 are carried out in synchronism with the user's operations to start and stop a picture-taking session. The pickup area of the moving picture taking area 71 is substantially the same as that of the recognition-use picture taking area 72. It follows that the child whose ID is recognized in the pictures taken by the recognition-use picture taking area 72 also appears in the pictures taken at the same time by the moving picture taking area 71.

The DSP 63 recognizes ID's in the pictures coming from the recognition-use picture taking area 72. Illustratively, the DSP 63 recognizes the light-emitting patterns (i.e., ID's) of the sensor badges 4 by chronologically comparing luminance changes in the pictures taken by the recognition-use picture taking area 72. The DSP 63 recognizes each ID at intervals of, say, one second. Furthermore, the DSP 63 stores into the storage unit 64 the pictures supplied from the moving picture taking area 71, in conjunction with the recognized ID's. Techniques for recognizing ID's from picked-up pictures are illustratively disclosed in detail by Japanese Patent Laid-open No. 2000-214945.

The storage unit 64 is typically constituted by a storage medium such as a hard disk, DVD (digital versatile disk), a flash memory or a magnetic tape, and by a drive that drives the medium that is loaded therein.

The communication unit 65 performs wired communications with the personal computer 2 through an IEEE (Institute of Electrical and Electronics Engineers) 1394 cable or a USB (Universal Serial Bus) cable, and carries out wireless communications with the computer 2 in accordance with IEEE 802.11a/b/g or like standards. The communications allow the pictures and ID's retrieved from the storage 64 to be output to the personal computer 2.

Figures 10, 11:
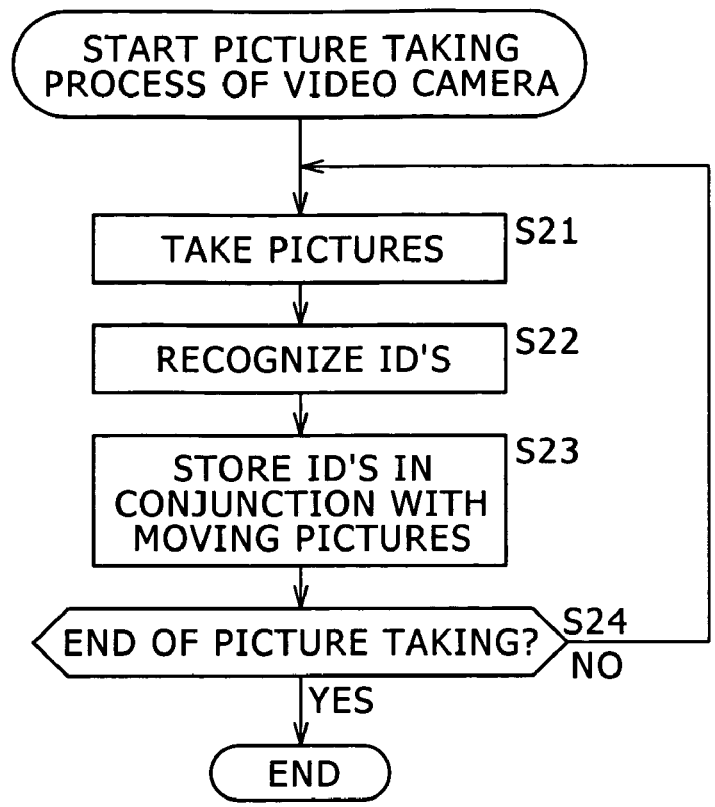
FIG. 10 is a flowchart of steps constituting a picture taking process of the video camera.
FIG. 11 is a tabular view showing an example of how ID's are recognized.

Described below with reference to the flowchart of FIG. 10 is a picture-taking process of the video camera 1. This process is carried out in response to the user's operation in step S2 of FIG. 3.

When the user gives an instruction to start the picture-taking process, step S21 is reached. In step S21, the imaging device 62 causes the moving picture taking area 71 and recognition-use picture taking area 72 to start taking pictures. The pictures taken by the moving picture taking area 71 and those taken by the recognition-use picture taking area 72 are output to the DSP 63.

In step S22, the DSP 63 recognizes ID's repeatedly at predetermined intervals from the pictures sent by the recognition-use picture taking area 72 of the imaging device 62. In step S23, the DSP 63 stores the pictures coming from the moving picture taking area 71 into the storage unit 64, in conjunction with the recognized ID's.

In step S24, a check is made to determine whether the user has given an instruction to end the picture-taking process. Step S21 and the subsequent steps are repeated until the user's instruction to end the picture-taking process is detected. When the instruction to end the picture-taking process is detected, the picture-taking process is terminated.

When the steps above are repeated in response to the user's operations, the storage unit 64 stores the pictures in which diverse combinations of the children wearing the sensor badges 4 appear, such as pictures in which only the child 3-1 appears, pictures in which the children 3-1 and 3-2 appear together, and so on.

FIG. 11 is a tabular view showing an example of how ID's are recognized. FIG. 11 shows how the ID's "0," "1" and "2" (representing the children 3-1 through 3-3 respectively) are either recognized or not recognized in each of time intervals (recognition times) following a start of the picture-taking process.

In the example of FIG. 11, the ID "0" and ID "2" are recognized and the ID "1" is not recognized in a recognition time "Time 0," one second after the start of the process. That means the pictures taken by the moving picture taking area 71 during the recognition time "Time 0" have the children 3-1 and 3-3 appearing therein.

Likewise, the ID "0" and ID "1" are recognized and the ID "2" is not recognized in a recognition time "Time 1." That is, the pictures taken by the moving picture taking area 71 during the recognition time "Time 1" have the children 3-1 and 3-2 appearing therein.

Data that is representative of such results of ID recognition during the different time intervals is stored into the storage unit 64 by the process shown in FIG. 10. The entries in FIG. 11 indicative of how the ID's were either recognized or not recognized are called raw ID data because they are stored unprocessed.

Figure 12:
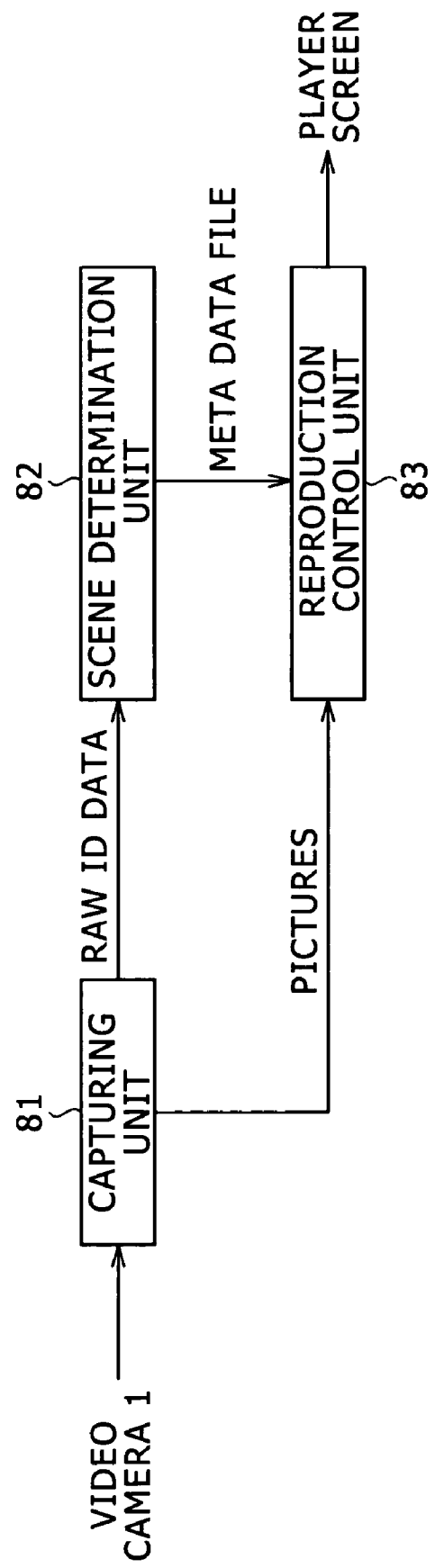
FIG. 12 is a block diagram showing another typical functional structure of the personal computer.

What follows is a description of how the personal computer 2 processes raw ID data along with the pictures taken by the video camera 1. Also explained is a structure of the personal computer 2 in connection with its data processing operations. FIG. 12 is a block diagram showing another typical functional structure of the personal computer 2. As with the structure in FIG. 7, at least part of the functional blocks in FIG. 12 may be implemented by the CPU 31 of FIG. 6 executing suitable programs.

A capturing unit 81 communicates with the video camera 1 through the communication unit 39 (FIG. 6) so as to capture picked-up pictures and raw ID data from the video camera 1. The capturing unit 81 outputs the captured raw ID data to a scene determination unit 82 and the captured pictures to a reproduction control unit 83.

Based on the raw ID data coming from the capturing unit 81, the scene determination unit 82 links scenes of the pictures into clusters, and outputs a meta data file describing the results of the clustering process to the reproduction control unit 83. The meta data file output by the scene determination unit 82 includes information about how the pictures sent from the capturing unit 81 to the reproduction control unit 83 are grouped into categories, and information about how the pictures are linked together.

The reproduction control unit 83 reproduces the pictures fed from the capturing unit 81 in accordance with the description of the meta data file supplied by the scene determination unit 82. The player screen displayed by the reproduction control unit 83 on the display unit 37 displays only the pictures of the user-selected category, as will be discussed later. Apart from the currently reproduced picture, the pictures linked to that picture are arranged to appear on the screen.

As described, the personal computer 2 reproduces picked-up pictures based on the result of the clustering process which in turn was carried out using the outcome of the ID recognizing process.

Figure 13:
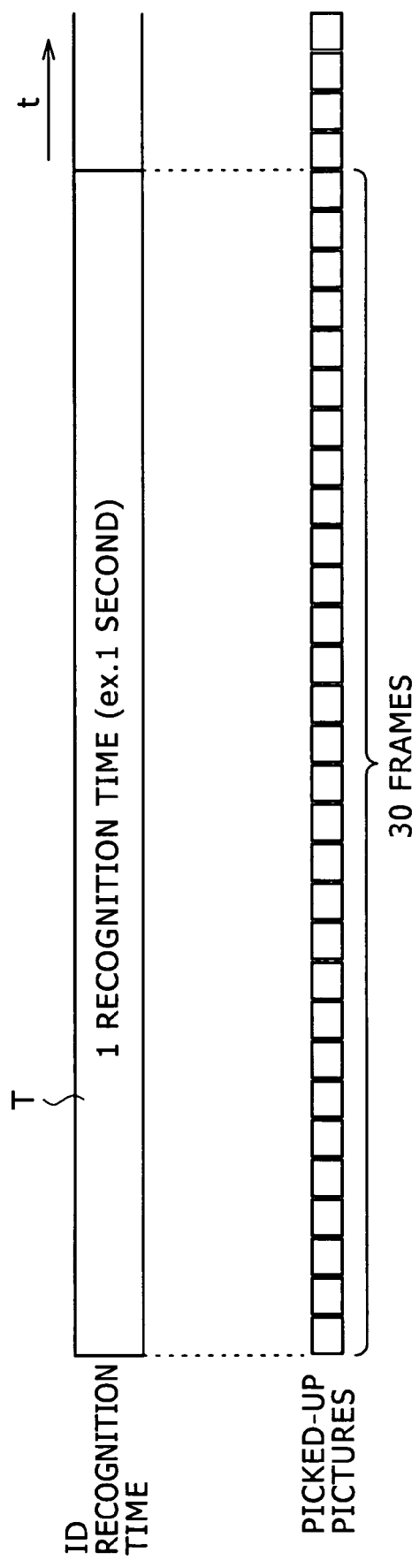
FIG. 13 is a schematic view showing how an ID recognition time is related to picked-up pictures.

FIG. 13 is a schematic view showing how an ID recognition time is related to picked-up pictures. Suppose that pictures were taken by the NTSC (National Television System Committee) system, that the picture-taking process and ID recognizing process were started simultaneously, and that a single ID recognition time is one second. In such a case, a scene of 30 frames (pictures) was taken during a recognition time T as indicated in FIG. 13.

The scene determination unit 82 links recognition times into clusters in accordance with the results of ID recognition such as those represented by the raw ID data in FIG. 11. Since the range in which to pick up pictures for ID recognition purposes is substantially the same as the range in which to take pictures for reproduction (i.e., pictures in the lower part of FIG. 13), the act of linking the recognition times into clusters using the outcome of the ID recognizing process is equivalent to linking into clusters the pictures taken during the same recognition times, the pictures being clustered according to the subject appearing therein.

As described above, to reproduce moving pictures based on the ID recognition times linked into clusters signifies reproducing the moving pictures as they have been linked into clusters according to the subject appearing therein. The personal computer 2 reproduces moving pictures in this manner.

Figure 14:
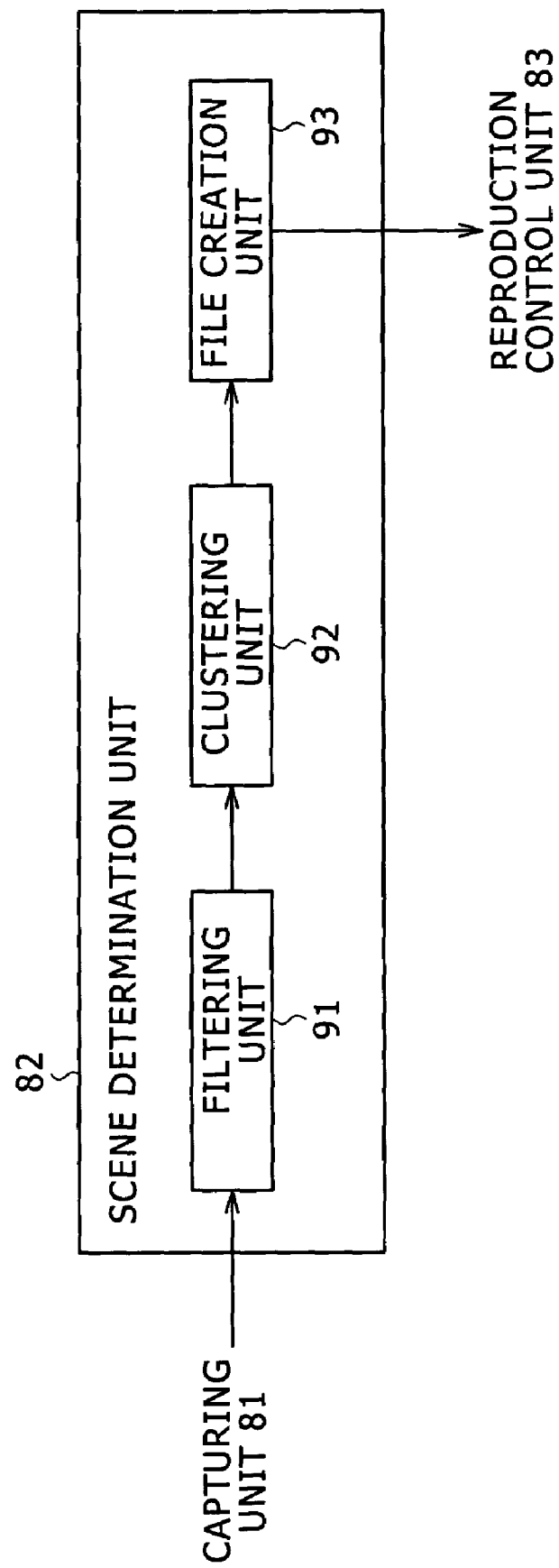
FIG. 14 is a block diagram showing a typical structure of a scene determination unit included in FIG. 12.

FIG. 14 is a block diagram showing a typical structure of the scene determination unit 82 in FIG. 12, the unit linking picked-up pictures into clusters by resorting to the recognition times linked into clusters. The scene determination unit 82 is made up of a filtering unit 91, a clustering unit 92, and a file creation unit 93. The filtering unit 91 will be described first.

Figure 15:
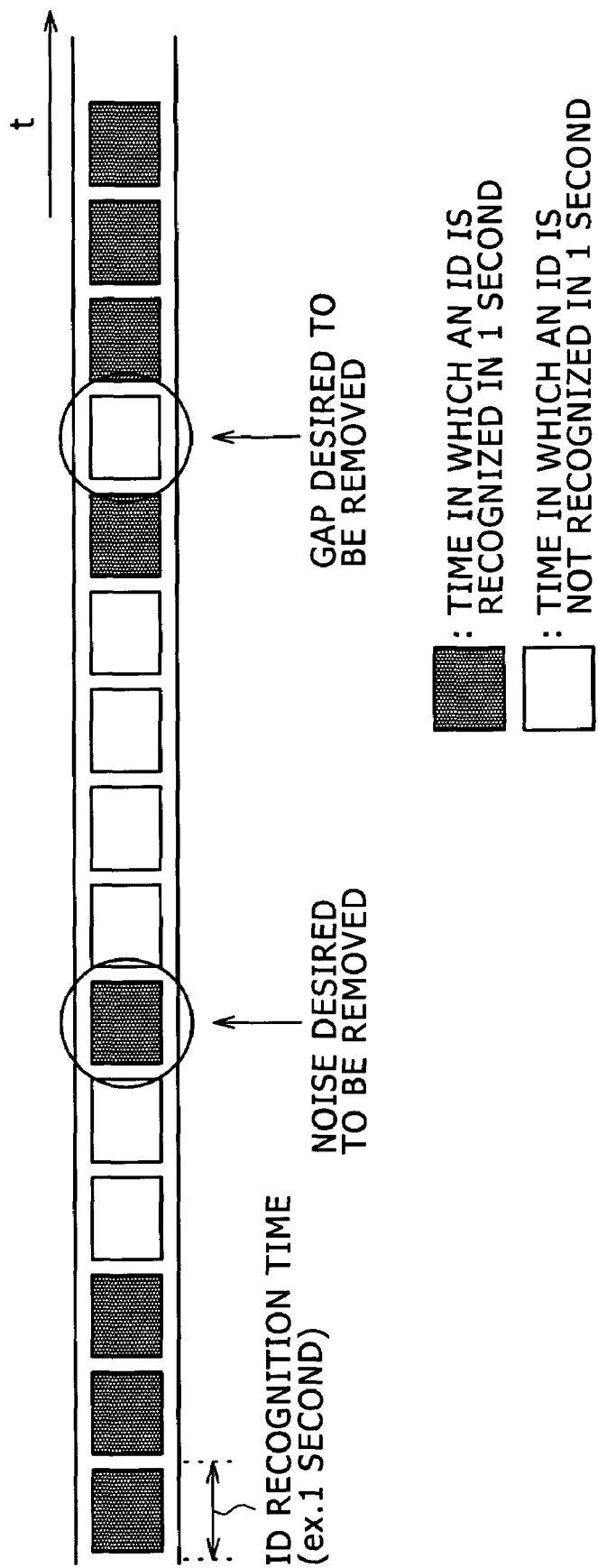
FIG. 15 is a schematic view showing an example of filtering.

As shown in FIG. 15, the filtering unit 91 carries out two processes. One process is a process for removing as a noise a given subject that comes into view momentarily, i.e., where a corresponding ID is recognized only momentarily according to the raw ID data supplied from the capturing unit 81. The other process is a process for filling a gap in which a given subject has dropped out instantaneously from view, i.e., where a corresponding ID is not recognized instantaneously in accordance with the raw ID data.

Each of the blocks arranged chronologically in FIG. 15 represents a single ID recognition time. A shaded block means that an ID is recognized during the corresponding recognition time, and a blank block signifies that no ID is recognized in the corresponding recognition time. That is, FIG. 15 gives a chronological description of how ID's are either recognized or not recognized over time as illustrated by the raw ID data in FIG. 11.

Figure 16:
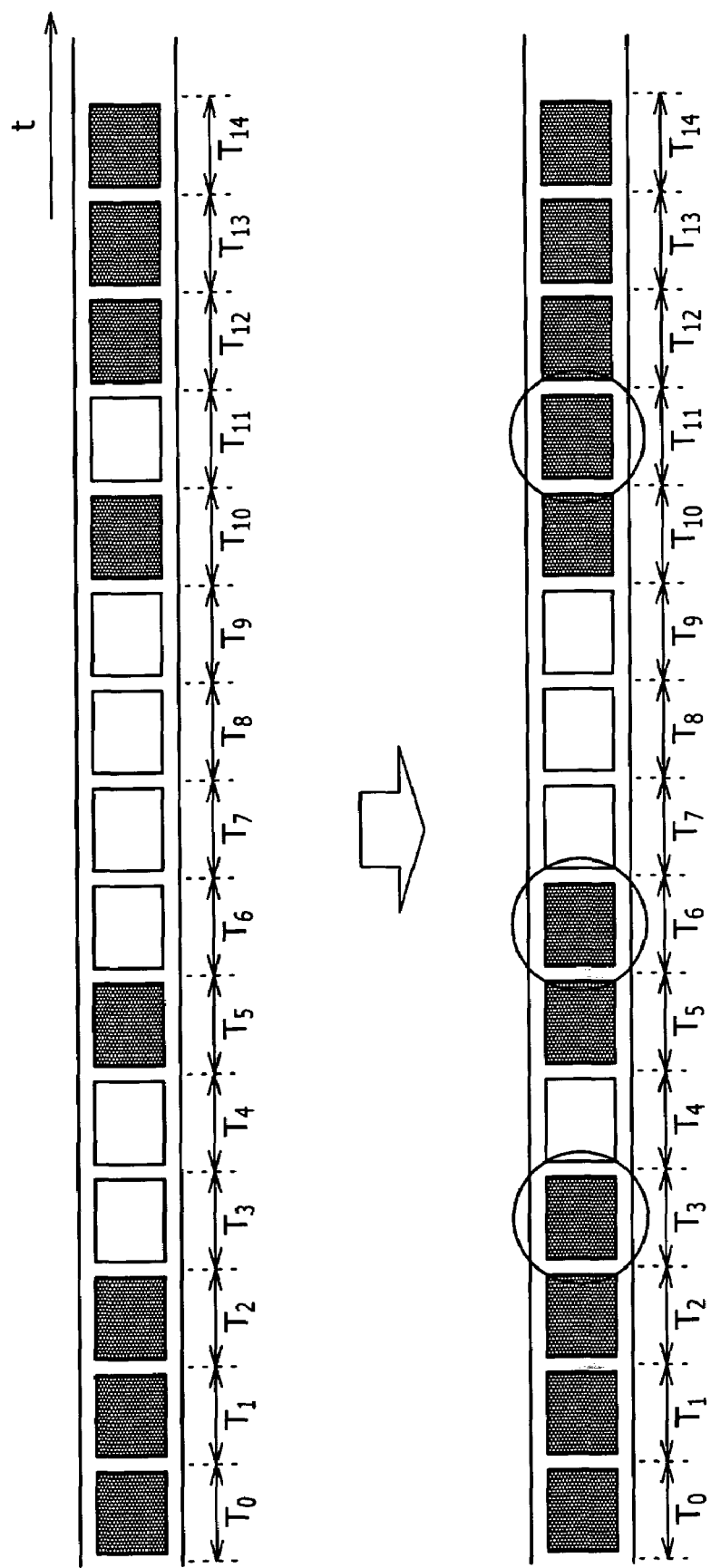
FIG. 16 is a schematic view showing another example of filtering.

FIG. 16 is a schematic view showing another example of filtering by the filtering unit 91 when ID's are not recognized momentarily (e.g., one ID during one recognition time each), the unit acting to fill the gaps formed by the dropped-out ID's.

FIG. 16 shows whether a given ID is recognized or not recognized in each of recognition times $T_0$ through $T_{14}$. In the upper part of FIG. 16, ID's are shown recognized during the recognition times $T_0$ through $T_2$, $T_5$, $T_{10}$, and $T_{12}$ through $T_{14}$. The ID's are not recognized during the remaining recognition times $T_3$ and $T_4$, $T_6$ through $T_9$, and $T_{11}$.

Where the results of such ID recognition are supplied from the capturing unit 81, it might happen that an ID is recognized in one recognition time preceding the recognition time of interest. In that case, if the ID is not recognized during the recognition time of interest constituting a gap, it may be assumed that the ID is recognized during that time of interest so that the gap is filled.

Illustratively, suppose that the recognition time $T_3$ in FIG. 16 is the recognition time of interest. Because the ID is recognized in the recognition time $T_2$ preceding the recognition time $T_3$, the filtering unit 91 assumes that the ID is also recognized in the recognition time $T_3$ as shown in the lower part of FIG. 16.

If the recognition time $T_6$ is assumed to be the recognition time of interest, then the filtering unit 91 assumes that the ID is recognized in that recognition time $T_6$ because the ID is recognized in the immediately preceding recognition time $T_5$, as shown in the lower part of FIG. 16.

Likewise, if the recognition time $T_{11}$ is assumed to be the recognition time of interest, the filtering unit 91 assumes that the ID is recognized in that recognition time $T_{11}$ because the ID is recognized in the immediately preceding recognition time $T_{10}$, as shown in the lower part of FIG. 16.

Figure 17:
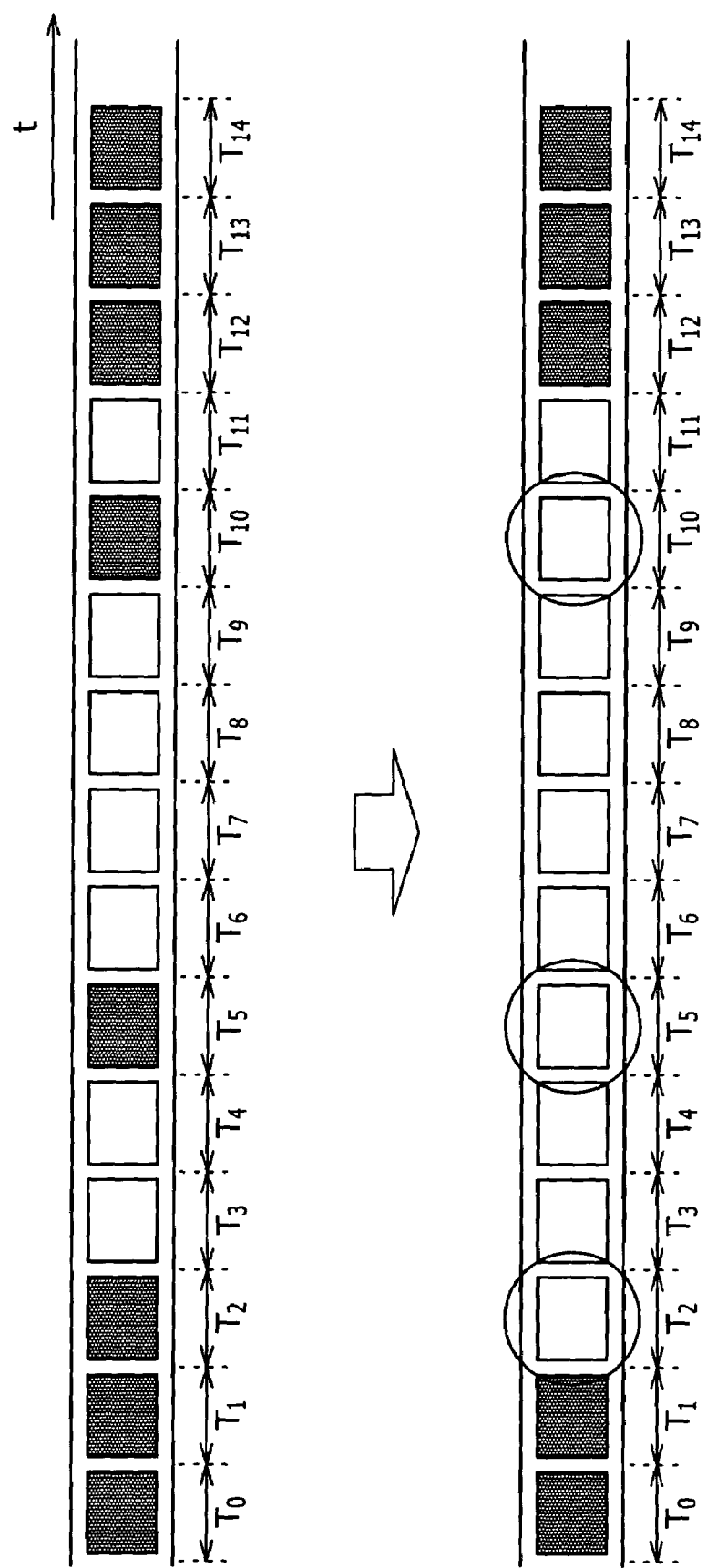
FIG. 17 is a schematic view showing a further example of filtering.

FIG. 17 is a schematic view showing a further example of filtering by the filtering unit 91, when ID's are recognized momentarily (e.g., one ID during one recognition time each), the unit acting to remove the recognized ID's as noises.

FIG. 17 also shows whether a given ID is recognized or not recognized in each of recognition times $T_0$ through $T_{14}$. In the example of FIG. 17, as in FIG. 16, ID's are shown recognized during the recognition times $T_0$ through $T_2$, $T_5$, $T_{10}$, and $T_{12}$ through $T_{14}$. The ID's are not recognized during the remaining recognition times $T_3$ and $T_4$, $T_6$ through $T_9$, and $T_{11}$.

Where the results of such ID recognition are supplied from the capturing unit 81, it might happen that the ID is not recognized in one recognition time following the recognition time of interest. In that case, if the ID is recognized during the recognition time of interest, then the recognized ID is assumed to be a noise that should be removed.

Illustratively, suppose that the recognition time $T_2$ in FIG. 17 is the recognition time of interest. Because the ID is not recognized in the recognition time $T_3$ following the recognition time $T_2$, the filtering unit 91 assumes that no ID is recognized in the recognition time $T_2$ as shown in the lower part of FIG. 17.

If the recognition time $T_5$ is assumed to be the recognition time of interest, then the filtering unit 91 assumes that the ID is not recognized in that recognition time $T_5$ because the ID is not recognized in the immediately following recognition time $T_6$, as shown in the lower part of FIG. 17.

Likewise, if the recognition time $T_{10}$ is assumed to be the recognition time of interest, the filtering unit 91 assumes that the ID is not recognized in that recognition time $T_{10}$ because the ID is not recognized in the immediately following recognition time $T_{11}$, as shown in the lower part of FIG. 17.

In the description that follows, the process of filing a momentarily dropped-out ID as shown in FIG. 16 will be called the "fattening" process, and the process of removing a momentarily recognized ID as a noise, as indicated in FIG. 17, will be called the "slimming" process.

In FIGS. 16 and 17, it is assumed that the time interval to be filled to compensate for a dropped-out ID and the time interval to be removed as a noise formed by a dropped-in ID constitute one recognition time each. However, this is not limitative of the invention. Alternatively, if an ID is not recognized for two consecutive recognition times, these recognition times might be filled with the ID collectively depending on what is recognized or not recognized before and after the ID-free two recognition times; if an ID is recognized for two consecutive recognition times, these recognition times might be removed collectively as a noise depending on what is recognized or not recognized before and after the ID-filled two recognition times.

Figure 18:
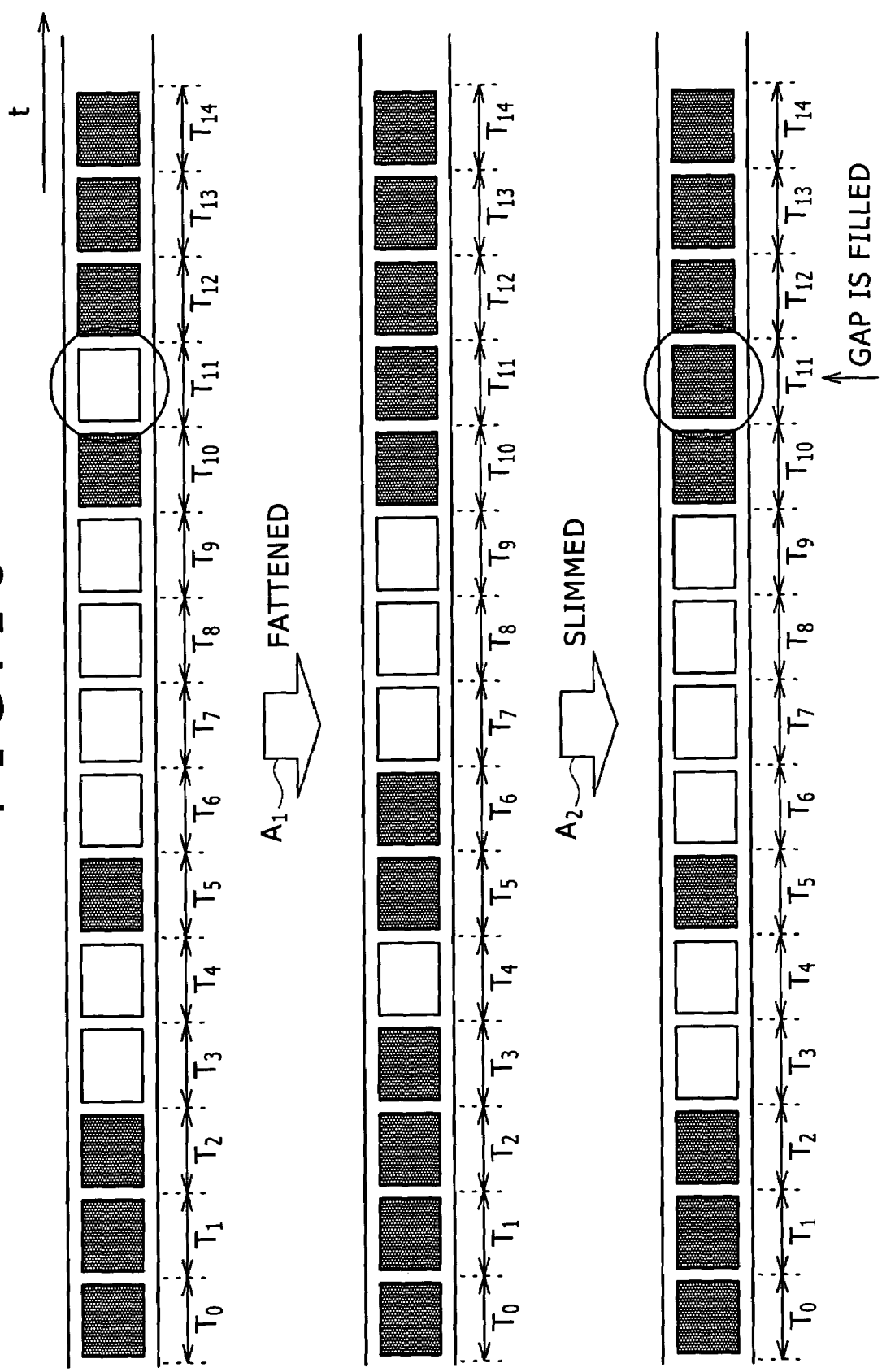
FIG. 18 is a schematic view showing an even further example of filtering.

FIG. 18 is a schematic view showing an even further example of filtering by the filtering unit 91. As indicated in FIG. 18, the filtering unit 91 performs the fattening process a predetermined number of times in order to obtain a time series indicated by a hollow downward arrow $A_1$. The filtering unit 91 then carries out the slimming process on that time series a predetermined number of times to acquire a time series indicated by another hollow downward arrow $A_2$.

When the above-described processes are carried out, the gap constituted by the recognition time $T_{11}$ is filled; the recognition time $T_{11}$ is a time interval in which the ID was not recognized prior to the processing by the filtering unit 91.

Figure 19:
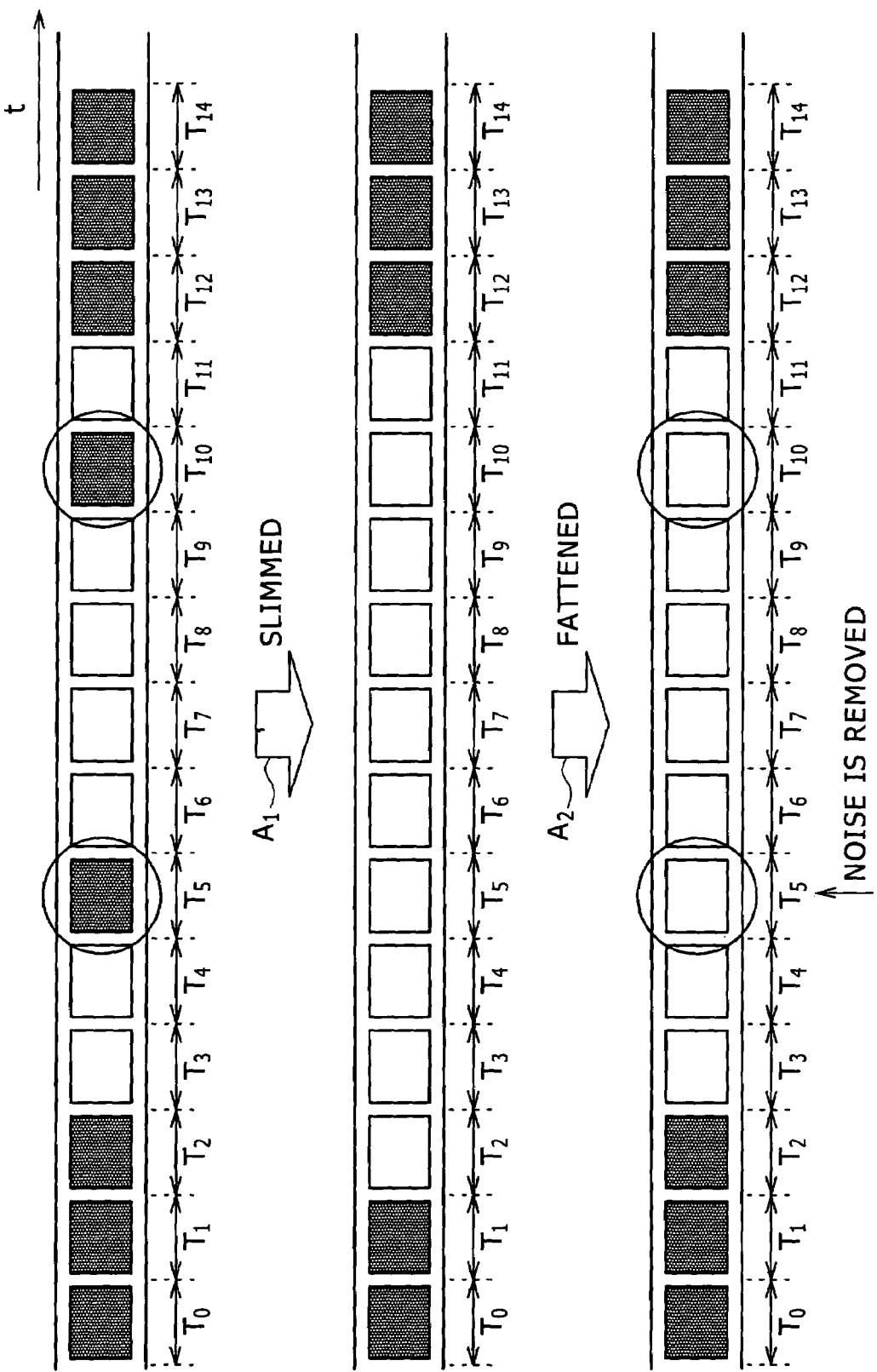
FIG. 19 is a schematic view showing a still further example of filtering.

FIG. 19 is a schematic view showing a still further example of filtering by the filtering unit 91. The filtering unit 91 performs the fattening and sliming processes a predetermined number of times each, in that order, as shown in FIG. 18. This provides the time series indicated in FIG. 18. The filtering unit 91 then carries out the slimming process and fattening process a predetermined number of times each, in that order, on that time series, thereby acquiring a time series indicated by a hollow downward arrow $A_2$ in FIG. 19. As a result, the noises represented by the recognition times $T_5$ and $T_{10}$ are removed, each of the recognition times $T_5$ and $T_{10}$ being preceded and followed by blocks in which no ID is recognized.

As described, the filtering unit 91 performs the fattening and slimming processes a predetermined number of times each in an appropriate order regarding each of the ID's included in the supplied raw ID data, whereby the raw ID data is suitably processed. The filtering unit 91 then outputs processed data representative of the time series of each of the ID's involved, the data being sent to the clustering unit 92. In the description that follows, the processed data forwarded from the filtering unit 91 to the clustering unit 92 will be referred to as the processed ID data.

The clustering unit 92 shown in FIG. 14 will now be described. The clustering unit 92 links ID recognition times (i.e., scenes of corresponding times) into clusters based on the processed ID data coming from the filtering unit 91. The clustering process divides the scenes into predetermined categories whose meanings are defined illustratively by the user.

FIG. 20 is a tabular view showing typical meanings of categories 0 through 3 established by the user. The category 1 is a category of the scenes in which only "my child" appears (e.g., child A in the foregoing examples). This is the most important of the categories 0 through 3.

The category 1 is a category of the scenes in which "my child" and "someone else's child" appear (e.g., scenes in which the children A and B appear). The category 1 is next to the category 0 in importance.

The category 2 is a category of the scenes in which only "someone else's children" appear (e.g., scenes in which children other than the child A appear). The category 2 is next to the category 1 in importance.

The category 3 is a category of the scenes in which no one appears. This category is established as a category for meaningless scenes.

The clustering unit 92 performs its clustering process in such a manner that the scenes involved are grouped into each of the established categories having their appropriately assigned meanings.

Figure 21:
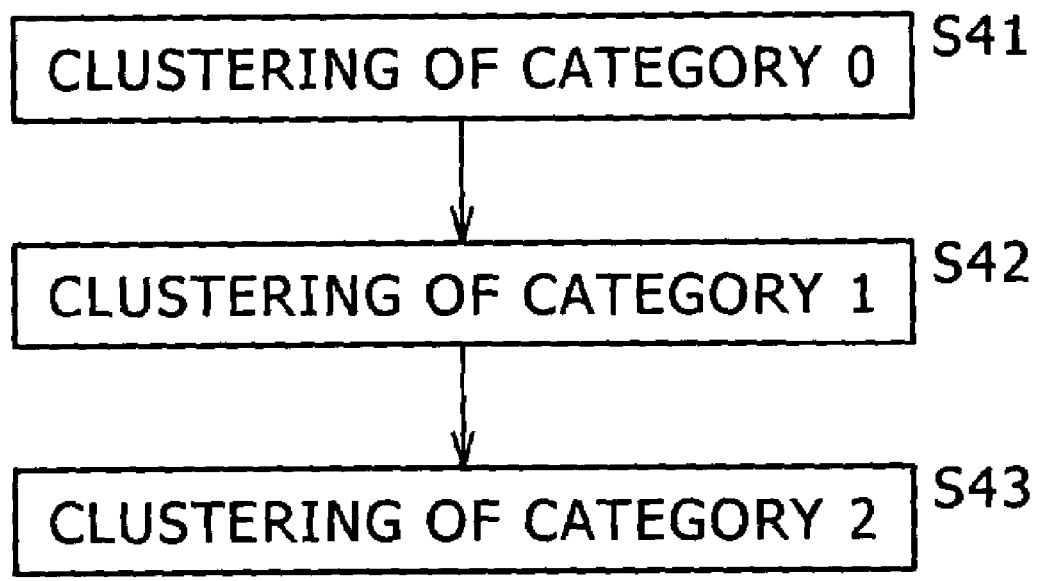
FIG. 21 is a schematic flow diagram showing a typical order of clustering processes.

FIG. 21 is a schematic flow diagram showing a typical order of clustering processes carried out by the clustering unit 92. Illustratively, if the categories 0, 1, 2, and 3 have been established in descending order of importance as shown in FIG. 20, a clustering process is first performed on the most important category 0 (in step S41). At the end of the clustering process on the category 0, another clustering process (in step S42) is carried out on the category 1 that is next to the category 0 in importance. Upon completion of the clustering process on the category 1, another clustering process is executed on the category 2 (in step S43). The scenes not belonging to any of these category are deemed to fall into the category 3.

Figure 22:
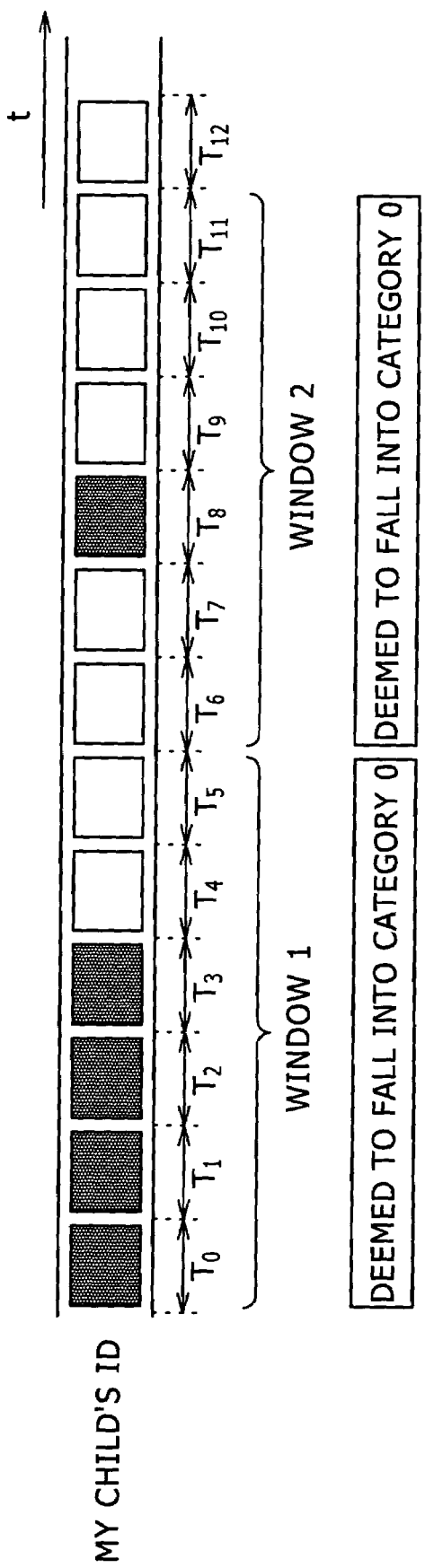
FIG. 22 is a schematic view showing an example of clustering.

FIG. 22 is a schematic view showing an example of how the clustering of the category 0 is performed (in step S41 of FIG. 21). As shown in FIG. 22, the clustering unit 92 focuses on the time series of the ID of "my child" among the processed ID data coming from the filtering unit 91, in order to search for the scenes in which only "my child" appears. An applicable category is determined for each "window" formed by a predetermined number of consecutive recognition times.

For example, since any scene in which only "my child" appears is the most important, the clustering unit 92 finds the category 0 applicable to any window including at least one recognition time in which the ID of "my child" is recognized.

In the example of FIG. 22, each window is constituted by six consecutive recognition times. Each of windows 1 and 2 includes recognition times in which the ID of "my child" is recognized (i.e., recognition times $T_0$ through $T_3$ in the window 1 and recognition time $T_8$ in the window 2). Thus the windows 1 and 2 are deemed to fall into the category 0.

When applicable categories have been determined for all windows in which "my child" appears, the clustering process on the category 0 is terminated.

As described, the clustering of the category 0 involves focusing solely on the time series of the ID of "my child" in order to find the scenes in which "my child" alone appears. The clustering process on the category 1, as will be discussed later, focuses on the time series of the ID's not only of "my child" but also of "someone else's child." The windows including the recognition times in which the ID's of not only "my child" but also "someone else's child" are recognized are then deemed to fall into the category 1. Of the windows found to fall into the category 0 in FIG. 22, the window including the recognition times in which the ID of "someone else's child" is recognized is changed into the category 1. As a result, only the windows including solely the recognition times in which the ID of "my child" is recognized are deemed to fall into the category 0.

Figure 23:
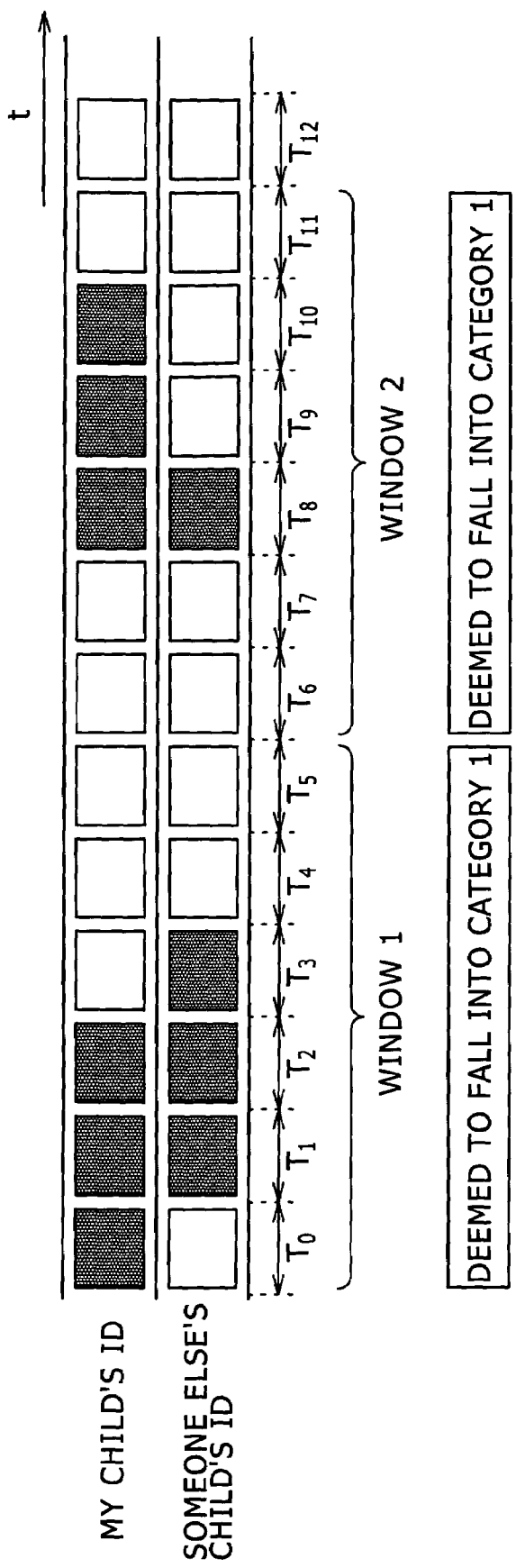
FIG. 23 is a schematic view showing another example of clustering.

FIG. 23 is a schematic view showing an example of the clustering of the category 1 (step S42 in FIG. 21). As with the clustering of the category 0, the clustering unit 92 focuses on the time series of the ID's not only of "my child" but also of "someone else's child" among the processed ID data coming from the filtering unit 91, in order to search for the scenes in which "my child" and "someone else's child" appear. An applicable category is determined for each of the windows involved.

Illustratively, since any scene in which only "my child" appears is the most important, the clustering unit 92 finds the category 1 applicable to any window including at least one recognition time in which the ID of "my child" is recognized, as well as recognition times in which the ID of "someone else's child" is recognized.

In the example of FIG. 23, windows 1 and 2 include recognition times in which the ID of "my child" is recognized (i.e., recognition times $T_0$ through $T_2$ in the window 1 and recognition times $T_8$ through $T_{10}$ in the window 2) and recognition times in which the ID of "someone else's child" is recognized (recognition times $T_1$ through $T_3$ in the window 1 and recognition time $T_8$ in the window 2). Thus the windows 1 and 2 are deemed to fall into the category 1.

When applicable categories have been determined for all windows in which the ID's of "my child" and "someone else's child" are recognized, the clustering process on the category 1 is terminated.

Figure 24:
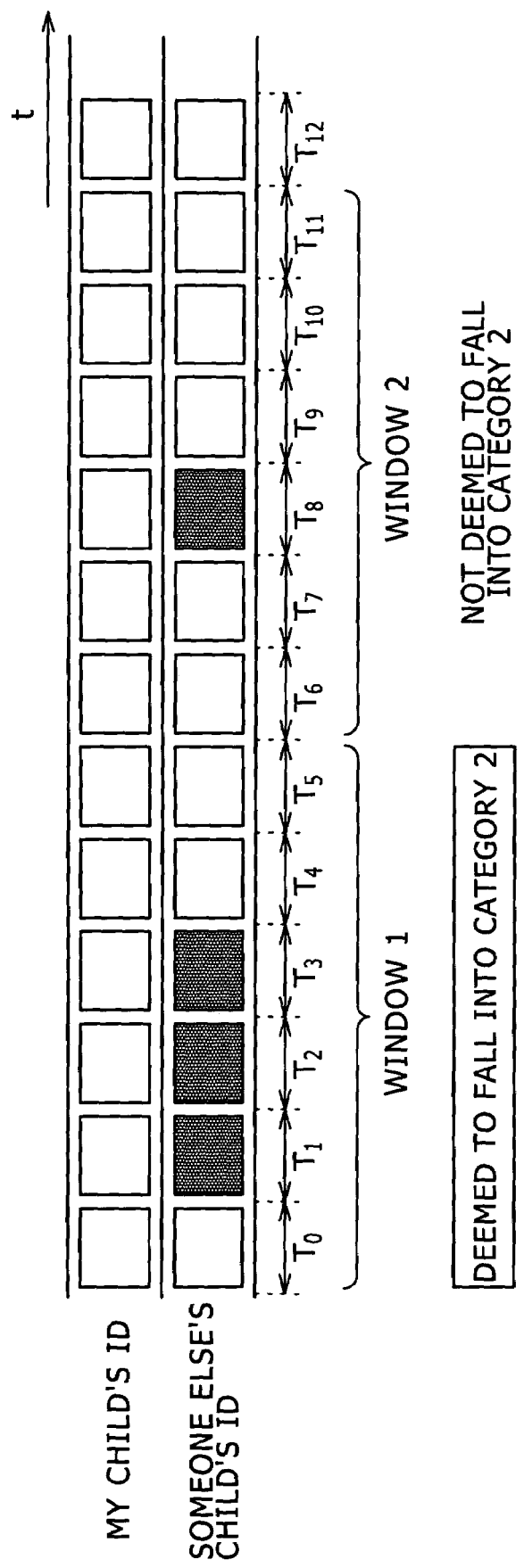
FIG. 24 is a schematic view showing a further example of clustering.

FIG. 24 is a schematic view showing an example of the clustering of the category 2 (step S43 in FIG. 21). As with the clustering of the categories 0 and 1, the clustering unit 92 focuses on the time series of the ID's of "my child" and "someone else's child" among the processed ID data coming from the filtering unit 91, in order to search for the scenes in which only "someone else's child" appears. An applicable category is determined for each of the windows involved.

For example, the clustering unit 92 checks to determine whether the ID of "someone else's child" alone is recognized in more than half the duration constituting a given window. If the result of the check is affirmative, that window is deemed to fall into the category 2.

In the example of FIG. 24, the category 2 is found applicable to the window 1 in which the ID of "someone else's child" alone is recognized in recognition times $T_1$ through $T_3$ constituting more than a half of the duration of the window 1 (i.e., made up of six recognition times $T_0$ through $T_5$).

Meanwhile, the category 2 is not found applicable to the window 2 in which the ID of "someone else's child" is recognized only in the recognition time $T_8$ (out of 6 recognition times $T_6$ through $T_{11}$). That is, the ID of "someone else's child" is not recognized in more than half of the duration of the window 2.

When applicable categories have been determined for all windows in like manner, the clustering process on the category 2 is terminated.

Figure 25:
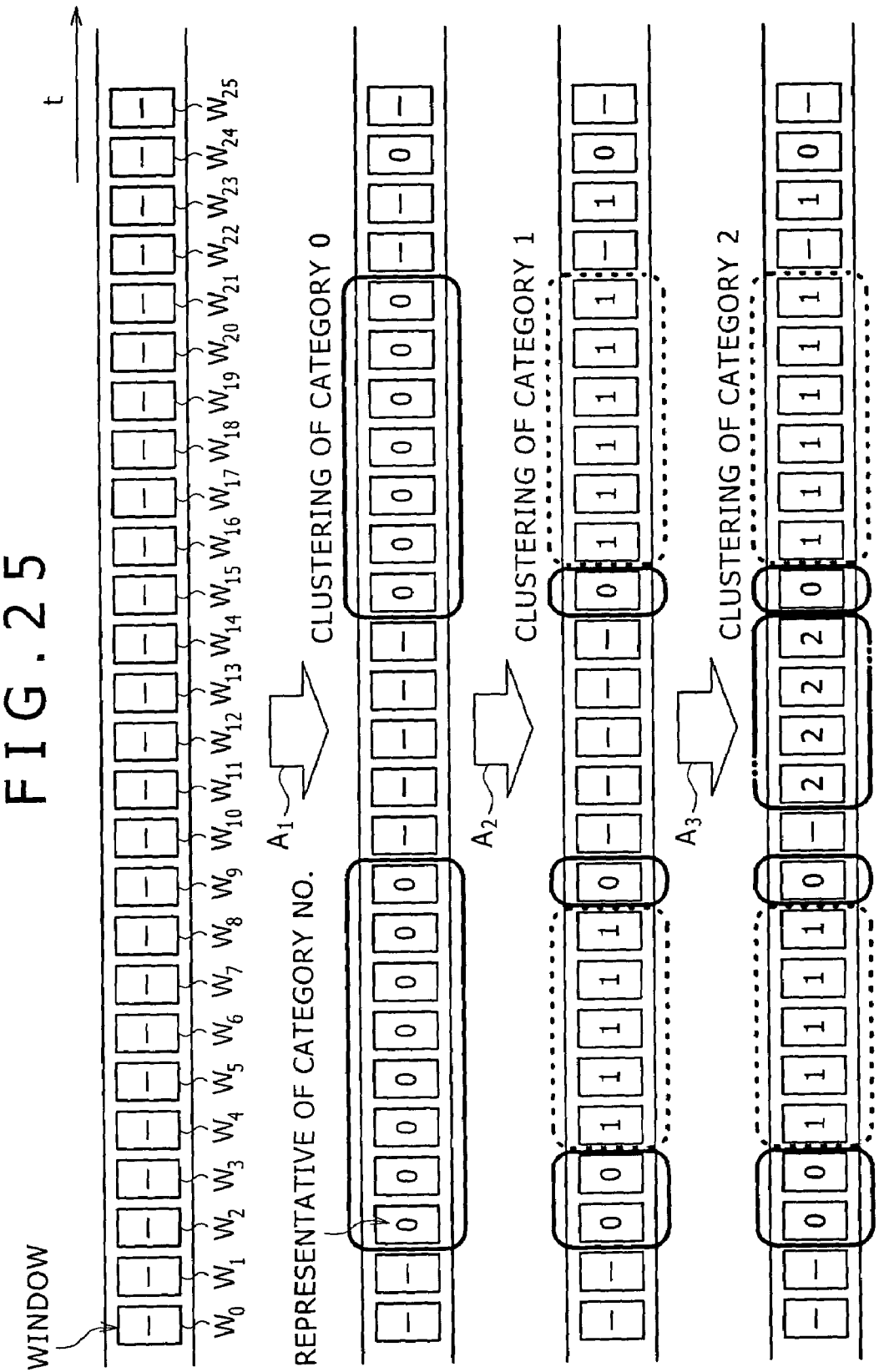
FIG. 25 is a schematic view showing an even further example of clustering.

FIG. 25 is a schematic view showing results of clustering processes carried out by the clustering unit 92. Each of the blocks indicated in FIG. 25 represents a single window (i.e., formed by a predetermined number of consecutive recognition times). The numeral in each block denotes the category of the window represented by that block. FIG. 25 shows windows $W_0$ through $W_{25}$.

A hollow arrow $A_1$ in FIG. 25 points to a time series of windows resulting from the clustering of the category 0. In this example, the category 0 is deemed applicable to the windows $W_2$ through $W_9$, $W_{15}$ through $W_{21}$, and $W_{24}$, out of all windows $W_0$ through $W_{25}$.

In the example of FIG. 25, thick lines are shown to enclose a "cluster" of windows. A cluster of the category 0 is formed by the windows $W_2$ through $W_9$, and another cluster of the category 0 is made of the windows $W_{15}$ through $W_{21}$. Each cluster stands for a group of consecutive scenes to be reproduced when the user selects the category applicable to that cluster. It is typically up to the user to determine a minimum number of windows that should constitute each cluster. In FIG. 25, the minimum number of windows making up a single cluster is four.

A hollow arrow $A_2$ in FIG. 25 points to a time series of windows resulting from the clustering of the category 1. In this example, the category 1 is deemed applicable to the windows $W_4$ through $W_8$ out of the windows $W_2$ through $W_9$ deemed to fall into the category 0, as well as to the windows $W_{16}$ through $W_{21}$ out of the windows $W_{15}$ through $W_{21}$ deemed to belong to the category 0. The clusters constituted by these windows of the category 1 include the recognition times in which the ID's of not only "my child" but also "someone else's child" are recognized. As such, these clustered windows are changed from the category 0 to the category 1.

A hollow arrow $A_3$ in FIG. 25 points to a time series of windows resulting from the clustering of the category 2. In this example, the category 2 is deemed applicable to the windows $W_{11}$ through $W_{14}$ which make up a cluster of the category 2.

Clusters in appropriate categories are formed by the processes explained above. The windows not found applicable to any of the categories established with meanings are grouped into the category 3, which is a category for meaningless scenes. The clustering unit 92 outputs to the file creation unit 93 (FIG. 14) the results of its clustering, i.e., information about the categories and clusters of the windows processed.

In the manner described above, the recognition times involved (i.e., scenes picked up during corresponding time intervals) are linked into clusters on the basis of the results of ID recognition, and picked-up pictures are reproduced in such clusters. For example, by selecting the category 0 for clusters to be reproduced, the user can watch consecutively the scenes in which only "my child" appears. When selecting the category 0, the user can watch successively the scenes in which "my child" and "someone else's child" appear.

Conversely, by not selecting the category 2, the user can avoid watching the scenes in which "someone else's child" appears in more than half the time. When not selecting the category 3, the user can avoid viewing the scenes in which no one appears or only the children not wearing the sensor badges 4 appear.

The file creation unit 93 shown in FIG. 14 will now be described. The file creation unit 93 links clusters together based on the results of clustering by the clustering unit 92, in order to create a meta data file that describes the results of such linking and clustering processes. The meta data file thus created by the file creation unit 93 is output to the reproduction control unit 83 shown in FIG. 12.

Figure 26:
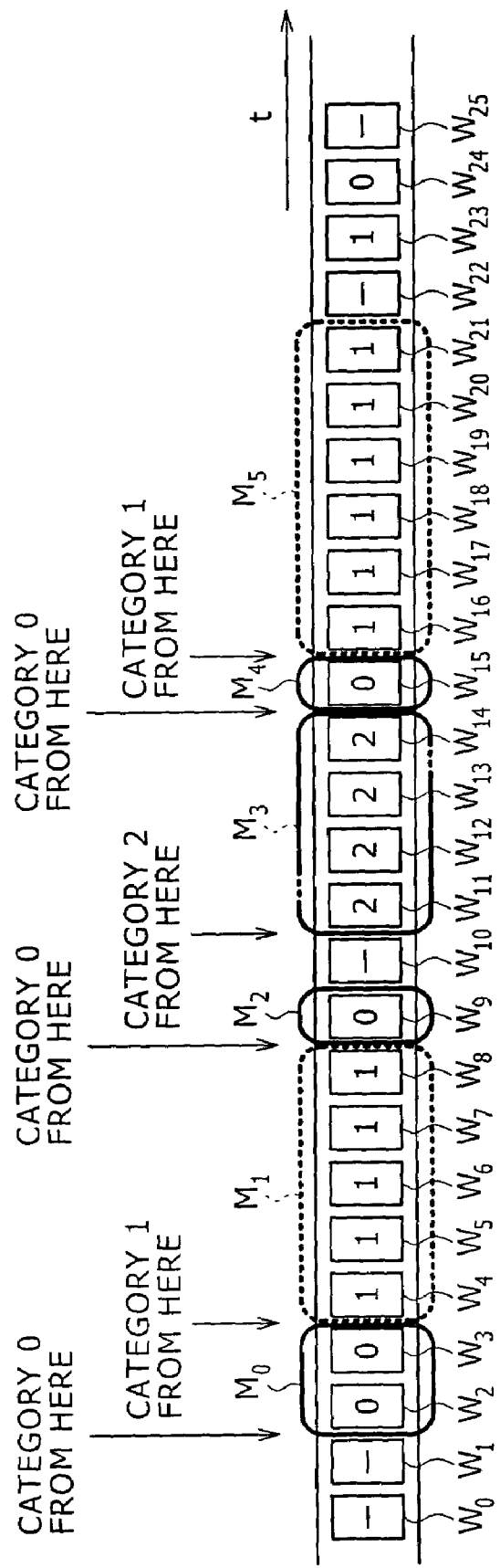
FIG. 26 is a schematic view showing an example of information described in a meta data file.

FIG. 26 is a schematic view showing an example of information described in the meta data file (i.e., information about which scenes belong to which categories). The time series of windows in FIG. 26 is the same as the time series resulting from the last clustering process, indicated by the hollow arrow $A_3$ in FIG. 25. When the windows are clustered by the clustering unit 92 as shown in FIG. 26, the meta data file describes information indicating the beginning of each cluster (e.g., frame number) and the category applicable to that cluster. For example, as indicated in FIG. 26, the meta data file may describe the first frame number and the applicable category 0 for a cluster $M_0$, the first frame number and the applicable category 1 for a cluster $M_1$, and so on.

Figure 27:
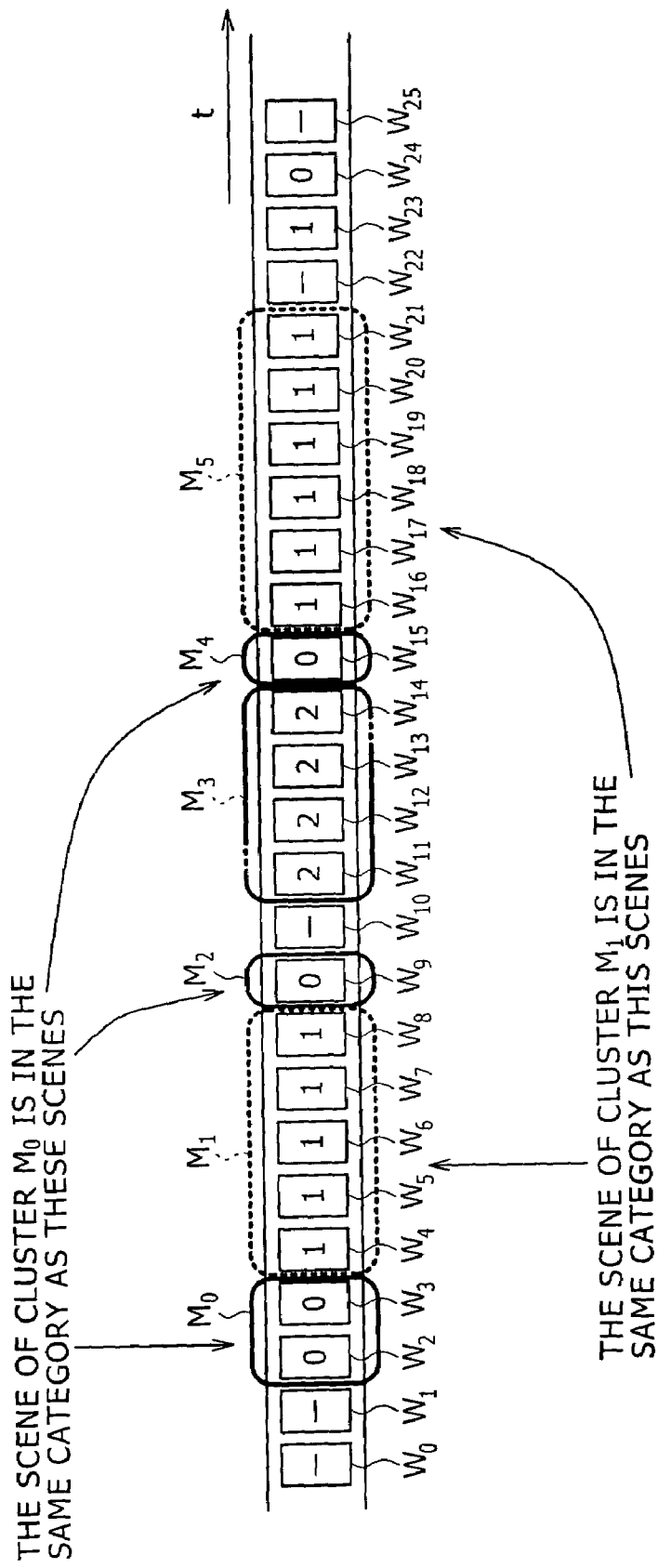
FIG. 27 is a schematic view showing another example of information described in the meta data file.

FIG. 27 is a schematic view showing another example of information described in the meta data file (e.g., information about scenes each belonging to the same category as that of some other scenes). The time series of windows in FIG. 26 is also the same as the time series resulting from the last clustering process, indicated by the hollow arrow $A_3$ in FIG. 25. When the windows are clustered by the clustering unit 92 as shown in FIG. 27, the meta data file describes information indicating the beginning of each cluster (e.g., frame number) and the beginning of any other cluster belonging to the same category as that of the cluster in question. For example, as indicated in FIG. 27, the meta data file may describe the first frame number of the cluster 0 together with the first frame numbers of clusters $M_2$ and $M_4$ which belong to the same category as that of the cluster 0.

Based on the information about the clusters falling into the same category, the file creation unit 93 links appropriate clusters together. Information about the clusters thus linked is also described in the meta data file.

Illustratively, one cluster of interest is linked to other clusters in the same category provided the latter clusters are longer (in time) than the cluster of interest. As shown in FIG. 28, suppose that a cluster $M_2$ is the cluster of interest and is in the same category as clusters $M_0$, $M_1$, and $M_3$ through $M_5$. In this case, the file creation unit 93 links the cluster $M_2$ to the clusters $M_0$, $M_4$ and $M_5$ which are longer than the cluster $M_2$. The first frame number in each of the linked clusters $M_0$, $M_4$ and $M_5$ is written to the meta data file so as to reflect the result of the linking process. In the example of FIG. 28, the cluster $M_4$ is the longest cluster followed by the clusters $M_0$ and $M_5$, in that order.

When a scene of a given cluster is being reproduced, linking-related information is used illustratively as a basis for displaying other scenes linked to the currently reproduced scene. Where the clusters $M_0$, $M_4$ and $M_5$ are linked to the cluster $M_2$ as indicated in FIG. 28, the scene of the cluster $M_2$ currently reproduced and displayed on the screen is accompanied by the scenes which, derived from the clusters $M_0$, $M_4$ and $M_5$, are displayed concurrently on the same screen. Specific screen displays will be discussed later.

Examples of meta data file descriptions will now be described with reference to FIGS. 29 through 32. In FIGS. 29 through 32, the numeral with a colon (:) in the leftmost position of each line is furnished only for explanation purposes and does not constitute any part of meta data.

FIG. 29 describes illustratively a video (moving picture) and the accompanying audio to be reproduced in keeping with the meta data in FIGS. 29 through 32. Lines 1 through 5 constitute a description of the video. Line 1, "framerate=15" is self-explanatory and represents the frame rate. Line 2, "height=120" and line 3, "width=160" denote the size of a single frame. Line 4, "filename=sample.mpg" stands for the file name for moving pictures. Line 5, "TotalLength=1800" represents the total playing time of the video.

Line 6 describes the audio involved. Line 6, "filename=sample.wav" denotes the file name for the audio.

FIGS. 30 and 31 describe illustratively some of the clusters explained above. Line 1, "ClusterDepthNum=3" under the heading "Cluster Info" indicates that there are three degrees of cluster granularity in the cluster data description. That is, the line indicates that the clusters are given "coarse," "medium," or "fine" granularity and that information about the clusters at these degrees of granularity is described in the data.

Cluster granularity corresponds illustratively to the above-mentioned minimum number of windows that make up a single cluster (e.g., four windows in the example of FIG. 25). Where the same video is to be reproduced, the degree of cluster granularity becomes coarser the larger the minimum window count leading to fewer clusters to be created, with each cluster getting bigger. Conversely, the degree of cluster granularity becomes finer the smaller the number of minimum window count resulting in more clusters to be created, with each cluster getting smaller.

The user may select "coarse," "medium" or "fine" cluster granularity in order to grasp visually a broad outline of the pictures taken or to watch details of the picked-up pictures. The clustering process discussed above is thus carried out at the different degrees of cluster granularity.

In FIGS. 30 and 31, "ClusterDepth0" denotes information about the clusters of "coarse" granularity; "ClusterDepth1" represents information about the clusters of "medium" granularity; and "ClusterDepth2" gives information about the clusters of "fine" granularity.

Lines 2 through 4 in FIG. 30 describe information about the clusters at "ClusterDepth0" ("coarse" granularity); lines 5 through 8 describe information about the clusters at "ClusterDepth1" ("medium" granularity); and lines 9 through 14 describe information about the clusters at "ClusterDepth2" ("fine" granularity).

With "ClusterDepth0" in effect, line 2, "ClusterNum=2" indicates that there are two clusters. Line 3, "ClusterTitle0=A" indicates that the first of the two clusters has the title "A," and Line 4, "ClusterTitle1=B" indicates that the second cluster has the title "B."

Likewise, lines 5 through 8 describe the number of clusters formed and the titles of the clusters when "ClusterDepth1" is in effect. Lines 9 through 14 describe the number of clusters formed and the titles of the clusters when "ClusterDepth2" is in effect.

The heading "ClusterData" in FIG. 31 denotes information about the clusters of the scenes involved (i.e., information illustrated in FIG. 26).

Line 1, "Frame0_Depth0=1" indicates that when "ClusterDepth0" is in effect, the cluster represented by the picture with the frame number 0 (i.e., the cluster ranging from the picture with the frame number 0 to the first picture of the next cluster) is a cluster 1 (i.e., cluster with the title "ClusterTitle1=B" on line 4 in FIG. 30).

Line 2, "Frame0_Depth1=2" indicates that when "ClusterDepth1" is in effect, the cluster represented by the picture with the frame number 0 (i.e., the cluster ranging from the picture with the frame number 0 to the first picture of the next cluster) is a cluster 2 (i.e., cluster with the title "ClusterTitle2=B" on line 8 in FIG. 30).

Line 3, "Frame0_Depth2=4" indicates that when "ClusterDepth2" is in effect, the cluster represented by the picture with the frame number 0 (i.e., the cluster ranging from the picture with the frame number 0 to the first picture of the next cluster) is a cluster 4 (i.e., cluster with the title "ClusterTitle4=B" on line 14 in FIG. 30).

Line 4, "Frame0_Next_Depth0=443" indicates that when "ClusterDepth0" is in effect, the picture at the head of the cluster and next to the picture with the frame number 0 has the frame number 443.

Line 5, "Frame0_Next_Depth1=200" indicates that when "ClusterDepth1" is in effect, the picture at the head of the cluster and next to the picture with the frame number 0 has the frame number 200.

Line 6, "Frame0_Next_Depth2=200" indicates that when "ClusterDepth2" is in effect, the picture at the head of the cluster and next to the picture with the frame number 0 has the frame number 200.

Line 7, "Frame200_Depth1=1" indicates that when "ClusterDepth1" is in effect, the cluster represented by the picture with the frame number 200 (i.e., the cluster ranging from the picture with the frame number 200 to the first picture of the next cluster) is the cluster 1 (i.e., cluster with the title "ClusterTitle1=C" on line 7 in FIG. 30).

Line 8, "Frame200_Depth2=2" indicates that when "ClusterDepth2" is in effect, the cluster represented by the picture with the frame number 200 (i.e., the cluster ranging from the picture with the frame number 200 to the first picture of the next cluster) is the cluster 2 (i.e., cluster with the title "ClusterTitle2=C" on line 12 in FIG. 30).

Line 9, "Frame200_Next_Depth1=443" indicates that when "ClusterDepth1" is in effect, the picture at the head of the cluster and next to the picture with the frame number 200 has the frame number 443.

Line 10, "Frame200_Next_Depth2=443" indicates that when "ClusterDepth2" is in effect, the picture at the head of the cluster and next to the picture with the frame number 200 has the frame number 443.

Line 11, "Frame443_Depth0=0" indicates that when "ClusterDepth0" is in effect, the cluster represented by the picture with the frame number 443 (i.e., the cluster ranging from the picture with the frame number 443 to the last picture) is a cluster 0 (i.e., cluster with the title "ClusterTitle0=A" on line 3 in FIG. 30).

Line 12, "Frame443_Depth1=0" indicates that when "ClusterDepth1" is in effect, the cluster represented by the picture with the frame number 443 (i.e., the cluster ranging from the picture with the frame number 443 to the last picture) is the cluster 0 (i.e., cluster with the title "ClusterTitle0=A" on line 6 in FIG. 30).

Line 13, "Frame443_Depth2=0" indicates that when "ClusterDepth2" is in effect, the cluster represented by the picture with the frame number 443 is the cluster 0 (i.e., cluster with the title "ClusterTitle0=A" on line 10 in FIG. 30).

Lines 14 through 16 each indicates the frame number of the last picture heading the cluster at each of the cluster depths involved.

FIG. 32 is a schematic view showing an example of information about cluster linking (i.e., information in FIG. 28). Line 1, "Frame0_LinkNum=3," indicates that the picture with the frame number 0 has three link destinations established (Link 0, 1, 2).

Line 2, "Frame0_Link0=2452," indicates that one of the link destinations (Link 0) for the picture with the frame number 0 has the frame number 2452. Likewise, line 3, "Frame0_Link1=5664," indicates that another link destination (Link 1) for the picture with the frame number 0 has the frame number 5664.

Line 4, "Frame0_Link2_FileName=family.mpg," indicates that another link destination (Link 2) for the picture with the frame number 0 is a picture held in a file named "family.mpg."

Line 5, "Frame0_Link2=343," indicates that the picture with the frame number 343 in the file named "family.mpg" is a link destination (Link 2) for the picture with the frame number 0.

Line 6, "Frame0_Next=15," indicates that the picture which comes next to the picture with the frame number 0 and for which link destination information is set has the frame number 15. Line 7, "Frame15_LinkNum=0," indicates that the picture with the frame number 15 has no link destination. If any picture with no link destination is selected as the picture subject to reproduction, the ongoing display of link destinations will be erased.

For example, if video reproduction starts from the picture with the frame number 0 in accordance with the description in FIG. 32, the picture with the frame number 0 is displayed simultaneously with the pictures having the frame numbers 2452 and 5664 as part of the linked scenes, and with the picture having the file number 343 in the file named "family.mpg." This state continues until the picture with the frame number 15 is selected as the picture subject to reproduction.

If the picture with the frame number 15 has become subject to the ongoing reproduction, the pictures with the frame numbers 2452 and 5664 as well as the picture with the file number 343 in the file named "family.mpg" are erased from the display.

Line 8, "Frame15_Next=476," indicates that the picture which comes next to the picture with the frame number 15 and for which link destination information is set has the frame number 476. Similar descriptions are continued under the heading "LinkData."

The meta data file containing the descriptions outlined above is output from the file creation unit 93 to the reproduction control unit 83.

Described below is what the personal computer 2 does to create a meta data file of the above-explained type. First, overall processing of the personal computer 2 is outlined with reference to the flowchart of FIG. 33.

A meta data file is created by the personal computer 2 roughly in four processes: capturing by the capturing unit 81

(in step S31), filtering by the filtering unit 91 of the scene determination unit 82 (in step S32), clustering by the clustering unit 92 (in steps S33 and S34), and creation of the file by the file creation unit 93 (in step S35).

In step S31, the capturing unit 81 captures picked-up pictures and raw ID data. The captured raw ID data is output to the scene determination unit 82, and the captured pictures are forwarded to the reproduction control unit 83.

In step S32, the filtering unit 91 removes as noises the pictures in which a given subject appears only momentarily in view of the raw ID data sent from the capturing unit 81. The filtering unit 91 also serves to fill gaps formed by the pictures in which the subject of interest disappears momentarily. The filtering unit 91 thus provides processed ID data and outputs the data to the clustering unit 92.

In step S33, in accordance with the processed ID data coming from the filtering unit 91, the clustering unit 92 determines the principally recognized ID or ID's in each of the windows involved in order to categorize the windows.

In step S34, based on the result from step S33, the clustering unit 92 checks to determine whether a predetermined number of windows in the same category are continued. If a group of continuously occurring windows is detected, the windows are linked into a cluster. As mentioned above, the minimum number of windows constituting each cluster is defined by the degree of granularity in effect. The result of the clustering process by the clustering unit 92 is output to the file creation unit 93.

In step S35, the file creation unit 93 links scenes together based on the outcome of the clustering by the clustering unit 92, thus creating a meta data file that describes the results of the linking and clustering processes. The meta data file created by the file creation unit 93 is output to the reproduction control unit 83.

The processing of the scene determination unit 82 will now be described in more detail with reference to the flowcharts of FIGS. 34 through 38.

In step S51, the filtering unit 91 acquires the raw ID data sent from the capturing unit 81. In step S52, the filtering unit 91 obtains all ID's recorded in the raw ID data. For example, if pictures of the children 3 wearing the sensor badges 4 that are assigned the ID's "0," "1" and "2" are captured into the personal computer 2 as shown in FIG. 1, then the three ID's "0," "1" and "2" are searched for and acquired. The number of ID's thus acquired is established as the value MAXID.

In step S53, the filtering unit 91 checks to determine whether the value established as MAXID is greater than zero (i.e., not including 0). If the value MAXID is not found to be greater than zero (i.e., equal to 0), then the scene determining process is terminated.

If in step S53 the value MAXID is found greater than zero, the filtering unit 91 goes step S54. In step S54, the filtering unit 91 selects one of the ID's recorded in the raw ID data.

In step S55, the filtering unit 91 chronologically lays out the result of recognition of a single ID selected. The filtering unit 91 carries out the "fattening" process X times (X>0) on the ID recognition result, as explained above with reference to FIG. 16.

In step S56, the filtering unit 91 performs the "slimming" process X times on the ID time series derived from the fattening process in step S55, the slimming process having been described above with reference to FIG. 17. Steps S55 and S56, when carried out, fill the gaps (FIG. 18) in which the ID selected in step S54 is missing.

In step S57, the filtering unit 91 repeats the slimming process X times on the ID time series filled out in step S57.

In step S58, the filtering unit 91 repeats the fattening process X times on the ID time series obtained from the slimming process in step S57. Steps S57 and S58, when executed, remove the noises (FIG. 19) from the time series of the single ID selected in step S54.

Having processed one ID in the manner described, the filtering unit 91 goes to step S59. In step S59, the filtering unit 91 selects another ID next to the currently selected ID.

In step S60, the filtering unit 91 checks to determine whether all ID's found in the raw ID data have been subjected to the gap-filling and noise-removing processes, i.e. whether the number of the ID's selected up to the present has exceeded the value MAXID. If the number of the ID's chosen so far is not found to exceed the value MAXID, the filtering unit 91 returns to step S55 and repeats it and the subsequent steps.

If in step S60 the filtering unit 91 determines that the number of the ID's selected so far has exceeded the value MAXID, then step S61 is reached. At this point, the processed ID data obtained through the processing by the filtering unit 91 is supplied to the clustering unit 92.

In step S61, the clustering unit 92 detects all ID's recorded in the processed ID data sent from the filtering unit 91 (i.e., the data past a low-pass filter), and establishes the number of the recorded ID's as the value MAXID.

In step S62, the clustering unit 92 checks to determine whether the value MAXID is greater than zero. If the value MAXID is not found greater than zero, then the clustering unit 92 brings the process to an end.

If in step S62 the clustering unit 92 determines that the value MAXID is greater than zero, then step S63 is reached. The process in FIG. 35 subsequent to step S63 corresponds to the clustering of the category 0.

In step S63, the clustering unit 92 checks from the beginning the ID time series recorded in the processed ID data so as to verify the results of ID recognition. Illustratively, as shown in FIG. 23, the time series of the ID of "my child" and the time series of the ID of "someone else's child" are selected, and a check is made on each of the time series starting from the first recognition time $T_0$.

In step S64, the clustering unit 92 checks to determine whether an ID No. ID_P is recognized in the currently focused recognition time (i.e., recognition time of interest). Since clustering is performed starting from the category of the highest importance, the ID of "my child" having the utmost importance is regarded here as having No. ID_P subject to the check. Where the categories are given their meanings as indicated in FIG. 20, the category 0 is assigned the highest importance. The check in this case is made to determine whether "my child" is picked up, i.e., whether the ID "0" allocated to "my child" appears in the recognition time of interest.

If in step S64 the clustering unit 92 determines that the ID No. ID_P is recognized in the recognition time of interest, step S65 is reached. In step S65, the clustering unit 92 increments by one a counter value NUM representing the number of recognition times in which the ID No. ID_P has been recognized within one window. If in step S64 the clustering unit 92 determines that the ID No. ID_P is not recognized in the recognition time of interest, step S65 is skipped.

In step S66, the clustering unit 92 checks to determine whether the number of the recognition times focused so far (i.e., number of the checked recognition times of interest) has reached the minimum window size.

If in step S66 the clustering unit 92 determines that the number of the checked recognition times of interest has not reached the minimum window size, then the clustering unit 92 focuses on the recognition time next to the currently focused recognition time, and returns to step S64 to repeat it and the subsequent steps.

If in step S66 the clustering unit 92 determines that the number of the checked recognition times of interest has reached the minimum window size, step S67 is reached. In step S67, the clustering unit 92 checks to determine whether the counter value NUM is greater than zero.

In step S67, the clustering unit 92 checks to determine whether the counter value NUM is greater than zero, i.e., whether one window includes a recognition time in which the ID No. ID_P is recognized. If in step S67 the counter value NUM is found greater than zero, the clustering unit 92 goes to step S68. In step S68, the clustering unit 92 determines that this window belongs to the category 0. As described above, if the ID of the highest importance is recognized within a window, that window is deemed to fall into the category 0.

In step S69, the clustering unit 92 checks to determine whether there are "Z" (Z>0) consecutive windows of the category 0, by referencing the categories of the windows having been subjected to the clustering process. The value Z may take on an appropriate number in keeping with the degree of cluster granularity in effect.

If in step S69 the clustering unit 92 determines that there exist "Z" consecutive windows falling into the category 0, then step S70 is reached. In step S70, the clustering unit 92 determines that the consecutive windows of the category 0 make up one cluster, and stores the length (i.e., time) of that cluster.

If in step S67 the counter value NUM is found to be zero, if in step S69 the "Z" consecutive windows of the category 0 are not found, or if in step S70 the length of one cluster is stored, then the clustering unit 92 goes to step S71. In step S71, the clustering unit 92 focuses on the next recognition time as the new recognition time of interest.

In step S72, the clustering unit 92 checks to determine whether the recognition time of interest is the last recognition time. If the recognition time is not found to be the last recognition time, step S64 is reached again and the subsequent steps are repeated.

If in step S72 the recognition time of interest is found to be the last recognition time, then the clustering unit 92 goes to step S73. The process in FIG. 36 subsequent to step S73 corresponds to the clustering of the category 1.

In step S73, the clustering unit 92 checks from the beginning the ID time series recorded in the processed ID data so as to verify the results of ID recognition.

In step S74, the clustering unit 92 checks to determine whether the ID No. ID_P is recognized along with other ID's in the recognition time of interest. For example, if the categories are established as shown in FIG. 20 together with their meanings, the check is made to determine whether the ID "0" assigned to "my child" is recognized in the recognition time of interest along with the ID's assigned to "someone else's children" (ID "1" assigned to "child B," ID "2" assigned to "child C").

If in step S74 the clustering unit 92 determines that the ID No. ID_P is included in the recognition time of interest along with other ID's, then step S75 is reached. In step S75, the clustering unit 92 increments by one the counter value NUM representing the number of recognition times in which the ID No. ID_P has been recognized along with the other ID's within one window. If in step S74 the clustering unit 92 determines that the ID No. ID_P is not recognized along with the other ID's in the recognition time of interest, step S75 is skipped.

In step S76, the clustering unit 92 checks to determine whether the number of the recognition times focused so far (i.e., number of the checked recognition times of interest) has reached the minimum window size.

If in step S76 the clustering unit 92 determines that the number of the checked recognition times of interest has not reached the minimum window size, then the clustering unit 92 focuses on the recognition time next to the currently focused recognition time, and returns to step S74 to repeat it and the subsequent steps.

If in step S76 the clustering unit 92 determines that the number of the checked recognition times of interest has reached the minimum window size, step S77 is reached. In step S77, the clustering unit 92 checks to determine whether the counter value NUM is greater than zero.

In step S77, the clustering unit 92 checks to determine whether the counter value NUM is greater than zero, i.e., whether one window includes a recognition time in which the ID No. ID_P is recognized along with the other ID's. If in step S77 the counter value NUM is found greater than zero, the process goes to step S78. In step S78, the clustering unit 92 determines that this window belongs to the category 1.

In step S79, the clustering unit 92 checks to determine whether there are "Z" consecutive windows of the category 1, by referencing the categories of the windows having been subjected to the clustering process.

If in step S79 the clustering unit 92 determines that there exist "Z" consecutive windows falling into the category 1, then step S80 is reached. In step S80, the clustering unit 92 determines that the consecutive windows of the category 1 make up one cluster, and stores the length (i.e., time) of that cluster.

If in step S77 the counter value NUM is found to be zero, if in step S79 the "Z" consecutive windows of the category 1 are not found, or if in step S80 the length of one cluster is stored, then the process goes to step S81. In step S81, the clustering unit 92 focuses on the next recognition time as the new recognition time of interest.

In step S82, the clustering unit 92 checks to determine whether the recognition time of interest is the last recognition time. If the recognition time is not found to be the last recognition time, step S74 is reached again and the subsequent steps are repeated.

If in step S82 the recognition time of interest is found to be the last recognition time, then the clustering unit 92, goes to step S83. The process in FIG. 37 subsequent to step S83 corresponds to the clustering of the category 2.

In step S83, the clustering unit 92 checks from the beginning the ID time series recorded in the processed ID data so as to verify the results of ID recognition.

In step S84, the clustering unit 92 checks to determine whether only ID's other than the ID No. ID_P are recognized in the recognition time of interest. For example, if the categories are established as shown in FIG. 20 together with their meanings, the check is made to determine whether the ID's assigned to "someone else's children" other than the ID "0" assigned to "my child" are recognized in the recognition time of interest.

If in step S84 the clustering unit 92 determines that only the ID's other than the ID No. ID_P are recognized in the recognition time of interest, then step S85 is reached. In step S85, the clustering unit 92 increments by one the counter value NUM representing the number of recognition times in which only the ID's other than the ID No. ID_P have been recognized within one window. If in step S84 the clustering unit 92 determines that the ID's other than the ID No. ID_P are not recognized in the recognition time of interest, step S85 is skipped.

In step S86, the clustering unit 92 checks to determine whether the number of the recognition times focused so far (i.e., number of the checked recognition times of interest) has reached the minimum window size.

If in step S86 the clustering unit 92 determines that the number of the checked recognition times of interest has not reached the minimum window size, then the clustering unit 92 focuses on the recognition time next to the currently focused recognition time, and returns to step S84 to repeat it and the subsequent steps.

If in step S86 the clustering unit 92 determines that the number of the checked recognition times of interest has reached the minimum window size, step S87 is reached. In step S87, the clustering unit 92 checks to determine whether the counter value NUM is larger than half the number of the recognition times constituting one window.

If in step S87 the clustering unit 92 determines that the counter value NUM is larger than half the number of the recognition times constituting one window, i.e., that only the ID's of "someone else's children" have been recognized in more than half the duration of one window, then the clustering unit 92 goes to step S88. In step S88, the clustering unit 92 determines that this window belongs to the category 2.

In step S89, the clustering unit 92 checks to determine whether there are "Z" consecutive windows of the category 2, by referencing the categories of the windows having been subjected to the clustering process.

If in step S89 the clustering unit 92 determines that there exist "Z" consecutive windows falling into the category 2, then step S90 is reached. In step S90, the clustering unit 92 determines that the consecutive windows of the category 1 make up one cluster, and stores the length (i.e., time) of that cluster.

If in step S87 the counter value NUM is not found to be larger than half the duration of one window, if in step S89 the "Z" consecutive windows of the category 2 are not found, or if in step S90 the length of one cluster is stored, then the clustering unit 92 goes to step S91. In step S91, the clustering unit 92 focuses on the next recognition time as the new recognition time of interest.

In step S92, the clustering unit 92 checks to determine whether the recognition time of interest is the last recognition time. If the recognition time is not found to be the last recognition time, step S84 is reached again and the subsequent steps are repeated.

Figure 38:
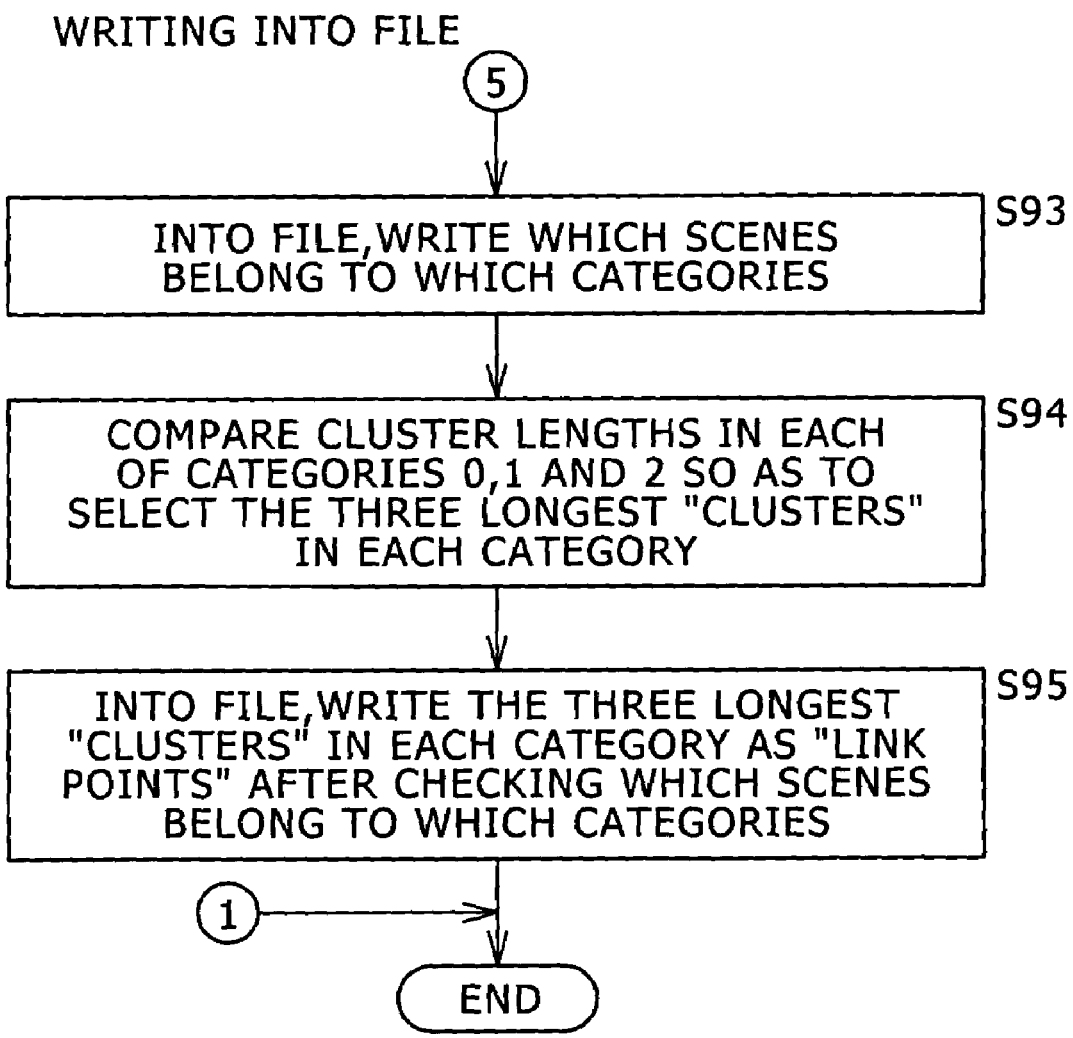
FIG. 38 is a flowchart of steps constituting a scene determining process continued to the process in FIG. 37.

If in step S92 the recognition time of interest is found to be the last recognition time, then the clustering unit 92 goes to step S93 of FIG. 38. In step S93, the result of the clustering process carried out by the clustering unit 92 as described above is supplied to the file creation unit 93.

In step S93, the file creation unit 93 writes into a meta data file, data about which clusters resulting from the clustering by the clustering unit 92 belong to which categories. This step writes illustratively the data "ClusterData" shown in FIG. 31 into the meta data file.

In step S94, the file creation unit 93 compares the clusters in terms of length in each of the categories 0, 1 and 2 so as to select, say, the three longest clusters in each category.

In step S95, the file creation unit 93 checks how the scenes corresponding to each of the clusters belong to the categories involved, in order to write to the meta data file the three longest clusters in each category as link points. This step writes illustratively the data "LinkData" shown in FIG. 32 into the meta data file.

The meta data file created by the file creation unit 93 in the process of FIG. 38 is supplied to the reproduction control unit 83 for moving picture reproduction. Although the process of FIG. 38 was shown to write only the "ClusterData" and "LinkData" into the file, other information shown in FIGS. 29 and 30 is also written to the meta data file by the file creation unit 93.

Figure 39:
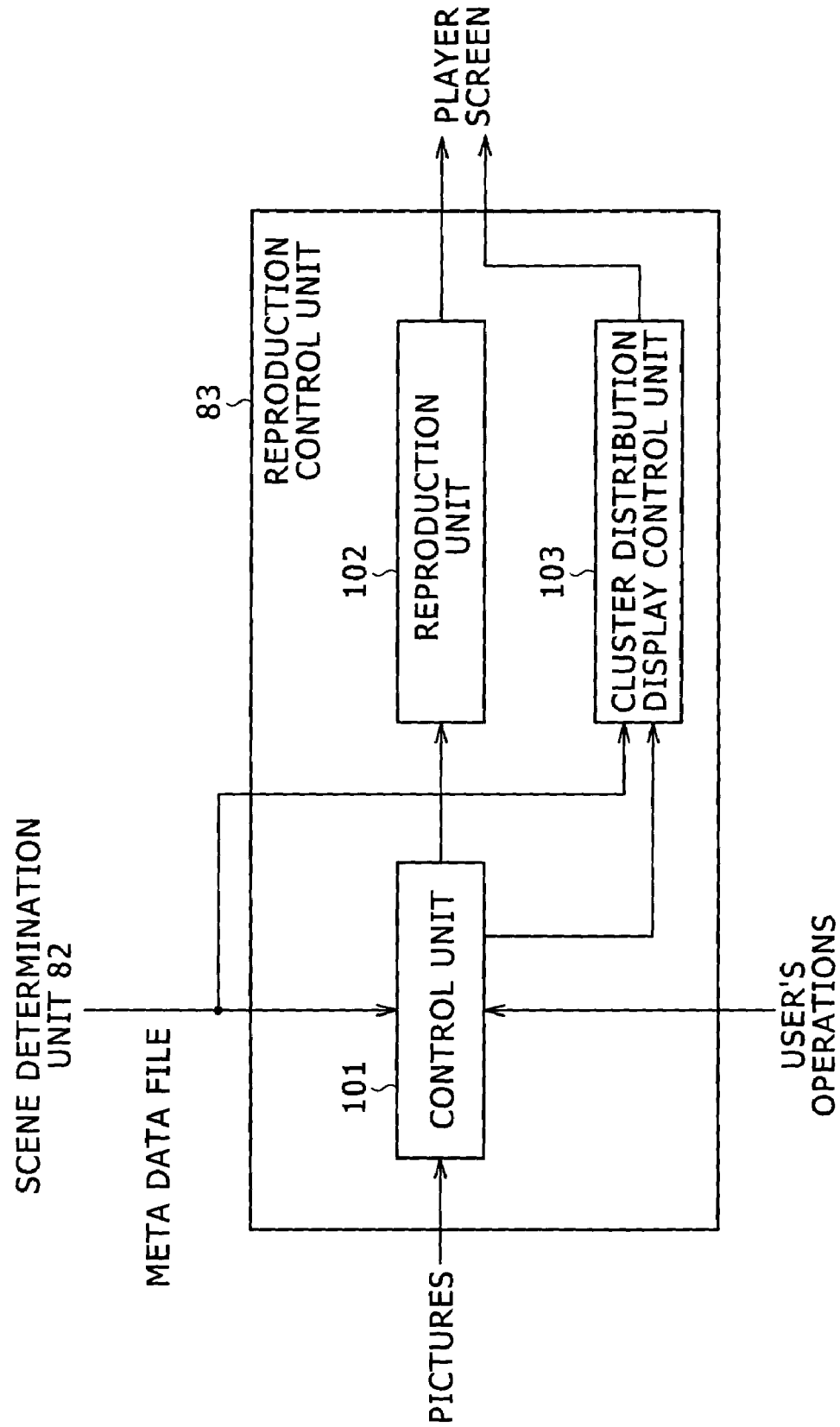
FIG. 39 is a block diagram showing a typical functional structure of a reproduction control unit included in FIG. 12.

What follows is a description of how the reproduction control unit 83 in FIG. 12 works to reproduce moving pictures based on the meta data file created by the scene determination unit 82 as described above. FIG. 39 is a block diagram showing a typical functional structure of the reproduction control unit 83. The reproduction control unit 83 is constituted by a control unit 101, a reproduction unit 102, and a cluster distribution display control unit 103.

The control unit 101 acquires pictures (moving pictures) from the capturing unit 81 and, based on the description in the meta data file sent from the scene determination unit 82 and in response to the user's operations, selects the necessary pictures from the supplied pictures. If a certain cluster is designated by the user, the control unit 101 selects only the pictures belonging to that cluster, and outputs to the reproduction unit 102 the selected pictures as the object to be reproduced.

For example, suppose that the description of FIG. 30 and that of FIG. 31 are included in the meta data file, that the user has selected "ClusterDepth0" as the preferred degree of cluster granularity, and that the cluster titled "ClusterTitle0=A" is selected as the cluster to be reproduced. In that case, the control unit 101 supplies the reproduction unit 102 with the moving pictures starting from the picture having the frame number 0 belonging to the selected cluster.

In turn, the reproduction unit 102 reproduces the pictures supplied from the control unit 101. The reproduced pictures are displayed in a predetermined position on the display unit 37.

The cluster distribution display control unit 103 displays a chronological distribution of clusters on the display unit 37, on the basis of the description of the clusters contained in the meta data file sent from the scene determination unit 82.

Figure 40:
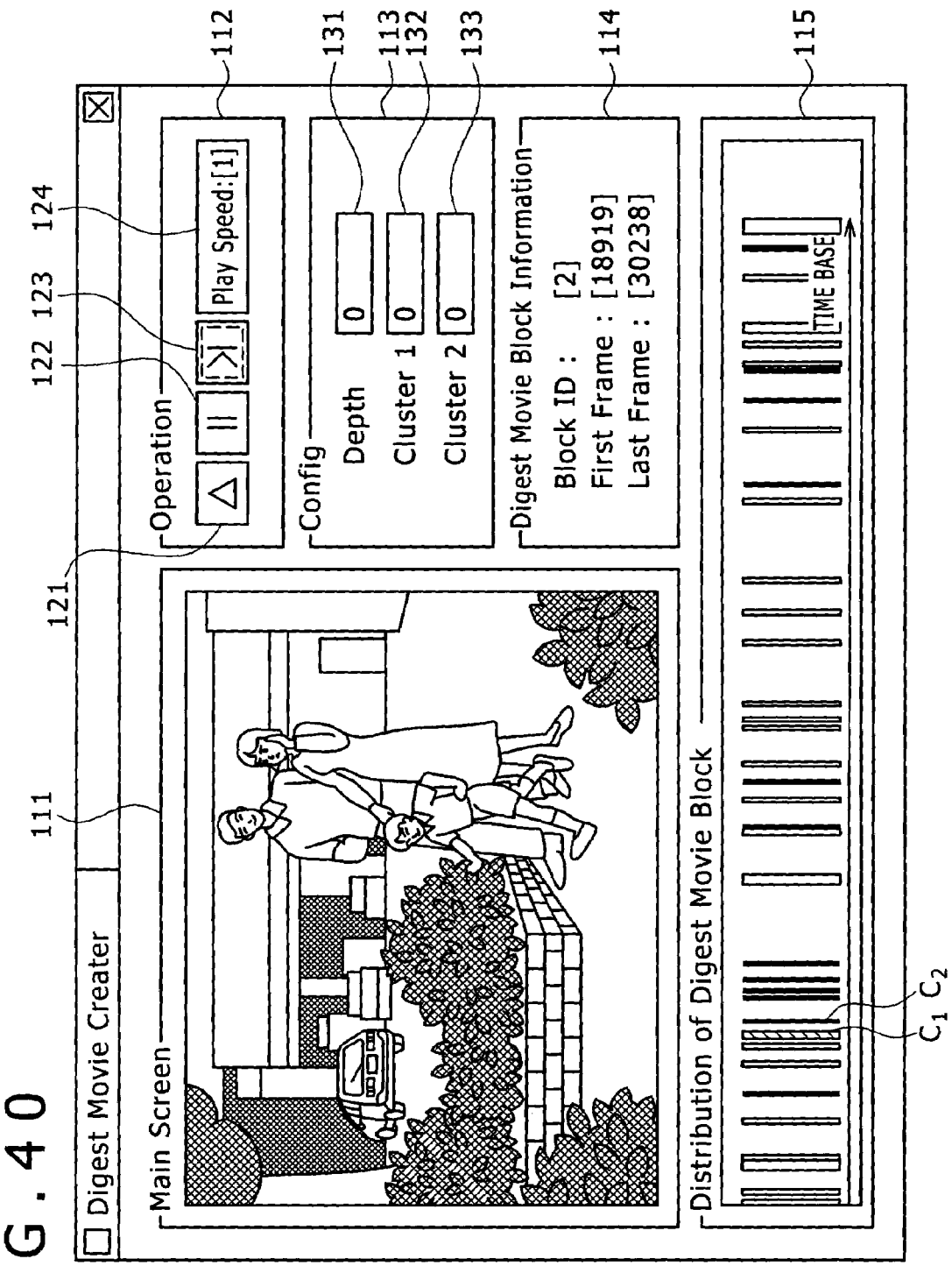
FIG. 40 is a schematic view showing a typical screen displayed by the reproduction control unit in FIG. 39.

FIG. 40 is a schematic view showing a typical screen displayed by the reproduction control unit 83. A moving picture display area 111 in the top left position of the screen displays pictures being reproduced by the reproduction unit 102. A cluster distribution display area 115 at the bottom of the screen displays a chronological distribution of the clusters applicable to the cluster number (i.e., category number 0, 1, 2, or 3 in the foregoing examples) selected by the user (e.g., a distribution of the clustered scenes in which "my child" appears is displayed chronologically, along with a distribution of the clustered scenes in which "my child" and "someone else's children" appear). In the cluster distribution display area 115, the currently reproduced cluster is displayed illustratively in a color different from the colors of the other clusters not being reproduced.

In the example FIG. 40, a cluster $C_1$ is the currently reproduced cluster which is displayed in the cluster distribution display area 115. That is, the picture being displayed in the moving picture display area 111 of FIG. 40 belongs to the cluster $C_1$.

When reproduction of the last picture in the currently reproduced cluster $C_1$ is finished, reproduction is resumed from the first picture of a cluster $C_2$, shown to the right of the cluster $C_1$ with a predetermined gap between the two clusters. The clusters $C_1$ and $C_2$ correspond to the same cluster number.

With the above-described arrangements in place, the user can watch only the selected scenes such as those in which "my child" alone appears or those in which "my child" and "someone else's children" appear.

In addition, the user can select a cluster that is different from the currently reproduced cluster from among the candidates in the cluster distribution display area 115, so as to start reproducing the newly selected cluster.

If the user specifies that distributions of the clusters belonging to a plurality of cluster numbers are to be displayed, the cluster distribution display area 115 displays in different colors the distributions of the clusters corresponding to the different cluster numbers.

The screen of FIG. 40 also indicates an operation button display area 112 that displays various operation buttons, a cluster selection area 113 in which to select a desired degree of cluster granularity and the preferred clusters to be reproduced, and a cluster information display area 114 that displays information about the currently reproduced cluster.

A file selection button 121 shown in the operation button display area 112 is operated by the user to select a desired moving picture file. A play/pause button 122 is operated by the user to start or pause reproduction. A move button 123 is operated to move from the currently reproduced cluster to the next cluster. A speed selection button 124 is operated to select the speed at which to reproduce clusters.

A granularity selection area 131 shown in the cluster selection area 113 is operated by the user to designate the desired degree of cluster granularity. Cluster selection areas 132 and 133 are operated to designate the clusters to be reproduced.

Figure 41:
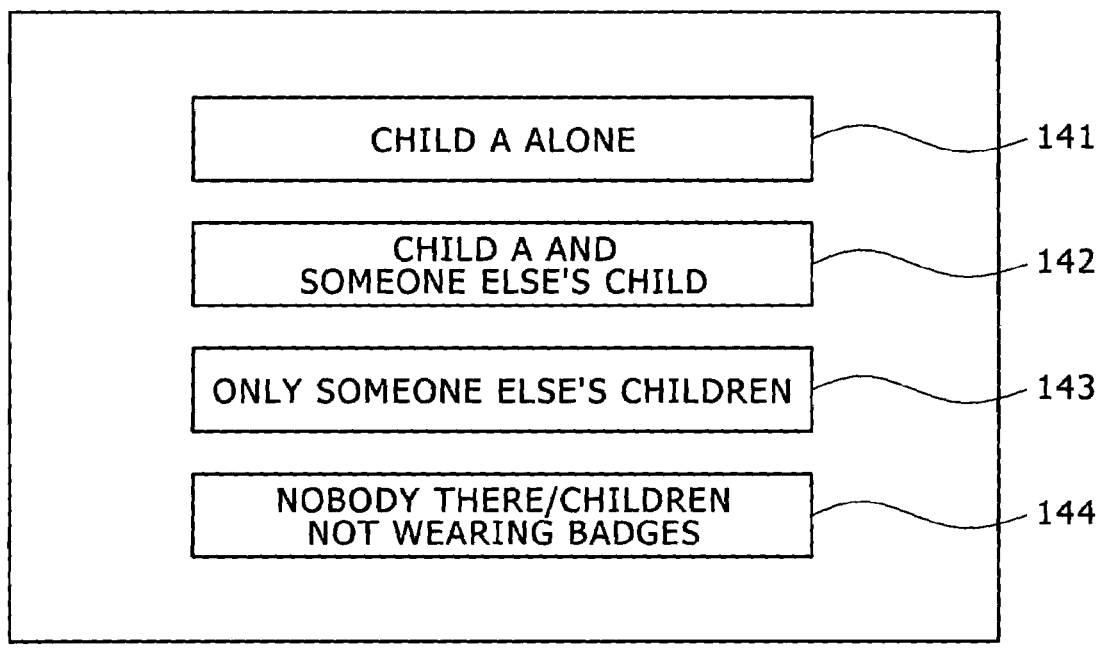
FIG. 41 is a schematic view showing a typical category selection screen.

The clusters to be reproduced may be selected alternatively from the screen such as one shown in FIG. 41. The screen of FIG. 41 displays four selection buttons: a category selection button 141 bearing the expression "Child A alone," a category selection button 142 with the expression "Child A and someone else's child," a category selection button 143 with the expression "Only someone else's children," and a category selection button 144 with the expression "Nobody there/children not wearing badges." The expressions displayed on the buttons reflect the user-established settings (i.e., correspondence with ID's).

Illustratively, if the category selection button 141 is clicked on, the clusters belonging to the category 0 representative of the pictures in which "child A" alone appears are reproduced. At this point, the cluster distribution display area 115 displays the distribution of the clusters falling into the category 0.

If the category selection button 142 is clicked on, the clusters belonging to the category 1 representative of the pictures in which "child A" and "someone else's child (children B and C in this case) appear are reproduced. At this point, the cluster distribution display area 115 displays the distribution of the clusters falling into the category 1.

Likewise, if the category selection button 143 is clicked on, the cluster distribution display area 115 displays the distribution of the clusters in the category 2, and the clusters of the category 2 representing the pictures in which "someone else's children" alone appear are reproduced. If the category selection button 144 is clicked on, the cluster distribution display area 115 displays the distribution of the clusters in the category 3, and reproduction is made of the clusters of the category 3 representing the pictures in which nobody appears or people not wearing the sensor badges 4 appear (i.e., children A, B and C wearing the badges 4 do not appear).

With the help of the screen displayed as described above, the user is able to select in an intuitive manner the desired clusters to be reproduced.

Figure 42:
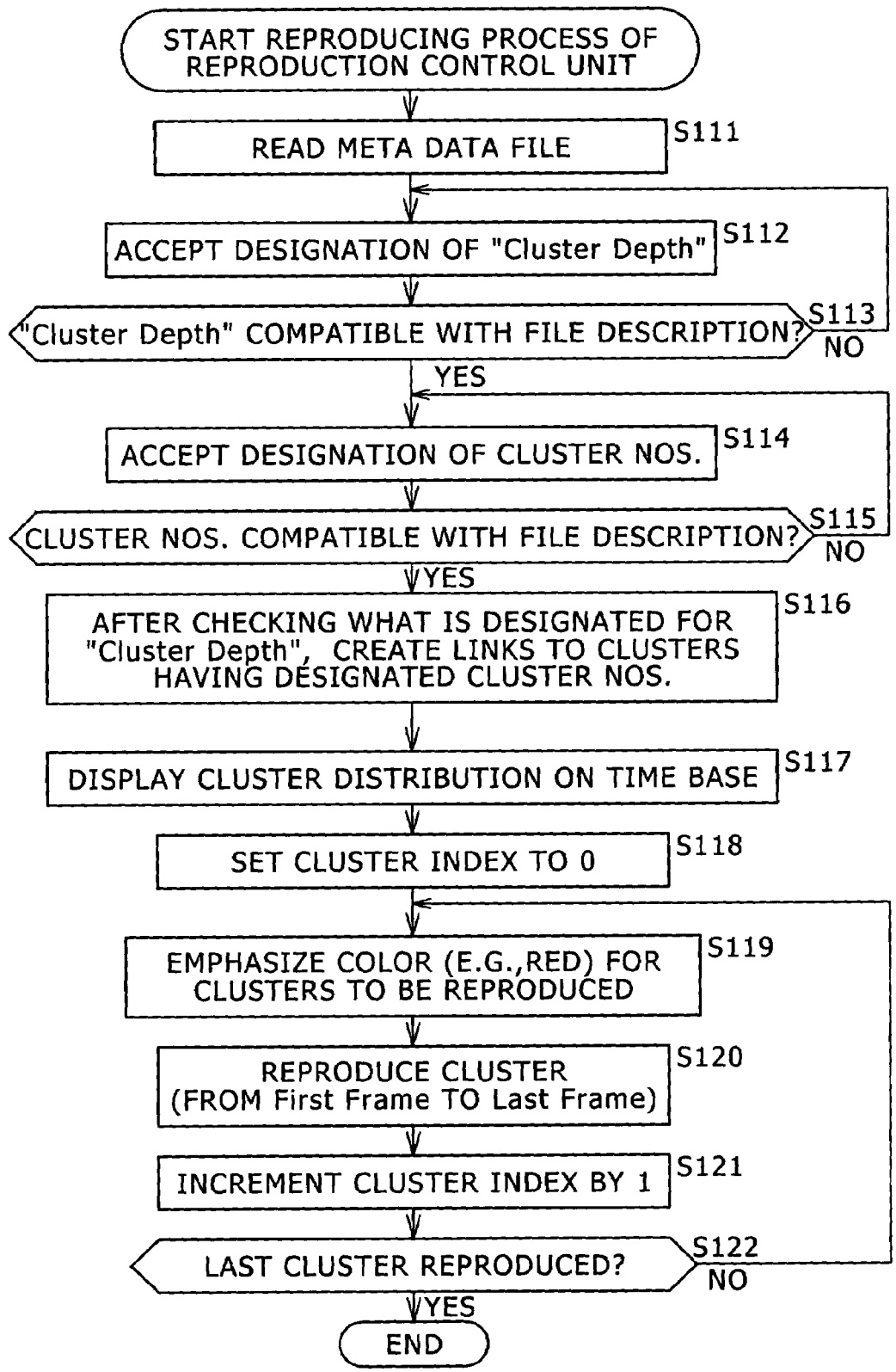
FIG. 42 is a flowchart of steps constituting a reproducing process of the reproduction control unit in FIG. 39.

Described below with reference to the flowchart of FIG. 42 is a reproducing process performed by the reproduction control unit 83 to reproduce moving pictures on the screen of FIG. 40.

In step S111, the control unit 101 reads the meta data file sent from the scene determination unit 82. In step S112, the control unit 101 accepts "ClusterDepth" (i.e., degree of granularity) designated by the user. For example, where the screen of FIG. 40 is in effect with nothing displayed in the moving picture display area 111 and cluster distribution display area 115, the user is prompted to specify "ClusterDepth" in the granularity selection area 131.

In step S113, the control unit 101 checks to determine whether the "ClusterDepth" setting designated by the user is compatible with the corresponding description in the meta data file. If the user-designated "ClusterDepth" is not found compatible with the file description, step S112 is reached again and the subsequent steps are repeated.

Illustratively, it might happen that the user designates a degree of granularity other than the "coarse," "medium" and "fine" degrees of granularity described in the meta data file. In that case, the user-designated granularity is deemed incompatible with the description in the meta data file.

If in step S113 the control unit 101 determines that the user-designated "ClusterDepth" is compatible with the meta data file description, step S114 is reached. In step S114, the control unit 101 accepts designation of a cluster number or numbers.

In step S115, the control unit 101 checks to determine whether the cluster numbers designated by the user are compatible with the corresponding description in the meta data file. If the user-designated cluster numbers are not found compatible with the meta data file description, step S114 is reached again and the subsequent steps are repeated.

For example, it might happen that the user designates cluster numbers other than the clusters 0, 1, 2 and 3 (i.e., categories 0, 1, 2 and 3). In that case, the user-designated cluster numbers are deemed incompatible with the description in the meta data file.

If in step S115 the user-designated cluster numbers are found compatible with the meta data file description, the control unit 101 goes to step S116. In step S116, the control unit 101 creates links to the clusters having the designated cluster numbers, by checking what is designated by the user in the "ClusterDepth" description.

For example, suppose that the "ClusterData" description of FIG. 31 is in effect and that the "ClusterDepth0" setting and the cluster number 1 are designated by the user. In that case, what is described on lines 1, 4, 11 and 14 regarding "ClusterDepth0" is referenced. If there exist clusters with their frame numbers something other than 0 through 442 (i.e., clusters defined by the descriptions on lines 1 and 4), these clusters are linked together. Information about the clusters linked by the control unit 101 is supplied from the control unit 101 to the cluster distribution display control unit 103.

In step S117, given the information from the control unit 101, the cluster distribution display control unit 103 causes the cluster distribution display area 115 to display accordingly a chronological distribution of the clusters having the user-designated cluster numbers.

In step S118, the control unit 101 sets the value 0 to a cluster index representative of the cluster to be reproduced. The cluster index 0 illustratively denotes the leftmost cluster among the clusters displayed in the cluster distribution display area 115.

In step S119, the control unit 101 causes the cluster distribution display control unit 103 to emphasize the color (e.g., red) of the clusters which are subject to reproduction and which appear in the cluster distribution display area 115.

In step S120, the control unit 101 supplies the reproduction unit 102 with the pictures that belong to the cluster corresponding to the cluster index 0 for reproduction. The supplied cluster is selected from the pictures taken.

When reproduction of the last frame in the currently reproduced cluster is finished, the control unit 101 goes to step S121. In step S121, the control unit 101 increments the cluster index value by one. In step S122, the control unit 101 checks to determine whether reproduction of the last frame in the last cluster is completed.

If in step S122 the control unit 101 determines that reproduction of the last frame in the last cluster is not finished yet, the control unit 101 returns to step S119 to repeat it and the subsequent steps. If in step S122 reproduction of the last frame in the last cluster is found completed, the control unit 101 terminates the reproducing process.

In the manner described above, the user is able to watch the pictures of the designated category in appropriate clusters.

The foregoing explanation has focused primarily on how pictures are reproduced in keeping with the cluster-related descriptions (the "ClusterData" description in FIG. 31) in the meta data file shown in FIGS. 29 through 32. What follows is an explanation about a linking process, in particular about the structure and the workings of the reproduction control unit 83 that reproduces picked-up pictures based on the "LinkData" description in FIG. 32.

Figure 43:
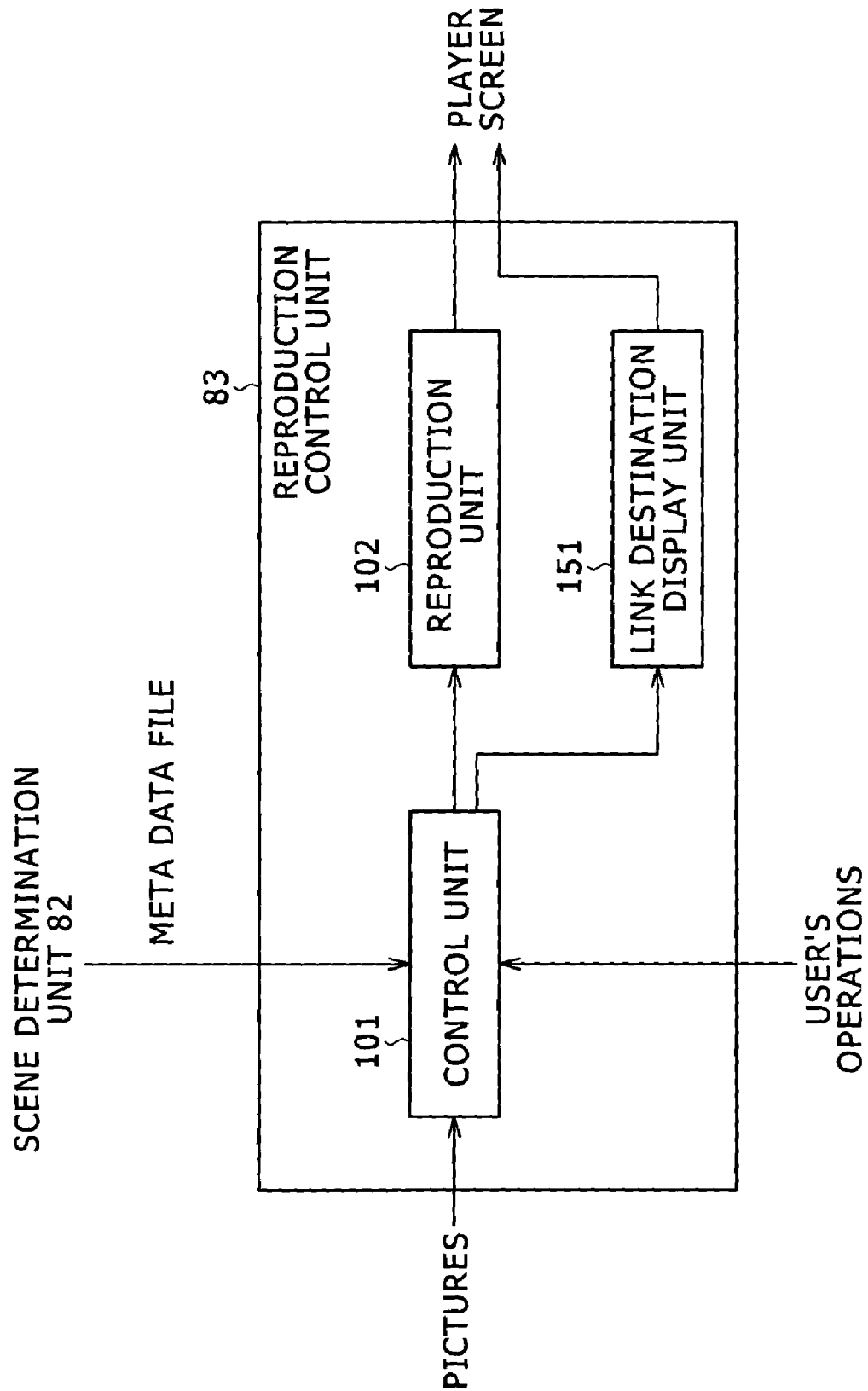
FIG. 43 is a block diagram showing another typical functional structure of the reproduction control unit in FIG. 12.

FIG. 43 is a block diagram showing another typical functional structure of the reproduction control unit 83. Of the reference numerals in FIG. 43, those already used in FIG. 39 designate like or corresponding parts.

The control unit 101 acquires pictures sent from the capturing unit 81, and acquires the necessary pictures from among the acquired pictures based on the link-related descriptions in the meta data file coming from the scene determination unit 82 and in response to the user's operations. The control unit 101 outputs the picture to be reproduced to the reproduction unit 102. From the pictures supplied from the capturing unit 81, the control unit 101 also selects link destination pictures, i.e., pictures to which is linked the picture currently reproduced by the reproduction unit 102, and outputs the selected link destination pictures to the link destination display unit 151.

For example, where the meta data file including the "LinkData" description in FIG. 32 is provided and where the picture with the frame number 0 is being reproduced by the reproduction unit 102, the control unit 101 selects the pictures having the frame numbers 2452, 5564, and 343 as the link destinations of the currently reproduced picture (from the file named "family.mpg"), and outputs the selected pictures to the link destination display unit 151.

The reproduction unit 102 reproduces the picture sent from the control unit 101. The reproduced picture is displayed in a predetermined position on the display unit 37.

The link destination display unit 151 causes the link destination pictures coming from the control unit 101 to appear in positions different from that in which the picture currently reproduced by the reproduction unit 102 is displayed.

Figure 44:
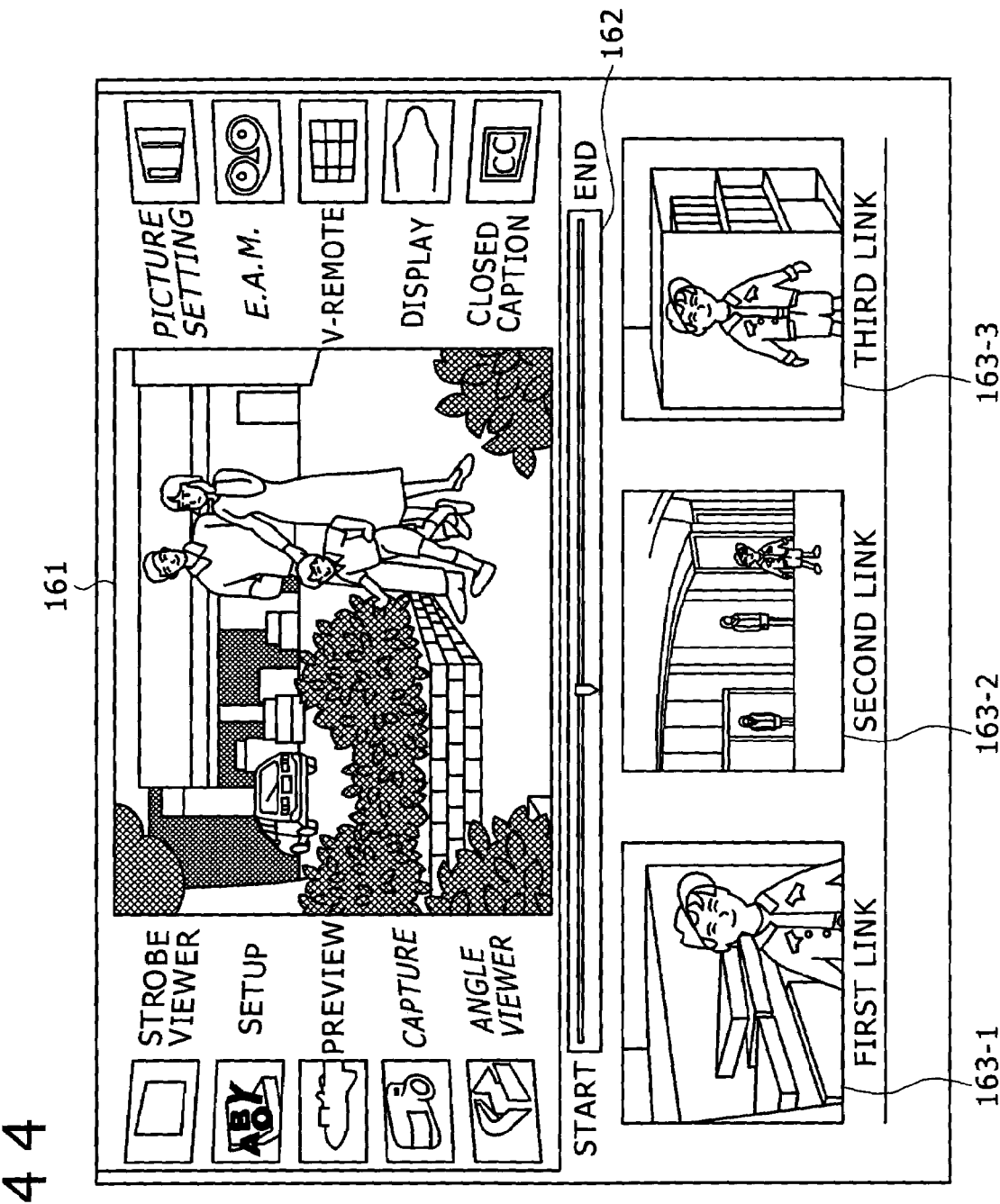
FIG. 44 is a schematic view of a typical screen displayed by the reproduction control unit in FIG. 43.

FIG. 44 is a schematic view of a typical screen displayed by the reproduction control unit 83 in FIG. 43. A moving picture display area 161 in an upper center position of the screen displays the picture (i.e., moving picture selected by the user) reproduced by the reproduction unit 102. Link destination display areas 163-1 through 163-3 in the lower half of the screen display the link destinations applicable to the picture being displayed in the moving picture display area 161. When the ongoing moving picture is changed, so are its link destinations. That is, what is displayed in the link destination display areas 163-1 through 163-3 varies with the current display in the moving picture display area 161.

Apart from the currently reproduced scene, the reproduction control unit 83 can present the user with a scene of a predetermined length in which, say, the same child as the one appearing in the currently reproduced scene also appears.

On the screen of FIG. 44, any one of the pictures displayed in the link destination display areas 163-1 through 163-3 may be selected so that reproduction starts from the position of the selected moving picture. For example, if the picture in the link destination display area 163-1 is selected, the cluster headed by the selected picture is reproduced. The newly reproduced moving picture is displayed in the moving picture display area 161.

The link destination display areas 163-1 through 163-3 may display either still pictures or moving pictures of the link destinations. If moving pictures are to be displayed, the scenes are reproduced over a predetermined time interval subsequent to the timestamps of the pictures established as the link destinations.

A slide bar 162 located between the moving picture display area 161 and the link destination display areas 163-1 through 163-3 represents the current reproducing position in the entire moving picture file selected by the user for reproduction. The user may change the reproducing position by manipulating the slide bar 162.

Figure 45:
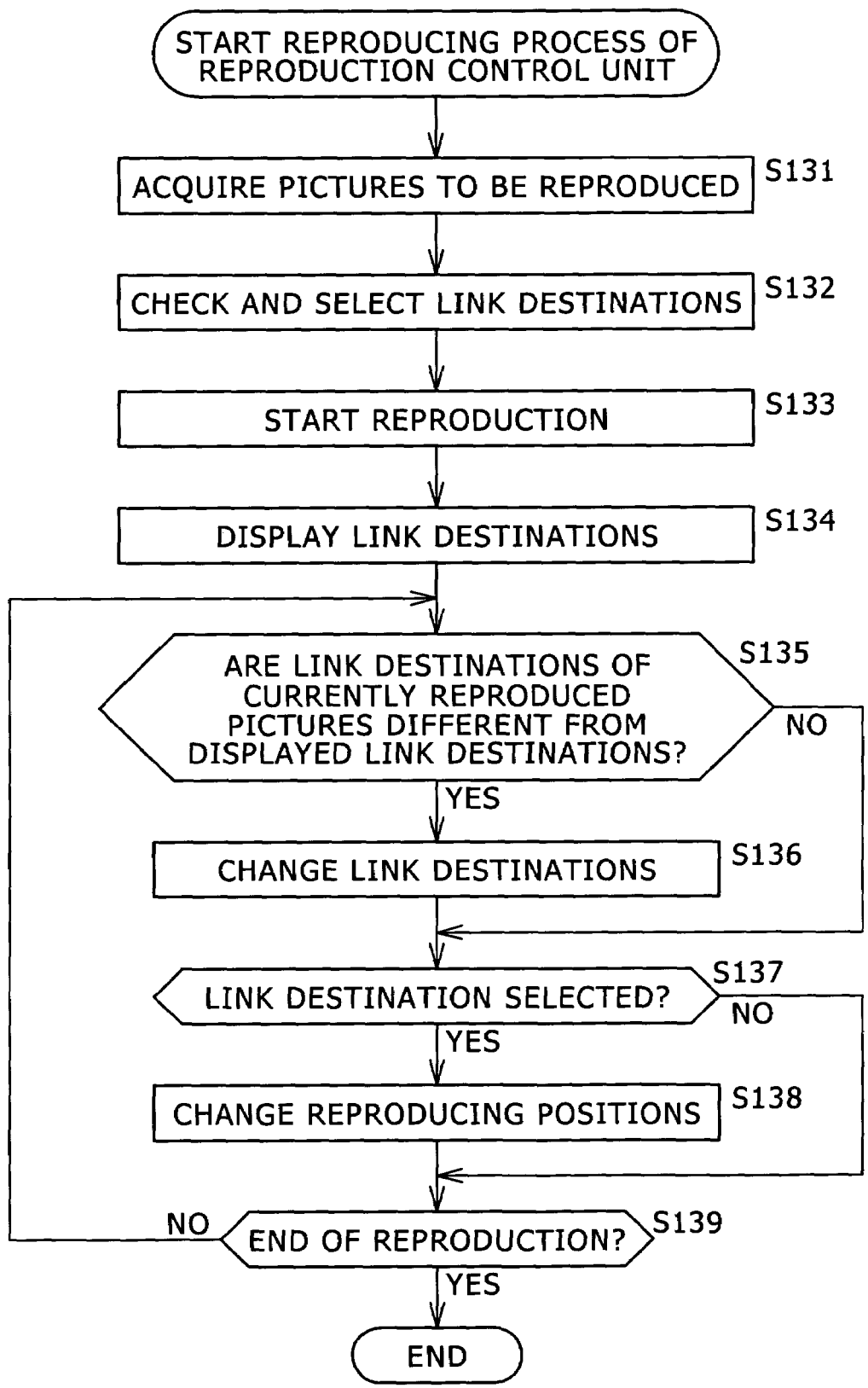
FIG. 45 is a flowchart of steps constituting a reproducing process of the reproduction control unit in FIG. 43.

Described below with reference to the flowchart of FIG. 45 is a reproducing process carried out by the reproduction control unit 83 in FIG. 43. In step S131, the control unit 101 of the reproduction control unit 83 acquires pictures coming from the capturing unit 81. Illustratively, the control unit 101 outputs the acquired pictures successively starting from the first picture to the reproduction unit 102.

In step S132, the control unit 101 checks the link data coming from the scene determination unit 82 in order to select, from the pictures supplied by the capturing unit 81, the link destination pictures applicable to the currently reproduced picture. The link destination pictures selected by the control unit 101 are output to the link destination display unit 151. If the currently reproduced picture has no link destinations, then no link destination picture is output to the link destination display unit 151.

In step S133, the reproduction unit 102 starts reproducing the picture fed from the control unit 101, and causes the reproduced picture to appear in a predetermined position on the display unit 37.

In step S134, the link destination display unit 151 causes the link destination pictures sent from the control unit 101 to be displayed in predetermined positions on the display unit 37. As a result, the display unit 37 displays the screen such as one shown in FIG. 44.

In step S135, the control unit 101 checks to determine whether the link destination pictures applicable to the picture currently reproduced by the reproduction unit 102 are different from those displayed in the link destination display areas 163-1 through 163-3. Once picture reproduction is started in step S133, the currently reproduced picture keeps changing over time. For that reason, the control unit 101 checks in step S135 to see whether the link destination pictures applicable to the currently reproduced picture are being displayed correctly in the link destination display areas 163-1 through 163-3.

If in step S135 the control unit 101 determines that the link destination pictures applicable to the picture being reproduced by the reproduction unit 102 have become different from those displayed in the link destination display areas 163-1 through 163-3, then step S136 is reached.

In step S136, the control unit 101 supplies the link destination display unit 151 with the pictures to be displayed as new link destination pictures. In turn, the link destination display unit 151 causes the link destination display areas 163-1 through 163-3 to switch the link destination picture displays in keeping with the currently reproduced picture.

If in step S135 the control unit 101 determines that the link destination pictures applicable to the currently reproduced picture are not different from those displayed in the link destination display areas 163-1 through 163-3, then step S136 is skipped.

In step S137, the control unit 101 checks to determine whether any of the link destination pictures being displayed in the link destination display areas 163-1 through 163-3 is selected as the new picture to be reproduced in response to the user's operations. If any such link destination picture is found selected for reproduction, then step S138 is reached.

In step S138, with the link destination picture selected by the user, the control unit 101 supplies the reproduction unit 102 with the pictures subsequent to the timestamp of the selected link destination, and causes the unit 102 to start reproducing the pictures. This step terminates reproduction of the currently selected cluster and starts reproducing the cluster subsequent to the newly selected link destination.

If in step S137 no link destination is found selected, then step S138 is skipped.

In step S139, the control unit 101 determines whether the reproducing process is to be terminated. If the reproducing process is not to be terminated, step S135 is reached again and the subsequent steps are repeated. If an instruction to stop the reproducing process is given illustratively by the user, or if the moving pictures selected by the user have been reproduced to the last picture, then the control unit 101 determines in step S139 that the reproducing process is to be terminated, and brings the process to an end.

In the foregoing description, the video camera 1 was shown only taking pictures and acquiring raw ID data while the personal computer 2 creates the meta data file based on the raw ID data and reproduces moving pictures in accordance with the created meta data. However, this is not limitative of the invention. Alternatively, the video camera 1 may take on the creation of meta data as well.

Figure 46:
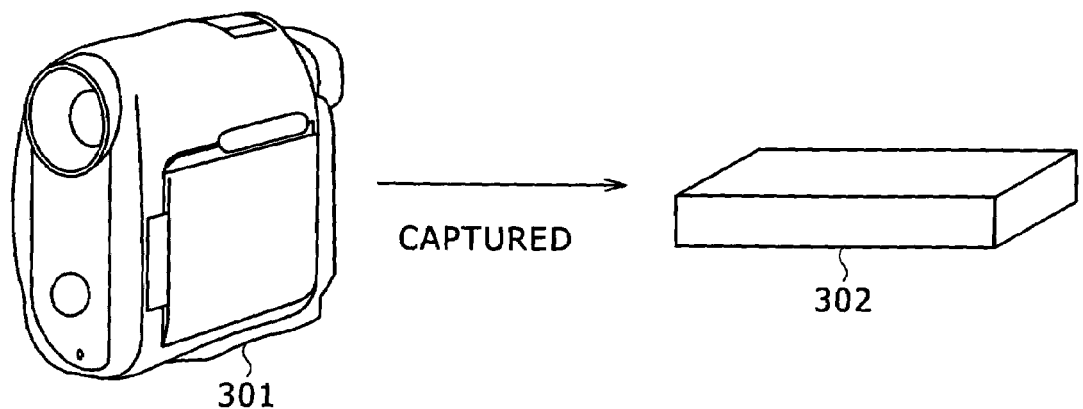
FIG. 46 is a schematic view showing a typical configuration of another picture-taking and display system to which this invention is applied.

FIG. 46 is a schematic view showing a typical configuration of another picture-taking and display system to which this invention is applied. A video camera 301 in FIG. 46 picks up pictures to be reproduced as well as pictures for ID recognition use. Using raw ID data derived from the picked-up pictures, the video camera 301 creates a meta data file such as one shown in FIGS. 28 through 31 and stores the created file in an internal storage unit together with the pictures to be reproduced.

As indicated by an arrow in FIG. 46, a player 302 captures the picked-up pictures and the meta data file from the video camera 301. In keeping with the meta data file, as discussed above, the player 302 reproduces pictures on a cluster-by-cluster basis as specified in the "ClusterData" description and jumps from one cluster to another for reproduction as specified in the "LinkData" description.

Figure 47:
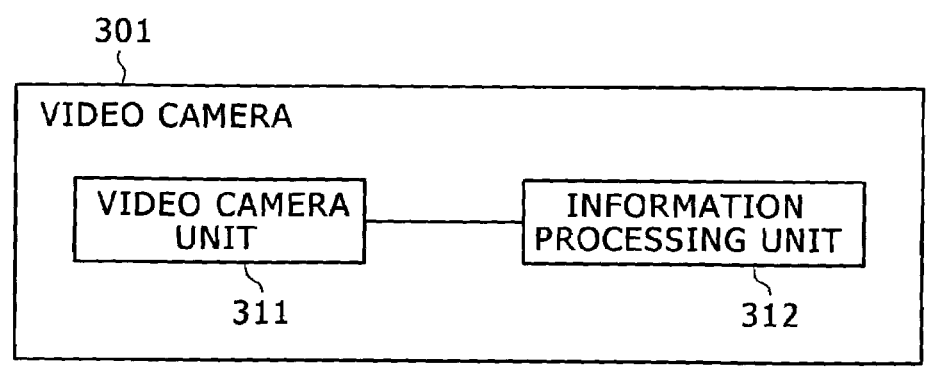
FIG. 47 is a block diagram showing a typical structure of a video camera included in FIG. 46.

FIG. 47 is a block diagram showing a typical structure of the video camera 301 in FIG. 46. The video camera 301 is constituted by a video camera unit 311 and an information processing unit 312. The video camera unit 311 has the same structure as that shown in FIG. 9. That is, the video camera unit 311 stores into the storage unit 64 the pictures picked up through the lens 61 for reproduction purposes along with the raw ID data derived from the picked-up pictures.

The information processing unit 312 has the same structure as that shown in FIG. 14. That is, the information processing unit 312 reads raw ID data from the video camera unit 311 in order to create a meta data file, i.e., a file that contains link-related information and information about what is derived from a clustering and a filtering process performed on the result of ID recognition. The meta data file thus created is supplied to the video camera unit 311 and stored therein along with the pictures to be reproduced.

A sequence of picked-up pictures and the meta data file are retrieved from the storage unit 64, and captured in wired or wireless fashion into the player 302.

Figure 48:
FIG. 48 is a block diagram showing a typical functional structure of a player included in FIG. 46.

FIG. 48 is a block diagram showing a typical functional structure of the player 302 in FIG. 46. The player 302 has the same structure as that of the personal computer 2 in FIG. 6. At least part of the functional blocks in FIG. 48 may be implemented by the CPU of the personal computer 2 executing suitable programs.

As shown in FIG. 48, the player 302 includes something other than the scene determination unit 82 in FIG. 12 for creating meta data. More specifically, the capturing unit 81 in FIG. 48 captures pictures and a meta data file from the video camera 301 and forwards what has been captured to the reproduction control unit 83. The meta data file, created by the video camera 301 and sent from the capturing unit 81 to the reproduction control unit 83, is the same as what has been described in FIGS. 29 through 32 above. Based on the meta data file provided by the capturing unit 81, the reproduction control unit 83 reproduces pictures on a cluster-by-cluster basis as specified in the "ClusterData" description and jumps from one cluster to another for reproduction as specified in the "LinkData" description.

Illustratively, when meta data is created on the side of the camera, the user may simply have the data captured into the player along with the picked-up pictures. This allows the pictures to be reproduced then and there by the player in accordance with the meta data.

The structure shown in FIG. 12 may thus be varied as needed. For example, the scene determination unit 82 may be shifted to the picture-taking side.

Conversely, the DSP 63 on the picture-taking side may be shifted to the reproducing side. In this case, ID's are not recognized on the picture-taking side. Instead, pictures taken by the recognition-use picture taking area 72 for ID recognition purposes are stored into the storage unit 64 together with the pictures taken by the moving picture taking area 71 for reproduction purposes. With these pictures captured, the reproducing side recognizes ID's from the pictures taken by the recognition-use picture taking area 72, creates a meta data file based on the ID's thus recognized, and reproduces the pictures taken by the moving picture taking area 71 in accordance with the created meta data file.

In the foregoing description, the meta data file was shown to be used for reproducing picked-up pictures. Alternatively, the user may store picked-up pictures onto a storage medium such as DVD, transmit the pictures to another apparatus over a network, or edit the pictures, all on a cluster-by-cluster basis.

The series of steps or processes described above may be executed either by hardware or by software. For the software-based processing to take place, the programs constituting the software may be either incorporated beforehand in dedicated hardware of a computer or installed upon use over a network or from a suitable storage medium into a general-purpose personal computer or like equipment capable of executing diverse functions based on the installed programs.

As shown in FIG. 6, the storage medium is offered to the user apart from the computer or like equipment not only as removable media 41 constituted by magnetic disks (including flexible disks), optical disks (including CD-ROM (compact disk-read only memory) and DVD (digital versatile disc)), magneto-optical disks (including MD (Mini-disc; registered trademark)), or a semiconductor memory, each of the media carrying the necessary programs; but also in the form of the ROM 32 or a hard disk drive included in the storage unit 38, both accommodating the programs and incorporated beforehand in the computer.

In this specification, the steps describing the programs to be executed represent not only the processes that are to be carried out chronologically in the depicted sequence but also processes that may be performed parallelly or individually.

In this specification, the term "system" refers to an entire configuration made up of a plurality of component devices.

As many apparently different embodiments of this invention may be made without departing from the spirit and scope thereof, it is to be understood that the invention is not limited to the specific embodiments thereof except as defined in the appended claims.

What is claimed is:

1. A picture processing apparatus for processing pictures showing subjects wearing devices each assigned identification information, said picture processing apparatus comprising:
    acquiring means for acquiring a first picture sequence formed by the pictures showing said subjects wearing said devices, and a time series of said identification information assigned to said devices; and
    clustering means which, based on how said time series acquired by said acquiring means is linked according to said identification information, links together scenes constituting said first picture sequence, said scenes having been picked up at corresponding points in time, wherein said clustering means links said time series of said identification information into a single cluster in which said identification information continues over a predetermined time interval and belongs to one category.

2. The picture processing apparatus according to claim 1, wherein said acquiring means acquires said time series of said identification information from a second picture sequence having been picked up and recognized.

3. The picture processing apparatus according to claim 1, further comprising reproducing means for reproducing, from among the scenes constituting said first picture sequence, those scene which constitute part of said first picture sequence and which were picked up over the time interval corresponding to said single cluster.

4. The picture processing apparatus according to claim 3, wherein said reproducing means reproduces the scenes which consitute said first picture sequence and which were picked up over the time intervals corresponding to a plurality of clusters formed by the time series of said indentification information belonging to the same catergory.

5. The picture processing apparatus according to claim 3, further comprising distrubution displaying means for displaying a time-base distrubution of the scenes which constitute said first picture sequence and which were picked up over the time intervals corresponding to said single cluster, said time-base distribution of said scenes being displayed in a position different from that in which the scene reproduced by said reproducing means is being displayed.

6. The picture processing apparatus according to claim 5, wherein said reproducing means reproduces the scene selected from said time-base distribution displayed by said distribution displaying means.

7. The picture processing apparatus according to claim 1, wherein said clustering means links into a second cluster the time series of said identification information belonging to the same category as that of the time series of said identification information constituting said single cluster regarded as a first cluster.

8. The picture processing apparatus according to claim 7, further comprising:
    reproducing means for reproducing said first picture sequence; and
    displaying means which, during reproduction of a first scene constituting part of said first picture sequence picked up over the time interval corresponding to said first cluster, reproduces a second scene constituting part of said first picture sequence picked up over the time interval corresponding to said second cluster, said second scene being displayed in a position different from that in which said first scene is being displayed.

9. The picture processing apparatus according to claim 8, wherein said displaying means displays a plurality of the second scenes.

10. The picture processing apparatus according to claim 8, wherein said reproducing means starts reproducing said second scene displayed by said displaying means when said second scene is selected by a user.

11. The picture processing apparatus according to claim 1, further comprising creating means for creating meta data representative of how said scenes constituting said first picture sequence are linked together.

12. A picture processing method for processing pictures showing subjects wearing devices each assigned identification information, said picture processing method comprising the steps of:
    acquiring a picture sequence formed by the pictures showing said subjects wearing said devices, and a time series of said identification information assigned to said devices; and
    linking together scenes constituting said picture sequence based on how said time series acquired in said acquiring step is linked according to said identification information, said scenes having been picked up at corresponding points in time, wherein said linking step links said time series of said identification information into a single cluster in which said identification information continues over a predetermined time interval and belongs to one catergory.

13. A computer readable medium having embedded therein a program for causing a computer to process pictures showing subjects wearing devices each assigned identification information, said program when executed by said computer executes a procedure comprising the steps of:
    acquiring a picture sequence formed by the pictures showing said subjects wearing said devices, and a time series of said identification information assigned to said devices; and
    linking together scenes constituting said picture sequence based on how said time series acquired in said acquiring step is linked according to said identification information, said scenes having been picked up at corresponding points in time, wherein linking step links said time series of said identification information into a single clauster in which said identification information contiues over a predetermined time interval and belongs to one catergory.

14. A picture pickup apparatus for processing pictures showing subjects wearing devices each assigned identification information, said picture pickup apparatus comprising:
  picture pickup means;
  acquiring means for acquiring a picture sequence picked up by said picture pickup means and formed by the pictures showing said subjects wearing said devices, and a time series of said identification information assigned to said devices; and
  clustering means which, based on how said time series acquired by said acquiring means is linked according to said identification information, links together scenes constituting said picture sequence, said scenes having been picked up at corresponding points in time, wherein said clustering means links said time series of said identification information into a single cluster in which said indentification information continues over a predetermined time interval and belongs to one catergory.

* * * * *